(12) United States Patent
Sato et al.

(10) Patent No.: US 10,448,005 B2
(45) Date of Patent: Oct. 15, 2019

(54) STEREOSCOPIC DISPLAY DEVICE AND PARALLAX IMAGE CORRECTING METHOD

(71) Applicant: NLT Technologies, Ltd., Kanagawa (JP)

(72) Inventors: Tetsushi Sato, Kanagawa (JP); Koji Shigemura, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 415 days.

(21) Appl. No.: 15/002,771

(22) Filed: Jan. 21, 2016

(65) Prior Publication Data
US 2016/0219260 A1   Jul. 28, 2016

(30) Foreign Application Priority Data

Jan. 22, 2015  (JP) .................................. 2015-010402
Nov. 28, 2015  (JP) .................................. 2015-232499

(51) Int. Cl.
*H04N 13/00* (2018.01)
*G02B 27/22* (2018.01)
(Continued)

(52) U.S. Cl.
CPC ......... *H04N 13/398* (2018.05); *H04N 13/302* (2018.05); *H04N 13/305* (2018.05); *H04N 13/317* (2018.05)

(58) Field of Classification Search
CPC .......... H04N 13/0402; H04N 13/0404; H04N 13/0415; H04N 13/0497
(Continued)

(56) References Cited

U.S. PATENT DOCUMENTS 9,291,829 B2 *  3/2016  Prouty, IV ......... G02B 27/2214
2010/0214394 A1  8/2010  Maekawa
(Continued)

FOREIGN PATENT DOCUMENTS

CN       101382660 A     3/2009
CN       102857775 A     1/2013
(Continued)

OTHER PUBLICATIONS

Ohinese Office Action issued in Application No. 201610037615.0, dated May 14, 2018 with English Translation.
(Continued)

*Primary Examiner* — Susan E. Hodges
(74) *Attorney, Agent, or Firm* — Young & Thompson

(57) ABSTRACT

A disclosed stereoscopic display device includes: a naked-eye stereoscopic display that projects respectively-different images into observer's left eye and right eye aligned in a first direction based on input images corresponding to two viewpoints; a flat-plate-shaped spatial imaging device that includes a plurality of optical reflection devices reflecting light transmitted from an object on a first reflection surface and a second reflection surface that are orthogonal to each other, the spatial imaging device emitting light that is emitted from the naked-eye stereoscopic display and is incident to an incident surface from an emission surface to an observer side; and an image processing unit that interchanges portions corresponding to reverse viewing areas in which depth parallax and popup parallax of the input images corresponding to the two viewpoints are reversed in a case where, in an image projecting one input image, an image projecting the other input image is mixed.

18 Claims, 44 Drawing Sheets

(51) Int. Cl.
  *G06T 15/00* (2011.01)
  *H04N 13/398* (2018.01)
  *H04N 13/302* (2018.01)
  *H04N 13/305* (2018.01)
  *H04N 13/317* (2018.01)

(58) Field of Classification Search
  USPC .......................................................... 348/51
  See application file for complete search history.

(56) References Cited

U.S. PATENT DOCUMENTS

| 2010/0231860 | A1* | 9/2010 | Maekawa | ................ | G02B 5/08 |
| | | | | | 353/10 |
| 2013/0003176 | A1 | 1/2013 | Yang et al. | | |
| 2014/0035907 | A1* | 2/2014 | Hasegawa | ................ | G09G 5/14 |
| | | | | | 345/419 |

FOREIGN PATENT DOCUMENTS

| CN | 102868894 A | 1/2013 |
| CN | 103595987 A | 2/2014 |
| CN | 104007557 A | 8/2014 |
| GB | 2508404 A | 6/2014 |
| JP | 2009-075483 | 4/2009 |
| JP | 2012-163702 | 8/2012 |
| JP | 2013-080227 | 5/2013 |
| JP | 2013-197933 | 9/2013 |

OTHER PUBLICATIONS

Japanese Office Action for Application No. 2015-232499 dated Jul. 2, 2019, with English translation provided.

* cited by examiner

F I G. 1 1
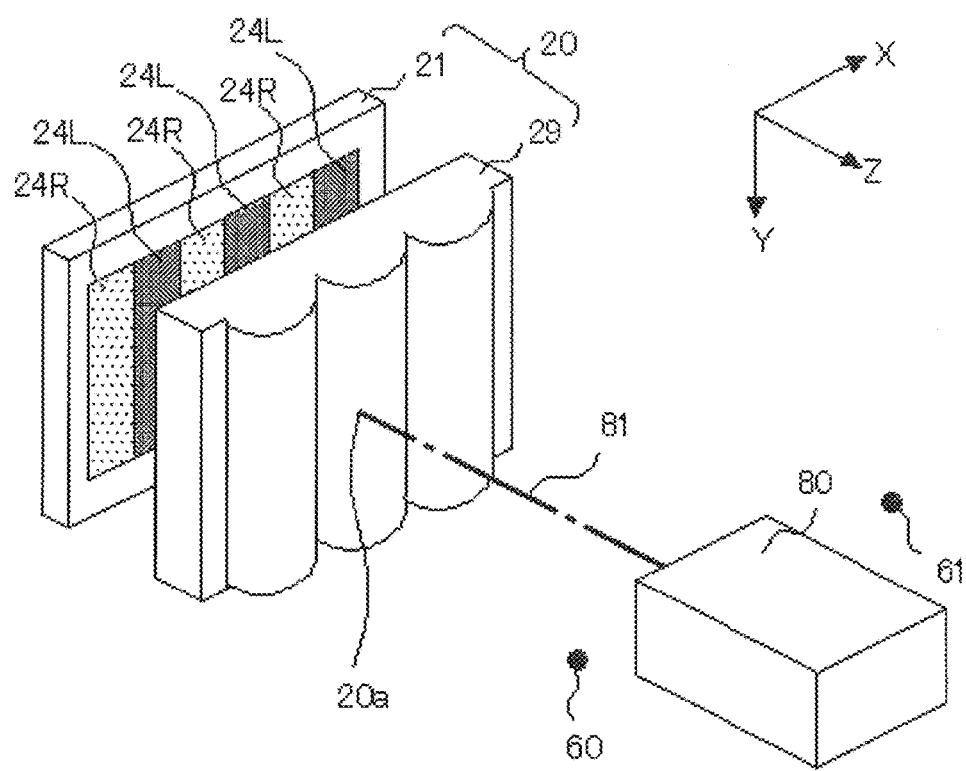

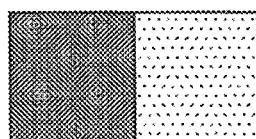
FIG. 14A
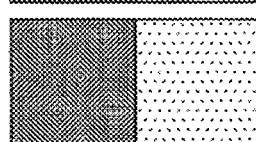
FIG. 14B
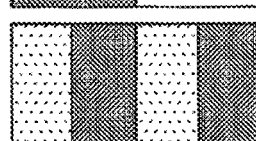
FIG. 14C
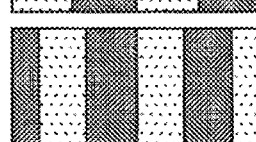
FIG. 14D
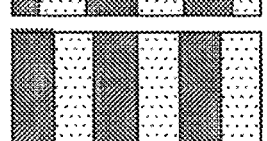
FIG. 14E
■ INPUT IMAGE OF LEFT-EYE PIXELS
□ INPUT IMAGE OF RIGHT-EYE PIXELS
BIG
↑
D
↓
SMALL
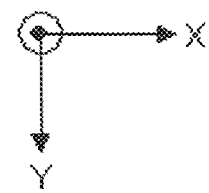

FIG. 17

| DISTANCE D | ⟨CAPTURED IMAGE⟩ | = | IMAGE ACCORDING TO THE PRIMARY LIGHT | + | IMAGE ACCORDING TO LIGHT OF A HIGH ORDER |
|---|---|---|---|---|---|
| THE OPTIMAL STEREOSCOPIC VISUAL RECOGNITION DISTANCE: Dop (FOR EXAMPLE 600mm) | | = | | + | |
| 0.5 × Dop (FOR EXAMPLE 300mm) | | = | | + | |
| 0.33 × Dop (FOR EXAMPLE 200mm) | | = | | + | |
| 0.28 × Dop (FOR EXAMPLE 170mm) | | = | | + | |
| 0.23 × Dop (FOR EXAMPLE 140mm) | | = | | + | |

FIG. 20

| DISTANCE D | ⟨CAPTURED IMAGE⟩ | = | IMAGE ACCORDING TO THE PRIMARY LIGHT | + | IMAGE ACCORDING TO LIGHT OF A HIGH ORDER |
|---|---|---|---|---|---|
| THE OPTIMAL STEREOSCOPIC VISUAL RECOGNITION DISTANCE:Dop (FOR EXAMPLE 600mm) | | = | | + | |
| 0.5 × Dop (FOR EXAMPLE 300mm) | | = | | + | |
| 0.33 × Dop (FOR EXAMPLE 200mm) | | = | | + | |
| 0.28 × Dop (FOR EXAMPLE 170mm) | | = | | + | |
| 0.23 × Dop (FOR EXAMPLE 140mm) | | = | | + | |

INPUT IMAGE OF
LEFT-EYE PIXELS

INPUT IMAGE OF
RIGHT-EYE PIXELS

IMAGE PROJECTED TO
THE SPATIAL IMAGING DEVICE

IMAGE SEEN BY THE OBSERVER

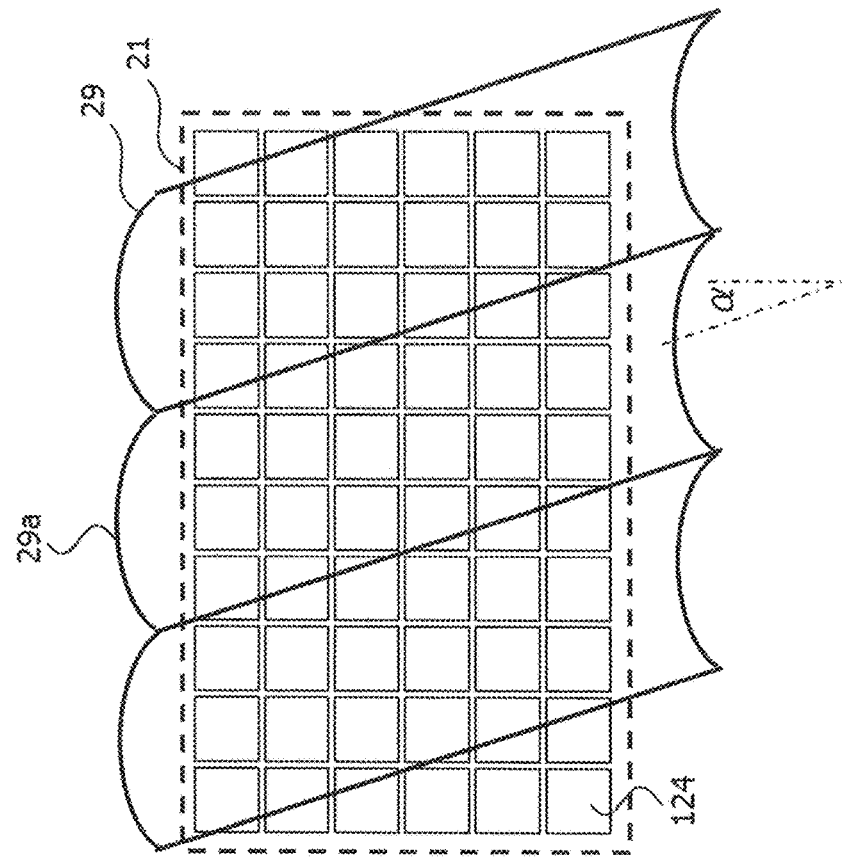
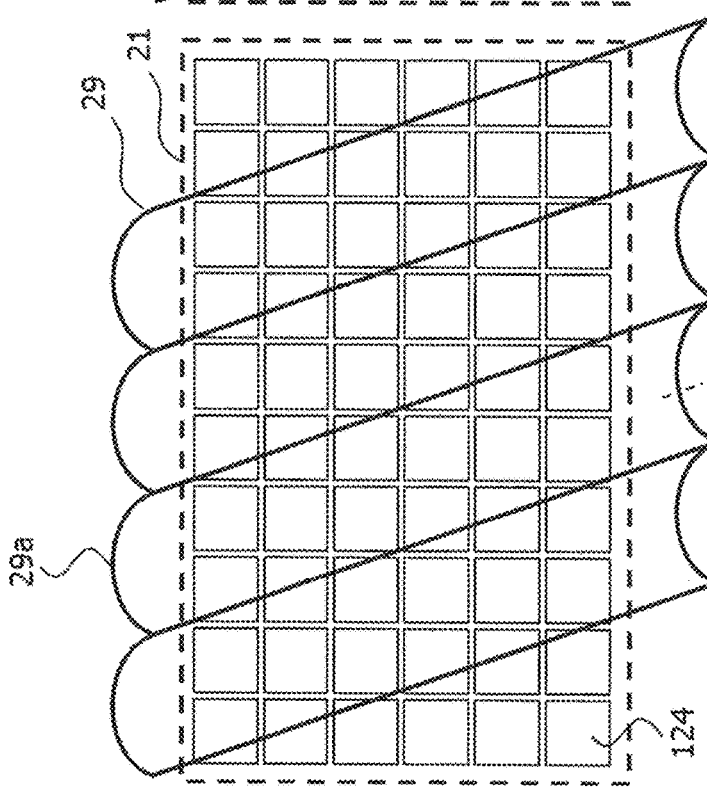
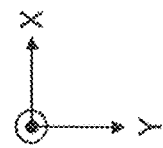

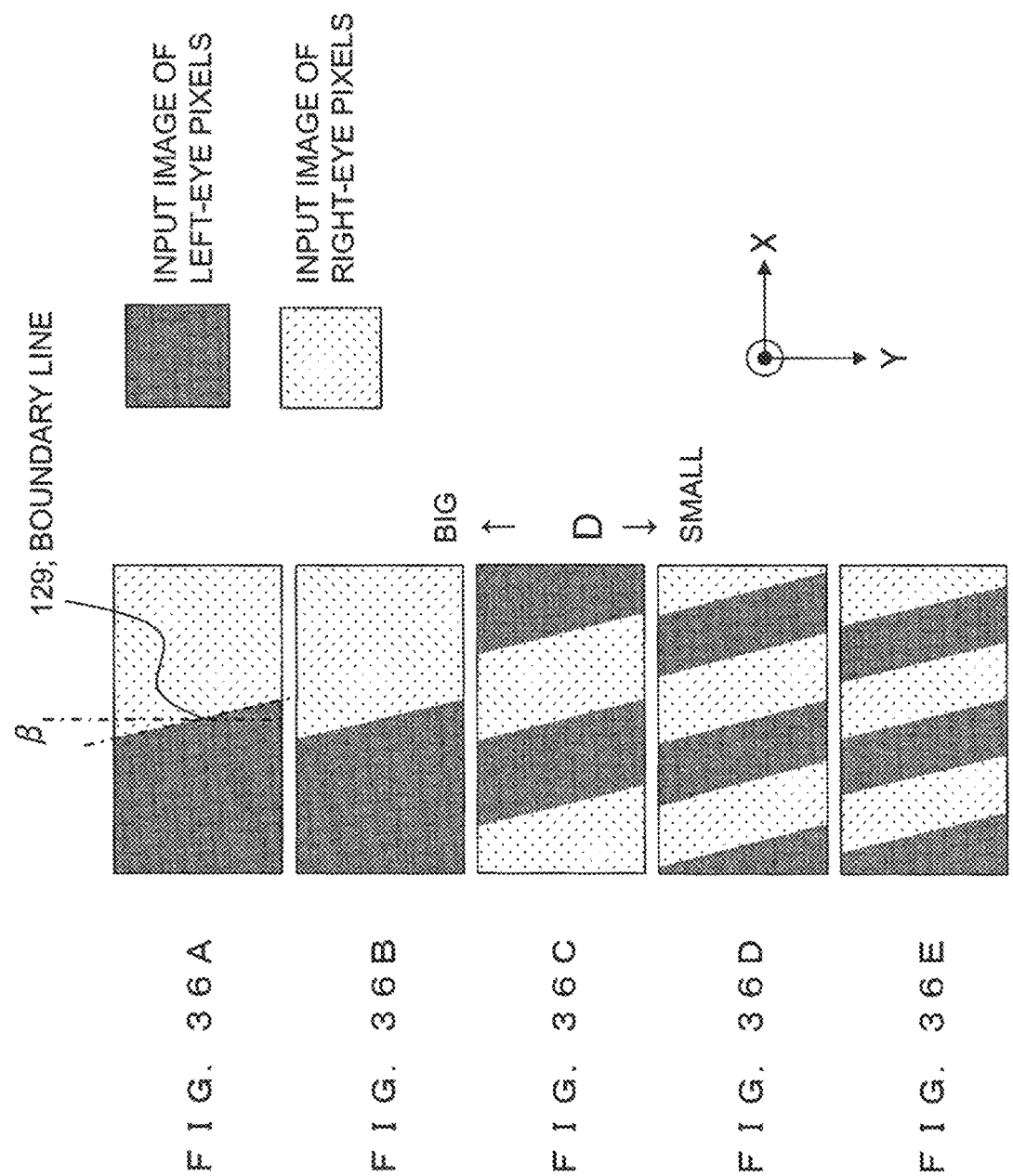

IMAGE PROJECTED TO THE SPATIAL IMAGING DEVICE

LEFT SIDE OF VIRTUAL CAMERA    RIGHT SIDE OF VIRTUAL CAMERA

LEFT-EYE    RIGHT-EYE

IMAGE SEEN BY THE OBSERVER

F I G. 3 8 A
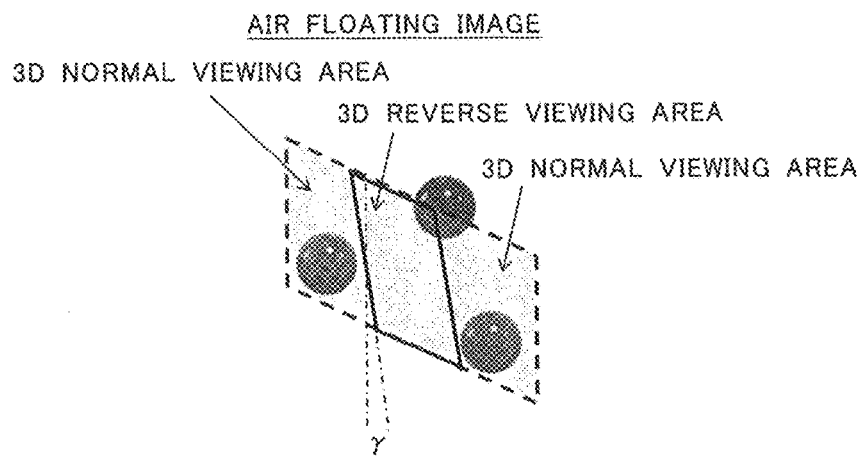
F I G. 3 8 B
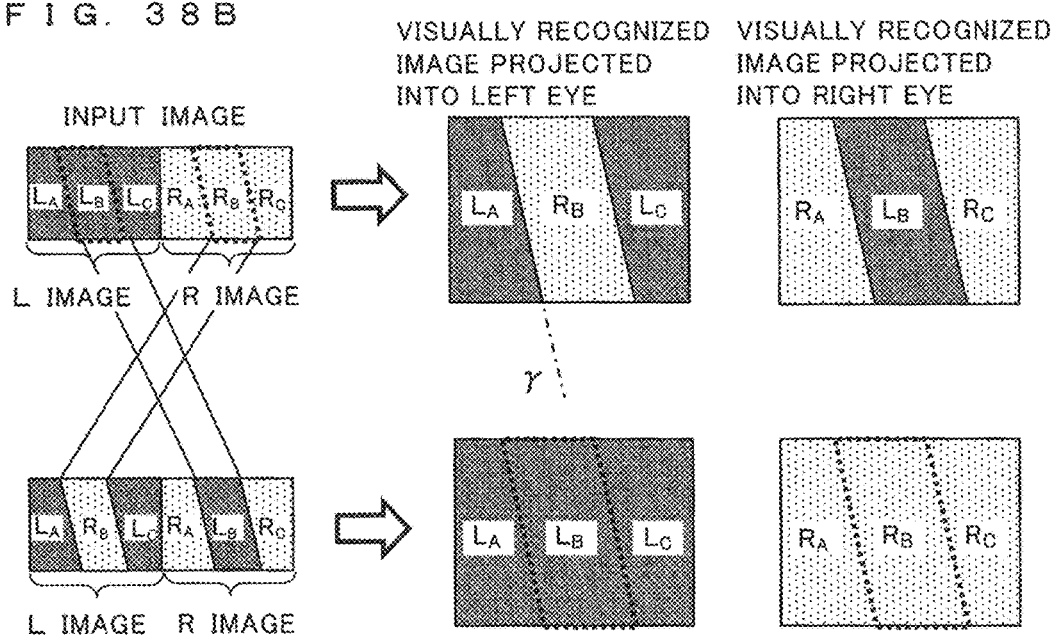
F I G. 3 8 C
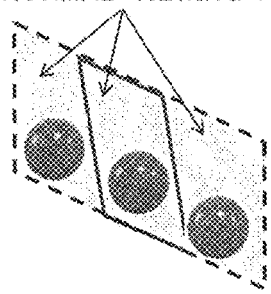

FIG. 41

| OBSERVATION POSITION VPx | -0.066 | -0.044 | -0.022 | 0 | +0.022 | +0.044 | +0.066 |
|---|---|---|---|---|---|---|---|
| LEFT-EYE VISUALLY RECOGNIZED IMAGE | | | | | | | |
| RIGHT-EYE VISUALLY RECOGNIZED IMAGE | | | | | | | |
| REVERSE VIEWING AREA | | | | | | | |
| REVERSE VIEWING AREA OF LEFT-EYE INPUT IMAGE | | | | | | | |
| REVERSE VIEWING AREA OF RIGHT-EYE INPUT IMAGE | | | | | | | |

Legend: ▓ INPUT IMAGE OF LEFT-EYE PIXELS ░ INPUT IMAGE OF RIGHT-EYE PIXELS

STEREOSCOPIC DISPLAY DEVICE AND PARALLAX IMAGE CORRECTING METHOD

CROSS-REFERENCE TO RELATED APPLICATIONS

This non-provisional application claims priority under 35 U.S.C. § 119(a) on Patent Application No. 2015-232499 filed in Japan on Nov. 28, 2015, and Patent Application No. 2015-010402 filed in Japan on Jan. 22, 2015, the entire contents of which are hereby incorporated by reference.

FIELD

The present invention relates to a stereoscopic display device generating an air floating image acquired by forming a three-dimensional image in the air and a method of correcting parallax images in the stereoscopic display device.

BACKGROUND

As a technique for allowing an observer to recognize a stereoscopic image, generally, a stereoscopic image display method based on binocular parallax using a difference between positions of the left eye and the right eye is used. This method is an application of the principle of stereogram that a three-dimensional stereoscopic image is recognized based on a difference between viewing methods in the brain by allowing the left eye and the right eye to visually recognize respectively-different two-dimensional images. As methods for displaying a stereoscopic image, there are a system using glasses and a naked-eye system not using glasses. As the naked-eye system, there are a two-eye system, a multiple eye system, and the like in accordance with the number of observer's viewpoints.

In order to represent a stereoscopic image based on the naked-eye system by using a two-dimensional display such as a general flat panel display, a method is used in which pixels displaying a left-eye image and a right-eye image are arranged in a two-dimensional display, an optical unit such as a lenticular lens having a cylindrical lens arranged therein or a parallax barrier having a slit-shaped light shielding pattern arranged therein is disposed between the two-dimensional display and an observer, and the left-eye image and the right-eye image on the screen are spatially separated so as to be visually recognized respectively by the left and right eyes.

In the technology described above, while an image is stereoscopically displayed on the screen of a two-dimensional display, a technology for displaying an image in which an object is represented as if it floats in the air has also been developed. For example, a method of stereoscopically displaying a three-dimensional image according to a volume scanning method has been proposed in which a two-dimensional display is arranged to be inclined with respect to the optical axis of an imaging optical system by using the imaging optical system such as a convex lens or a concave mirror, the two-dimensional image inclined with respect to the optical axis is moved through mirror scanning, and a three-dimensional image is formed by displaying a cross-section image of a display object on the two-dimensional display in synchronization with the movement of the two-dimensional image.

However, in the method described above, since a convex lens or a concave mirror is used as the imaging optical system, a distortion of the image occurs due to aberration of the convex lens or the concave mirror, and accordingly, the shape of a display object cannot be accurately reproduced. Regarding this problem, a method using a real mirror video imaging optical system such as an optical device including a plurality of dihedral corner reflectors each configured by two mirror surfaces as the imaging optical system has been proposed.

FIG. 1 is a perspective view that schematically illustrates a three-dimensional air video display device disclosed in Japanese Patent Application Laid-Open No. 2012-163702. FIG. 2A is a plane view schematically illustrating a dihedral corner reflector array that is a real mirror video imaging optical system of Japanese Patent Application Laid-Open No. 2012-163702, and FIG. 2B is a partial enlarged diagram of a portion A. For example, in Japanese Patent Application Laid-Open No. 2012-163702, as illustrated in FIGS. 1, 2A, and 2B, a three-dimensional air video display device has been disclosed in which at least two real mirror video imaging optical systems that can form real images of a projection object at plane-symmetrical positions with respect to one geometric plane that becomes a plane of symmetry are arranged to be aligned, projection objects are arranged in correspondence with the imaging optical systems, and a real mirror video of a corresponding projection object that is formed by a right-eye imaging optical system that is one of the above-described real mirror video imaging optical systems arranged on the relatively left side and a real mirror video of a corresponding projection object that is formed by a left-eye imaging optical system that is one of the above-described real mirror video imaging optical systems arranged on the relatively right side are displayed to overlap at a same position.

FIG. 3 is a perspective view that schematically illustrates a volume scanning-type three-dimensional air video display device according to Japanese Patent Application Laid-Open No. 2013-080227.

FIGS. 4A and 4B are diagrams that schematically illustrate an image formation pattern according to a dihedral corner reflector array that is a real mirror video imaging optical system of Japanese Patent Application Laid-Open No. 2013-080227. In Japanese Patent Application Laid-Open No. 2013-080227, as illustrated in FIGS. 3, 4A, and 4B, a volume scanning-type three-dimensional air video display device has been disclosed which includes: a real mirror video imaging optical system capable of forming a real image of a projection object at plane-symmetrical positions with respect to one geometric plane that becomes a plane of symmetry as mirror videos; a display that is arranged on the lower face side of the plane of symmetry and includes a display surface displaying a video as the projection object; and a drive unit that operates the display to make a motion including a component of a direction perpendicular to the display surface and, by changing a video displayed on the display surface in synchronization with the operation of the display according to the drive unit, forms the video as a stereoscopic video in a space disposed on the upper face side of the plane of symmetry.

As above, by combining the two-dimensional display and the real mirror video imaging optical system 91 as illustrated in FIGS. 2A and 2B or 4A and 4B and by arranging two-dimensional displays corresponding to viewpoints as in Japanese Patent Application Laid-Open No. 2012-163702 or moving the two-dimensional display as in Japanese Patent Application Laid-Open No. 2013-080227, an air floating image can be displayed. However, in the configuration disclosed in Japanese Patent Application Laid-Open No.

2012-163702, as illustrated in FIG. 1, a two-dimensional display used for displaying a projection object 92 corresponding to the number of viewpoints is required, and, in the configuration disclosed in Japanese Patent Application Laid-Open No. 2013-080227, as illustrated in FIG. 3, the drive unit 95 that moves the two-dimensional display 94 is required. Accordingly, there is a problem in that the size of the device becomes large.

For this problem, a method of displaying an air floating image by combining a spatial imaging device such as the real mirror video imaging optical system described above with a display (a so-called naked-eye type 3D display) in which an optical unit such as a lenticular lens is arranged in a two-dimensional display may be considered. However, in the case of such a configuration, a new problem that a 3D normal viewing area (an area in which the depth of a 3D object is correctly displayed) and a 3D reverse viewing area (an area in which the depth of a 3D object is reversed) alternately appear in the air floating image occurs.

The present invention is in consideration of the problems described above, and a main object thereof is to provide a stereoscopic display device and a parallax image correcting method capable of avoiding a problem that a 3D normal viewing area and a 3D reverse viewing area appear in an air floating image in a configuration combining a naked-eye type 3D display and a spatial imaging device.

SUMMARY

According to one aspect of the present invention, there is provided a stereoscopic display device including: a naked-eye stereoscopic display that projects respectively-different images into observer's left eye and right eye aligned in a first direction based on input images corresponding to two viewpoints; a spatial imaging device of a flat-plate shape that includes a plurality of optical reflection devices reflecting light transmitted from an object on a first reflection surface and a second reflection surface that are orthogonal to each other; and an image processing unit that interchanges portions corresponding to reverse viewing areas in which depth parallax and popup parallax of the input images corresponding to the two viewpoints are reversed and outputs resultant images to the naked-eye stereoscopic display in a case where, in an image projecting one input image, an image projecting the other input image is mixed, wherein the spatial imaging device emits light that is emitted from the naked-eye stereoscopic display and is incident to an incident surface from an emission surface to an observer side, and the naked-eye stereoscopic display includes a main lobe that is a front stereoscopic viewing area near a normal line passing through the center of a display surface and a side lobe that is a stereoscopic viewing area disposed on an outer side of the main lobe in the first direction.

According to one aspect of the present invention, there is provided a parallax image correcting method using a stereoscopic display device including: a naked-eye stereoscopic display that projects respectively-different images into observer's left eye and right eye aligned in a first direction based on input images corresponding to two viewpoints; and a spatial imaging device of a flat-plate shape that includes a plurality of optical reflection devices reflecting light transmitted from an object on a first reflection surface and a second reflection surface that are orthogonal to each other, the naked-eye stereoscopic display including a main lobe that is a front stereoscopic viewing area near a normal line passing through the center of a display surface and a side lobe that is a stereoscopic viewing area disposed on an outer side of the main lobe in the first direction, and the spatial imaging device emitting light that is emitted from the naked-eye stereoscopic display and is incident to an incident surface from an emission surface to an observer side. The parallax image correcting method using the stereoscopic display device includes: determining whether reverse viewing areas in which depth parallax and popup parallax are reversed are present in a case where, in an image projecting one input image, an image projecting the other input image is mixed and interchanging portions of the input images corresponding to the two viewpoints that correspond to the reverse viewing areas and outputting resultant images to the naked-eye stereoscopic display in a case where the reverse viewing areas are present.

According to a stereoscopic display device and a parallax image correcting method of the present invention, a problem that a 3D normal viewing area and a 3D reverse viewing area appear in an air floating image in a configuration combining a 3D display and a spatial imaging device can be avoided.

The reason for this is that an image processing unit processing input images is arranged, the image processing unit extracts parallax image areas in which reverse viewing occurs by analyzing the input images, and executes control such that a left-eye image and a right-eye image of the extracted parallax image areas are interchanged and are input to the 3D display.

BRIEF DESCRIPTION OF THE DRAWINGS

FIG. 11 is a perspective view that illustrates an example of the arrangement of the 3D display and an imaging unit;

FIGS. 14A to 14E are diagrams that illustrate a correspondence relation between a space between the lenticular lens and the imaging unit and a captured image in the configuration illustrated in FIG. 13;

FIG. 17 is a diagram that illustrates the configuration of each captured image illustrated in FIG. 15;

FIG. 20 is a diagram that illustrates each image visually recognized according to the 3D display;

FIGS. 31A and 31B are schematic diagrams that illustrate the configuration of a 3D display according to a third embodiment of the present invention;

FIGS. 36A to 36E are diagrams that illustrate a correspondence relation between a space between a lenticular lens and an imaging unit and a captured image in the configuration illustrated in FIGS. 31A and 31B;

FIGS. 38A, 38B, and 38C are schematic diagrams that illustrate a parallax image correcting method used in the stereoscopic display device according to the third embodiment of the present invention;

FIG. 41 is a diagram that illustrates a visually-recognized image and a reverse viewing area that are observed according to observer's movement;

DESCRIPTION OF EMBODIMENTS

[First Embodiment]

As described above, a 3D display 20 displaying a stereoscopic image by arranging pixels displaying a left-eye image and a right-eye image in a two-dimensional display and dividing the left-eye image and the right-eye image into observer's left and right eyes by using an optical unit such as a lenticular lens or a parallax barrier has been developed. In addition, in order to display an image in which an object is represented as if it floats in the air, a three-dimensional air video display combining a two-dimensional display and a spatial imaging device such as a real mirror video imaging optical system has also been developed.

However, since a conventional three-dimensional video display device forms an air floating image by arranging two-dimensional displays corresponding to viewpoints or moving a two-dimensional display. Accordingly, two-dimensional displays corresponding to the number of viewpoints or a drive unit moving a two-dimensional display is required, and thus, there is a problem in that the size of the device becomes large.

Figure 1:
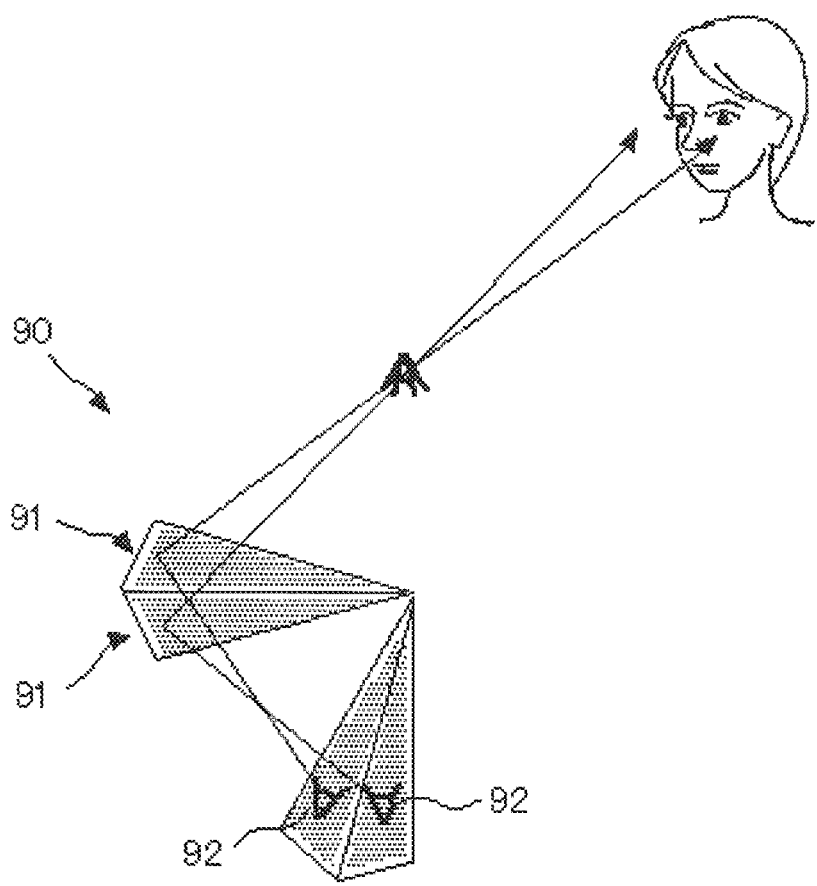
FIG. 1 is a perspective view that schematically illustrates a three-dimensional air video display device disclosed in Japanese Patent Application Laid-Open No. 2012-163702.
Figure 2A:
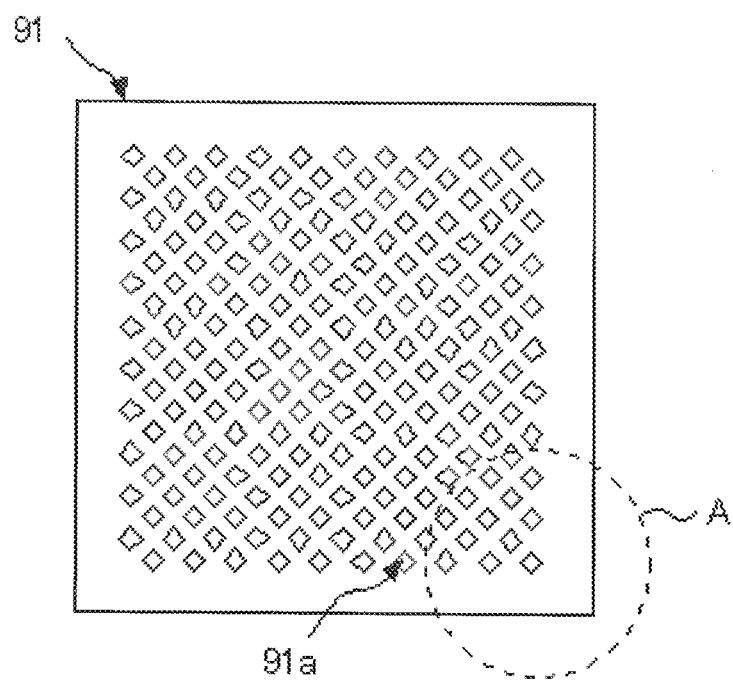
FIG. 2A is a plan view schematically illustrating a dihedral corner reflector array that is a real mirror video imaging optical system of Japanese Patent Application Laid-Open No. 2012-163702.
Figure 2B:
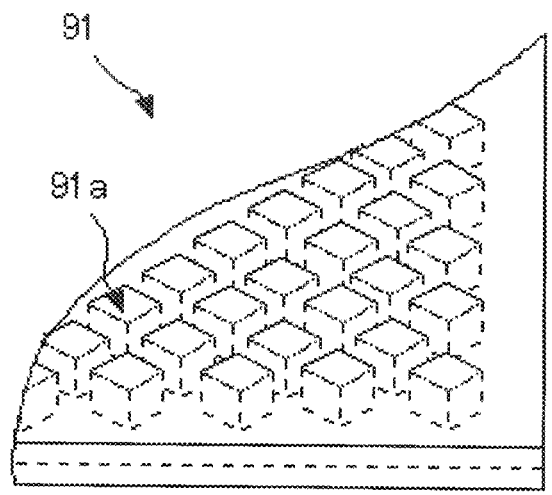
FIG. 2B is a partial enlarged diagram of a portion A.
Figure 3:
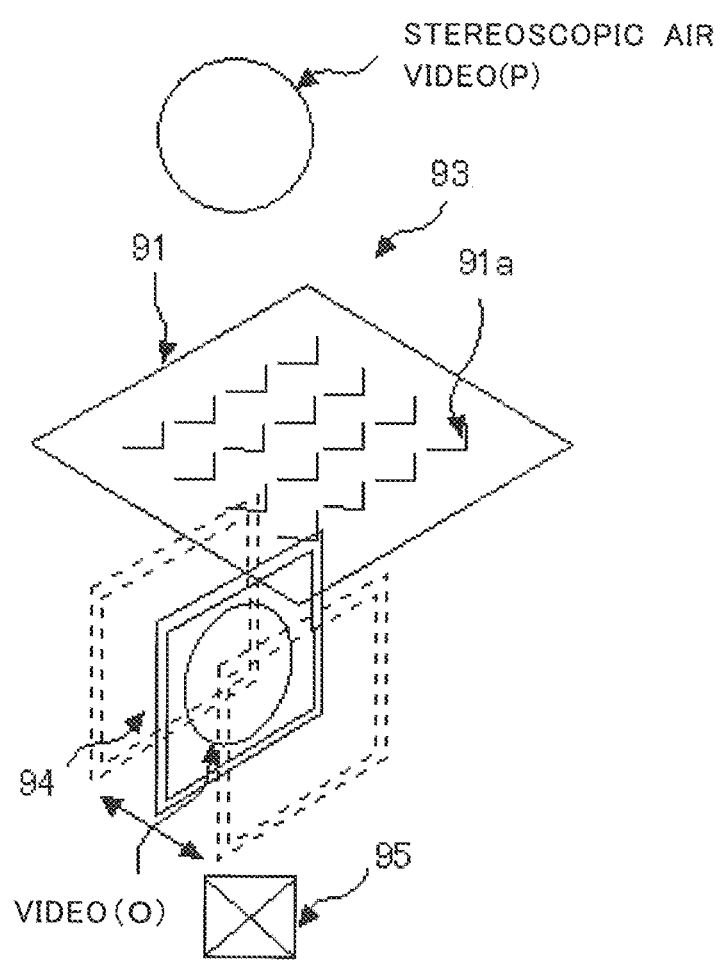
FIG. 3 is a perspective view that schematically illustrates a volume scanning-type three-dimensional air video display device according to Japanese Patent Application Laid-Open No. 2013-080227.
Figure 4A:
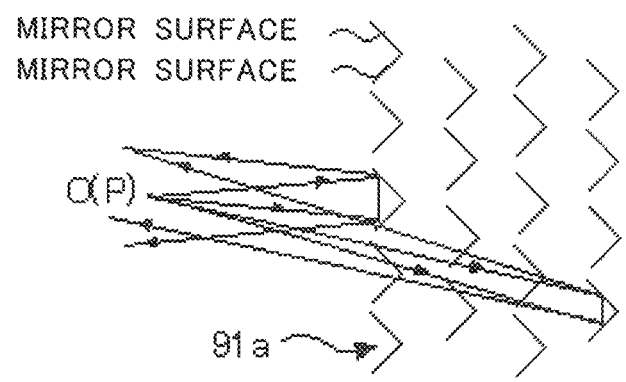
FIGS. 4A and 4B are diagrams that schematically illustrate an image formation pattern according to a dihedral corner reflector array that is a real mirror video imaging optical system of Japanese Patent Application Laid-Open No. 2013-080227.
Figure 4B:
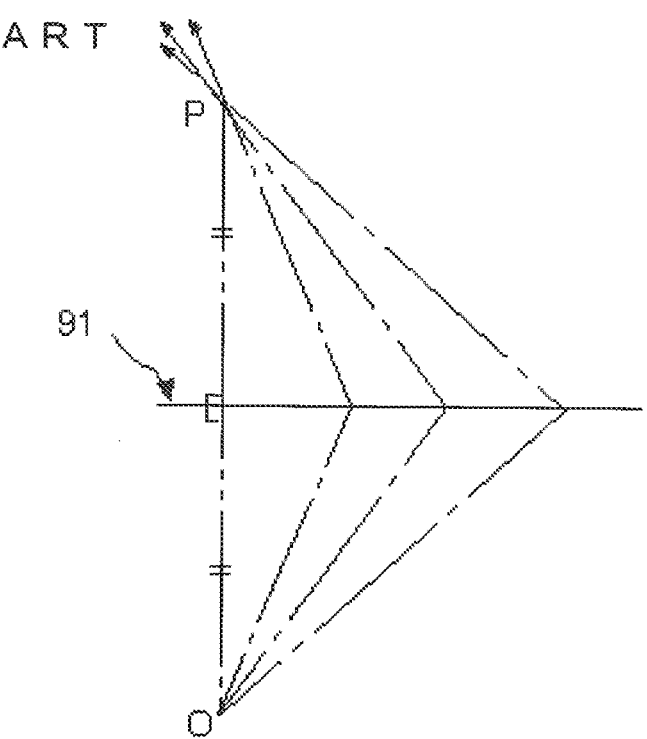
Figure 5:
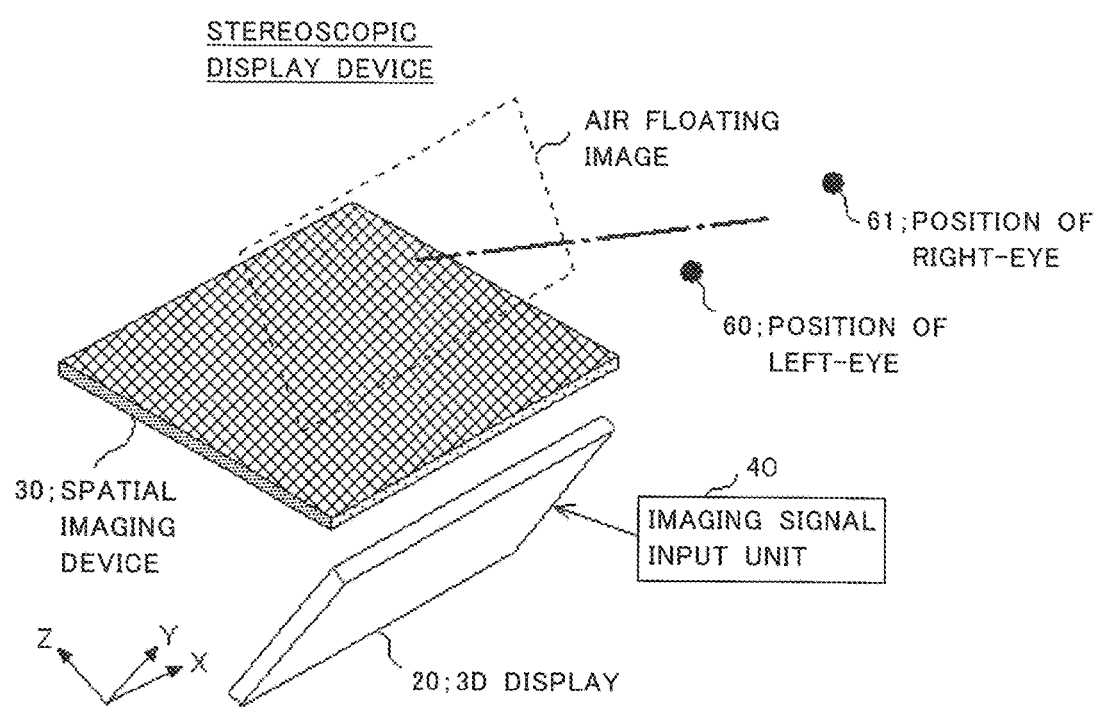
FIG. 5 is a perspective view that illustrates the configuration of a conventional stereoscopic display device.

For this problem, as illustrated in FIG. 5, a method of forming an air floating image by combining a 3D display 20 and a spatial imaging device such as the real mirror video imaging optical system described above may be considered. However, as a result of a review made by the inventors of this application, it has been found that a new problem that a 3D normal viewing area and a 3D reverse viewing area alternately appear in an air floating image occurs according to this method.

Figure 6:
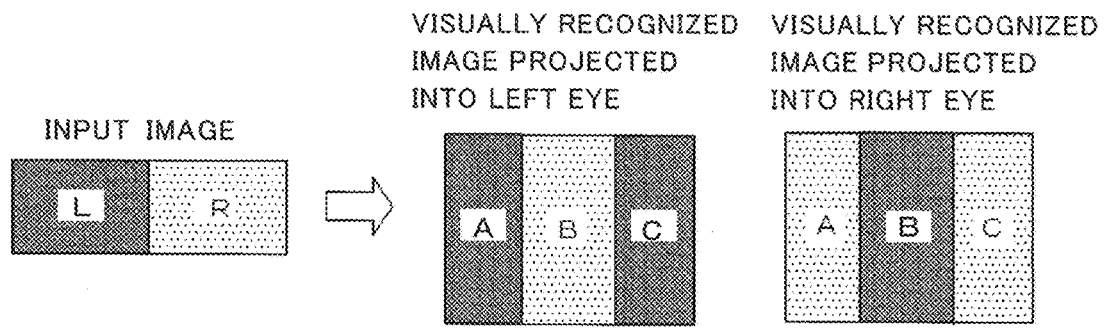
FIG. 6 is a diagram that illustrates a relation between input images and images visually recognized by an observer in a conventional stereoscopic display device.
Figure 7:
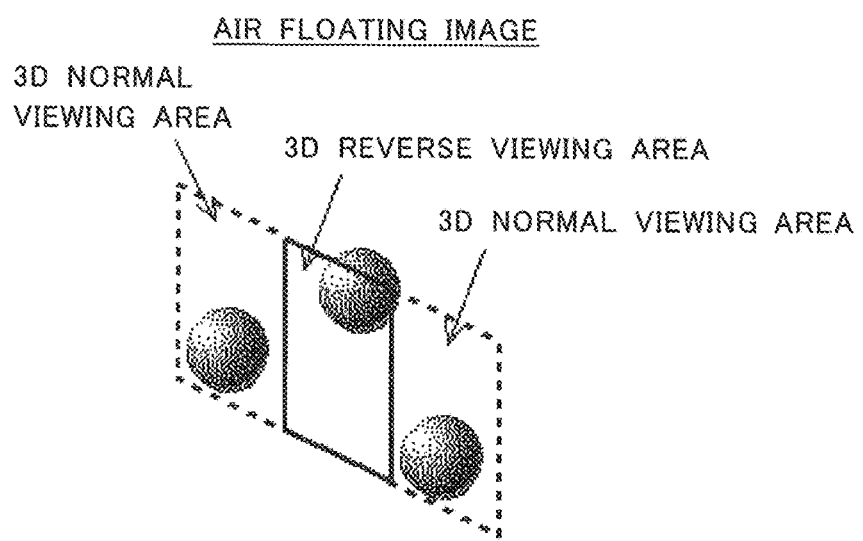
FIG. 7 is a diagram that illustrates reverse viewing in a conventional stereoscopic display device.

In other words, in the case of this configuration, it is necessary to set a distance between the 3D display 20 and the spatial imaging device to be extremely small such that light emitted from the 3D display 20 is incident to the spatial imaging device. Accordingly, a light beam transmitted from a neighboring cylindrical lens is projected, and, for input images as illustrated in FIG. 6, visually-recognized images projected into left and right eyes are repetitions of a left-eye image and a right-eye image. Basically, in a case where one reflection optical system is interposed, a reversed image reversed in the depth direction is generated. As a result, as illustrated in FIG. 6, an image (a main lobe image) projected into a center area is horizontally reversed, and, as illustrated in FIG. 7, a problem that a 3D normal viewing area and a 3D reverse viewing area alternately appear in an air floating image occurs.

Thus, according to one embodiment of the present invention, for an image to be input to the 3D display 20, image processing for interchanging a left-eye image and a right-eye image of parallax image areas in which reverse viewing occurs is executed. More specifically, based on an angle formed by the observer's visual line direction and the normal direction of the spatial imaging device, a distance between the spatial imaging device and the observer, a distance between the 3D display 20 and the spatial imaging device, the optical characteristics of the spatial imaging device, and the like, a reverse viewing area in which depth parallax and popup parallax are reversed is extracted, and images of portions corresponding to the reverse viewing area of the left-eye image and the right-eye image are interchanged.

In this way, the problem that a 3D normal viewing area and a 3D reverse viewing area alternately appear in a case where the three-dimensional display and the spatial imaging device are combined can be avoided.

Figure 8:
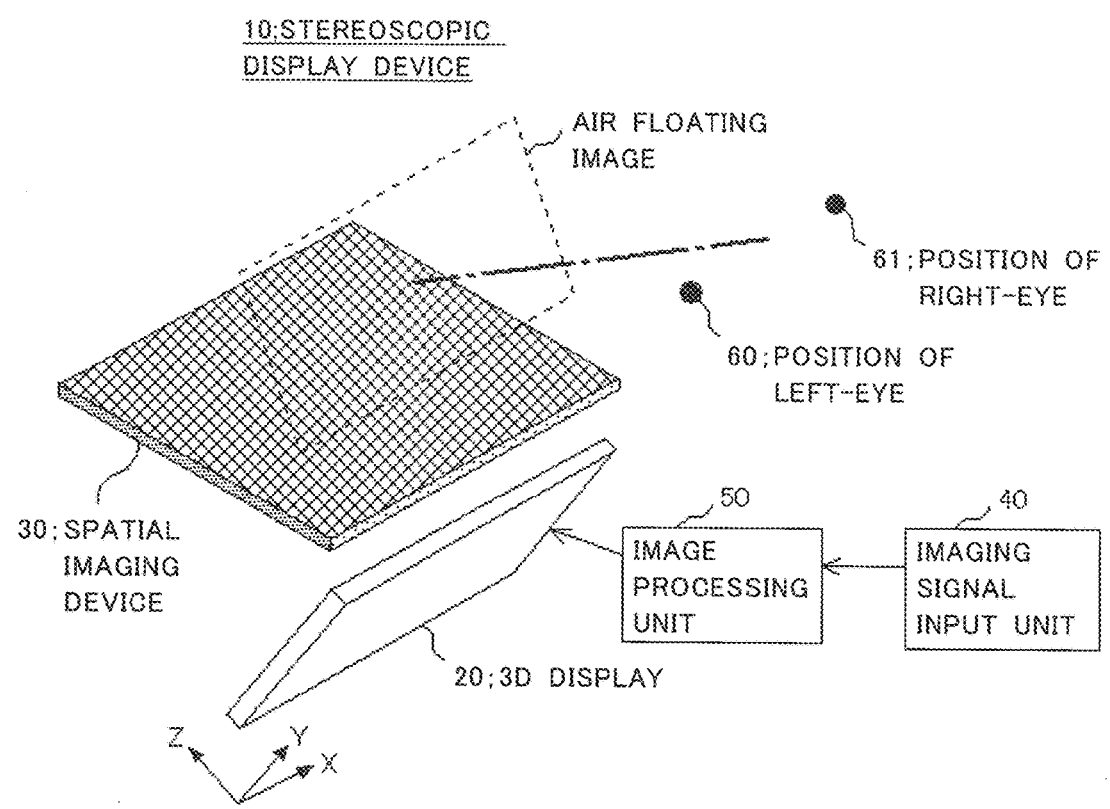
FIG. 8 is a perspective view that illustrates the configuration of a stereoscopic display device according to this embodiment.

In order to describe the above-described embodiment of the present invention in more detail, a stereoscopic display device and a parallax image correcting method according to a first embodiment of the present invention will be described with reference to FIGS. 8 to 26. FIG. 8 is a perspective view that illustrates the configuration of the stereoscopic display device according to this embodiment. FIGS. 11 to 20 are diagrams that illustrate images visually recognized by the 3D display 20.

As illustrated in FIG. 8, the stereoscopic display device 10 according to this embodiment is configured by: the 3D display 20; a spatial imaging device 30; an image signal input unit 40; and an image processing unit 50. While not illustrated in the drawing, as necessary, a unit (for example, a camera or the like) used for detecting a space between the spatial imaging device 30 and an observer is arranged at a predetermined position of the stereoscopic display device 10.

The 3D display 20 is a naked-eye stereoscopic display allowing a stereoscopic image to be visually recognized by naked eyes and is configured by a display panel such as a liquid crystal display device and an optical unit (in this embodiment, a lenticular lens) such as a lenticular lens or a parallax barrier. The display panel has a configuration in which left-eye pixels displaying a left-eye image and right-eye pixels displaying a right-eye image are alternately arranged in a first direction. The lenticular lens has a configuration in which a cylindrical lens having a face facing the display panel being a flat face and the other face having a semi-cylindrical shape is arranged in the first direction. The 3D display 20 will be described later in detail.

The spatial imaging device 30 is a device that forms an air floating image by forming a stereoscopic image displayed on the 3D display 20 inside a space. The spatial imaging device 30, for example, is acquired by arranging a plurality of optical devices (a light reflecting device that reflects light on a first reflective surface and reflects the light on a second reflective face, which forms a pair together with the first reflective surface, is arranged at a level different from that of the first reflective surface, and is arranged to intersect the first reflective surface, and passes the light) each formed by two perpendicular mirror surfaces. As this spatial imaging device 30, for example, any one of the real mirror video imaging optical systems disclosed in Japanese Patent Application Laid-Open Nos. 2012-163702 and 2013-080227 may be used. This structure having two perpendicular mirror surfaces, for example, can be formed by erecting a pole having a height of about 100 µm and having a quadrangular cross-section on a flat plate and using two orthogonal faces among the side faces thereof as mirrors or forming a rectangular hole inside the face of a flat plate having a thickness of about 100 µm and using two inner wall faces thereof as mirror surfaces.

In the case illustrated in FIG. 8, the spatial imaging device 30 has a configuration in which the optical device formed by two perpendicular mirror surfaces is arranged on a plane perpendicular to the two mirror surfaces (in other words, the pole or the hole is formed to be perpendicular to the principal face of the flat plate), and thus, the plane of the spatial imaging device 30 has been described to be inclined with respect to the display surface of the 3D display 20 at a predetermined angle. However, in a case where a pole or a hole is formed to be inclined with respect to a normal line of the principal face of the flat plate, the plane of the spatial imaging device 30 may be arranged to be in parallel with the display surface of the 3D display 20.

The image signal input unit 40 is a device that outputs a left-eye image and a right-eye image displayed in pixels of the display panel to the image processing unit 50. The left-eye image and the right-eye image may be captured images (images corresponding to two viewpoints) captured using cameras from two viewpoints or a set of a captured image captured by using a camera from one viewpoint and a depth image representing the depth information of a 3D object corresponding to each pixel of the image. In such a case, it may be configured such that, a virtual viewpoint image acquired by capturing from the position of a virtual camera that is virtually arranged in a three-dimensional space is generated based on the captured image and the depth image, and the captured images and the virtual viewpoint image are output to the image processing unit 50.

The image processing unit 50 is a device that analyzes the images (the captured images corresponding to two viewpoints or a set of the captured image corresponding to one viewpoint and the virtual viewpoint image) output from the image signal input unit 40, extracts areas (parallax image areas) in which reverse viewing occurs, executes image processing for horizontally reversing input images of the parallax image areas (the left-eye image and the right-eye image are interchanged), and outputs image data after the image processing to the 3D display 20. The image processing unit 50 may be a device that is independent from the 3D display 20 or may be built in the 3D display 20. This image processing unit 50 will be described later in detail.

First, for easy understanding of the stereoscopic display device 10 according to this embodiment, the configuration and the operation of the 3D display 20 will be described. In description presented here, for the convenience of the description, an XYZ orthogonal coordinate system will be set as below. The X-axis direction is a direction in which a left-eye pixel 24L and a right-eye pixel 24R to be described later are repeatedly arranged. +X direction is a direction from the right-eye pixel 24R toward the left-eye pixel 24L. The Y-axis direction is the longitudinal direction of a cylindrical lens 29a to be described later. The Z-axis direction is a direction that is orthogonal to both the X-axis direction and the Y-axis direction. +Z direction is a direction (toward an observer) from a face on which the left-eye pixel 24L or the right-eye pixel 24R is arranged toward a lenticular lens 29.

Figure 9:
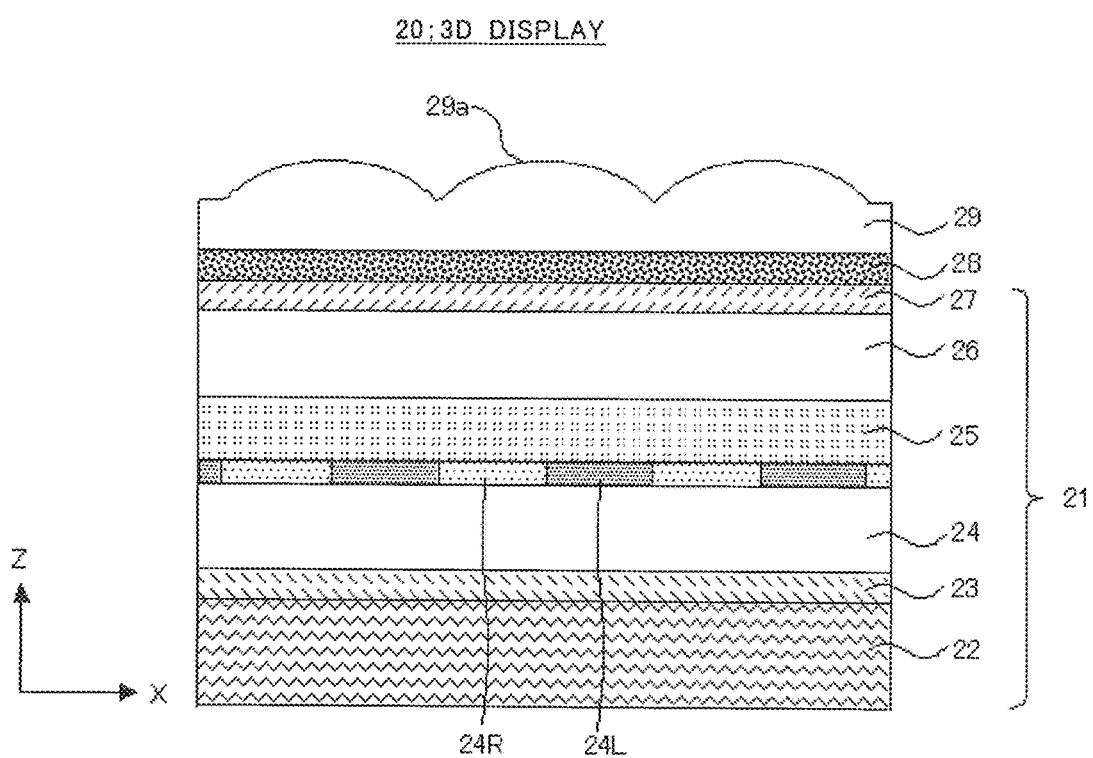
FIG. 9 is a cross-sectional view that illustrates the configuration of a 3D display included in the stereoscopic display device according to this embodiment.
Figure 10:
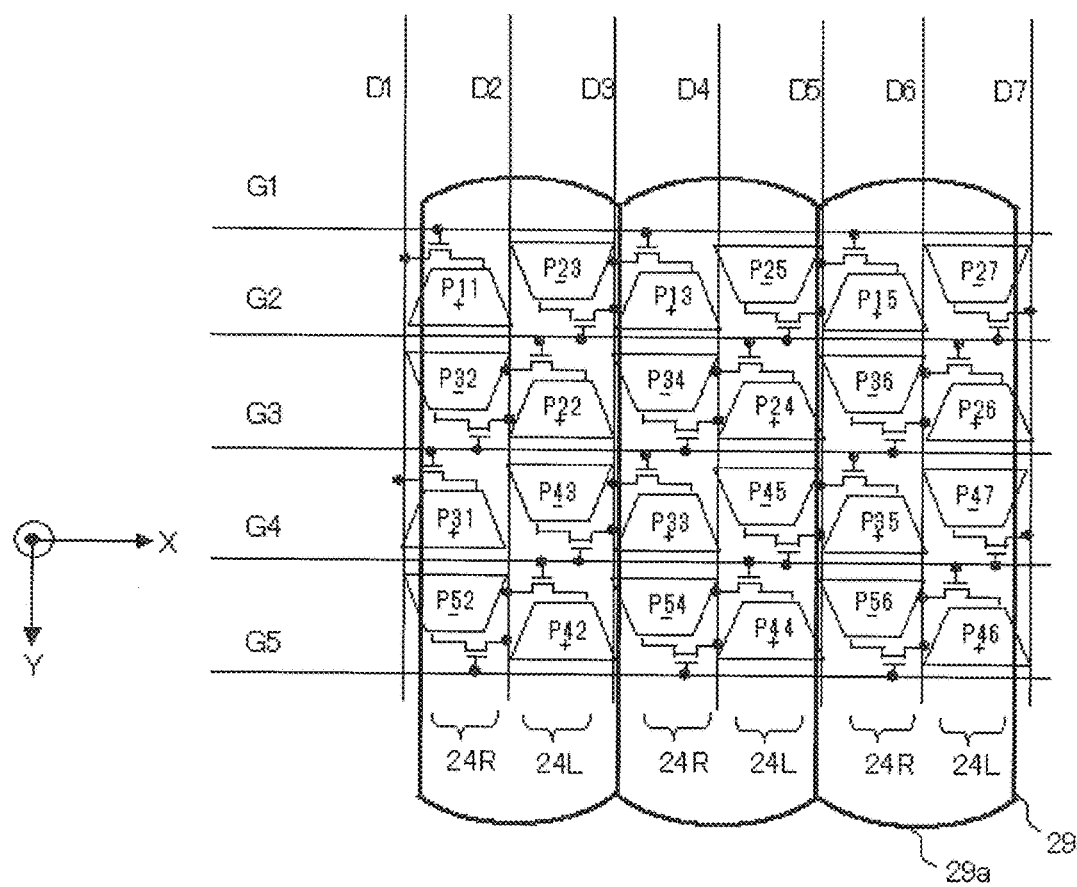
FIG. 10 is a top view that illustrates the configuration of the 3D display included in the stereoscopic display device according to this embodiment.

FIG. 9 is a cross-sectional view that illustrates the configuration of the 3D display 20 included in the stereoscopic display device according to this embodiment. FIG. 10 is a top view that illustrates the configuration of the 3D display 20 included in the stereoscopic display device according to this embodiment. As illustrated in FIGS. 9 and 10, the 3D display 20 includes a display panel 21 using liquid crystal molecules as an electro-optical device and a lenticular lens 29 as an optical unit.

The display panel 21 is a display panel of an active matrix type including thin film transistors (TFTs), a TFT substrate 24 in which the TFTs are formed and an opposing substrate 26 face each other with a minute gap interposed therebetween, and a liquid crystal layer 25 is arranged in this gap. In the TFT substrate 24, pixel pairs as display units each formed by one left-eye pixel 24L and one right-eye pixel 24R are disposed in a matrix pattern. The liquid crystal layer 25, for example, is configured to be in a twisted nematic (TN) mode of a transmission type. The TFT substrate 24 is arranged on the −Z direction side of the display panel 21, and the opposing substrate 26 is arranged on the +Z direction side. In addition, a first optical film 23 is attached to the −Z direction side of the TFT substrate 24, and a second optical film 27 is attached to the +Z direction side of the opposing substrate 26. The lenticular lens 29 is fixed to the +Z direction side of the second optical film 27 through an adhesive layer 28, and a backlight 22 is arranged on the −Z direction side of the first optical film 23.

On the inner face of the TFT substrate 24, in other words, on a face disposed on the +Z direction side, a plurality of gate lines G (in the diagram, G1 to G5) extending in a row direction, in other words, in the X-axis direction are arranged. In addition, on the same face of the TFT substrate 24, a plurality of data lines D (D1 to D7 in the drawing) extending in the column direction, in other words, in the Y-axis direction are arranged. In each area surrounded by the gate lines G and the data lines D, a pixel (the left-eye pixel 24L or the right-eye pixel 24R) is formed, and the pixel is driven by a TFT arranged near intersections between the gate lines G and the data lines D. In FIG. 10, in order to clarify a connection relation between the pixels and the gate lines G and the data lines D, for example, a pixel connected to a gate line G3 and a data line D2 is denoted as P32.

The configuration of the TFT substrate is not limited to the arrangement in which the gate lines G extend in the X-axis direction and the data lines D extend in the Y-axis direction as illustrated in FIG. 10, but an arrangement in which the data lines D extend in the X-axis direction, and the gate lines G extend in the Y-axis direction may be employed. As the display panel 21, for example, any one of various display devices that are display devices other than the liquid crystal display device such as an organic electro luminescence (EL) device, a quantum dot device, and a field emission device may be used. In addition, the method of driving the display panel 21 is not limited to an active matrix type that uses TFTs or the like but may be a passive matrix type.

The lenticular lens 29 is a lens array in which a plurality of cylindrical lenses 29a are arranged in one dimension. The cylindrical lens 29a is a one-dimensional lens having a semi-cylindrical convex portion which extends in one direction. The arrangement direction of the cylindrical lenses 29a is set to a direction in which a pixel pair formed by the left-eye pixel 24L and the right-eye pixel 24R is repeatedly arranged, in other words, in the X-axis direction, and one cylindrical lens 29a is configured to be in correspondence with one pixel pair.

The cylindrical lens 29a has a lens effect only for a direction orthogonal to the extending direction thereof. The direction having such a lens effect coincides with the direction in which the left-eye pixel 24L and the right-eye pixel 24R are repeatedly arranged. As a result, the cylindrical lens 29a acts as a light beam splitting unit that can split light emitted from the left-eye pixel 24L and light emitted from the right-eye pixel 24R inrespectively-different directions. In this way, the lenticular lens 29 can split an image displayed by the left-eye pixels 24L of each display unit and an image displayed by the right-eye pixels 24R of each display unit in respectively-different directions. The focal distance of the cylindrical lens 29a is set as a distance between a principal point of the cylindrical lens 29a, in other words, the apex of the lens and a pixel surface, in other words, a face on which the left-eye pixel 24L or the right-eye pixel 24R is arranged.

The lenticular lens 29 may be configured such that a lens surface is arranged on a face facing the display panel 21. The optical unit is not limited to the lenticular lens 29, but any one of various optical devices capable of splitting light such as a fly-eye lens, a parallax barrier, or a prism sheet may be used. As the optical unit, for example, a gradient index (GRIN) lens using a liquid crystal, a liquid crystal lens combining a convexo-concave substrate having a lens effect and liquid crystal molecules, a switching parallax barrier using a liquid crystal, or the like may be used.

Next, the appearance of light that is emitted from the 3D display 20 having the configuration described above and is incident to observer's eyes will be described by using a captured image acquired by the imaging unit. FIG. 11 is a perspective view that illustrates an example of the arrangement of the 3D display 20 and the imaging unit 80. In FIG. 11, the position 60 of the observer's left eye and the position 61 of the observer's right eye are illustrated together. Here, for the convenience of description, it is assumed that the left-eye pixels 24L and the right-eye pixels 24R have a strip shape extending in the longitudinal direction of the cylindrical lenses 29a and are arranged in the X-axis direction.

As illustrated in FIG. 11, the imaging unit 80 is arranged at a position for capturing the display surface of the 3D display 20. As this imaging unit 80, an image processing lens system, a general video camera, a digital camera, or the like is used. The imaging unit 80 is fixed to an in-focus position in the +Z direction of the 3D display 20 near the display surface of the display panel 21. The imaging center 81 of the imaging unit 80 coincides with the center 20a of the 3D display 20 and, ideally, is preferably positioned between the left-eye pixel 24L and the right-eye pixel 24R near the center 20a.

Figure 12:
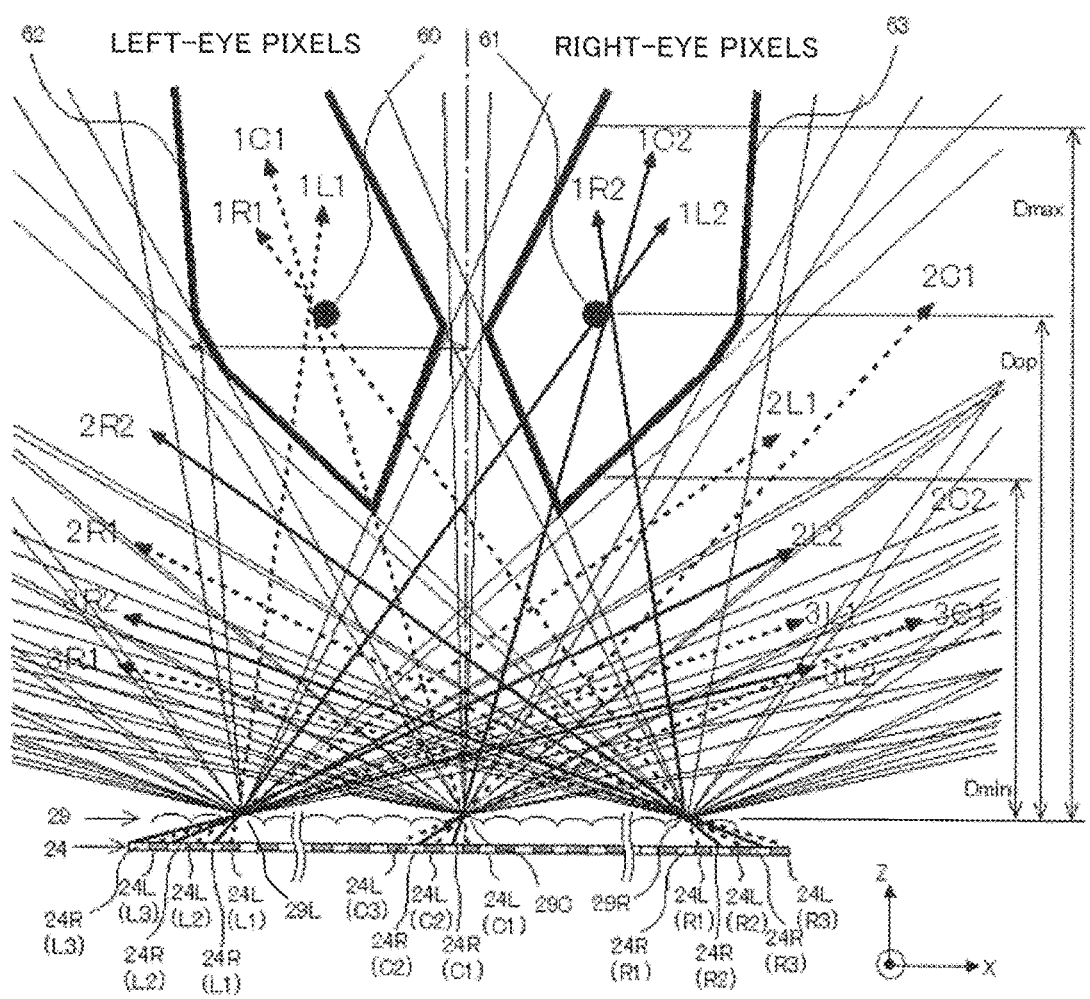
FIG. 12 is an optical path diagram that illustrates a stereoscopic viewing area formed when a lenticular lens is used as an optical unit of the 3D display.

FIG. 12 is an optical path diagram that illustrates a stereoscopic viewing area formed when the lenticular lens 29 is used as the optical unit of the 3D display 20.

In the display panel 21, left-eye pixels 24L (L1 to L3), (C1 to C3), and (R1 to R3) and right-eye pixels 24R (L1 to L3), (C1 to C2), and (R1 to R3) are sequentially arranged in the X-axis direction. A cylindrical lens 29L corresponds to the left-eye pixels 24L (L1 to L3) and the right-eye pixels 24R (L1 to L3), a cylindrical lens 29C corresponds to the left-eye pixels 24L (C1 to C3) and the right-eye pixels 24R (C1 to C2), and a cylindrical lens 29R corresponds to the left-eye pixels 24L (R1 to R3) and the right-eye pixels 24R (R1 to R3).

In FIG. 12, optical paths 1L1, 2L1, and 3L1 illustrate optical paths of light that is emitted from the left-eye pixels 24L (L1 to L3) and is refracted by the cylindrical lens 29L, and optical paths 1L2, 2L2, and 3L2 illustrate optical paths of light that is emitted from the right-eye pixels 24R (L1 to L3) and is refracted by the cylindrical lens 29L. In addition, optical paths 1C1, 2C1, and 3C1 illustrate optical paths of light that is emitted from the left-eye pixels 24L (C1 to C3) and is refracted by the cylindrical lens 29C, and optical paths 1C2 and 2C2 illustrate optical paths of light that is emitted from the right-eye pixels 24R (C1 to C2) and is refracted by the cylindrical lens 29C. Similarly, optical paths 1R1, 2R1, and 3R1 illustrate optical paths of light that is emitted from the left-eye pixels 24L (R1 to R3) and is refracted by the cylindrical lens 29R, and optical paths 1R2, 2R2, and 3R2 illustrate optical paths of light that is emitted from the right-eye pixels 24R (R1 to R3) and is refracted by the cylindrical lens 29R.

Actual light traveling on an optical path has a width of a predetermined angle in the clockwise direction or the counterclockwise direction with respect to such an optical path. In an area including an intersection of the optical paths 1L1, 1C1, and 1R1, a left-eye image area 62 is formed, and, in an area including an intersection of the optical paths 1L2, 1C2, and 1R2, a right-eye image area 63 is formed. The left-eye image area 62 and the right-eye image area 63 become a stereoscopic visual recognition range for which stereoscopic viewing can be formed. Thus, when the position 60 of the left eye is located in the left-eye image area 62, and the position 61 of the right eye is located in the right-eye image area 63, an observer can correctly visually recognize a stereoscopic image.

A distance between a position at which the stereoscopic visual recognition range is a maximum (in other words, a distance between the left-eye image area 62 and the right-eye image area 63 in the X-axis direction is a maximum) and the position of the lenticular lens 29 is set as an optimal stereoscopic visual recognition distance Dop, and distances between positions at which the Y-axis directions of the left and right eyes and the left-eye image area 62, and the right-eye image area 63 intersect and the position of the lenticular lens 29 are set as a maximum stereoscopic visual recognition distance Dmax and a minimum stereoscopic visual recognition distance Dmin.

Here, when focusing on the cylindrical lens 29L, light contributing to the formation of the left-eye image area 62 and the right-eye image area 63 is only light (1L1 and 1L2) emitted from the left-eye pixel 24L (L1) and the right-eye pixel 24R (L1). This is defined as primary light. In addition, light (2L1 and 2L2) that is emitted from the left-eye pixel 24L (L2) or the right-eye pixel 24R (L2), which is a neighboring pixel of the left-eye pixel 24L (L1) or the right-eye pixel 24R (L1), and is refracted by the cylindrical lens 29L is defined as secondary light. Similarly, light (3L1 and 3L2) that is emitted from the left-eye pixel 24L (L3) or the right-eye pixel 24R (L3), which is a second neighboring pixel of the left-eye pixel 24L (L1) or the right-eye pixel 24R (L1), and is refracted by the cylindrical lens 29L is defined as tertiary light. Similarly, also for light relating to the cylindrical lens 29C or 29R, primary light contributes to the formation of the left-eye image area 62 and the right-eye image area 63.

As can be understood from the optical path diagram of FIG. 12, when a space between the observer and the lenticular lens 29 is shorter than the minimum stereoscopic visual recognition distance Dmin, the influence of light of a high order such as the secondary light or the tertiary light emitted from the left and right sides of the display panel 21 is actualized.

Figure 13:
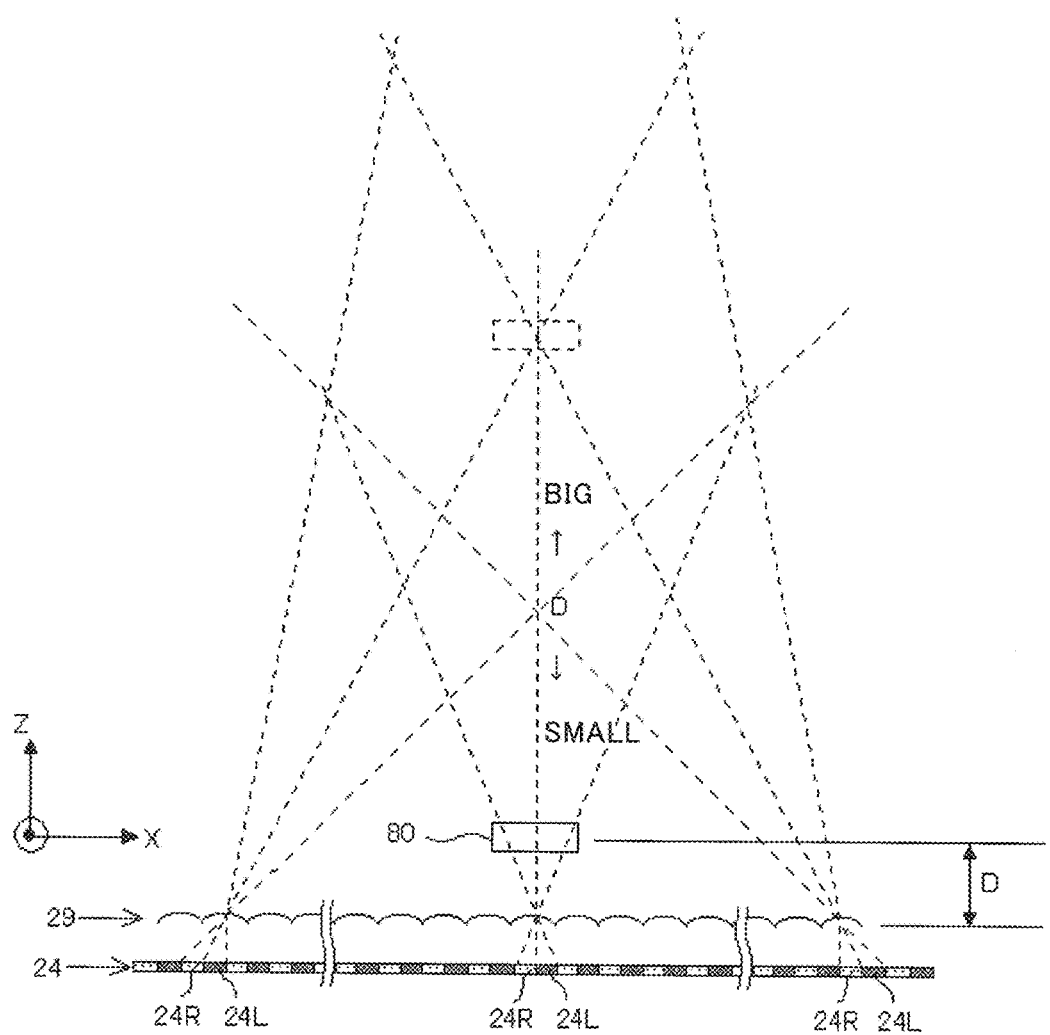
FIG. 13 is an example of a case where the imaging unit is arranged on a center line of the 3D display, and a space D between the imaging unit and the lenticular lens is changed.
Figure 15:
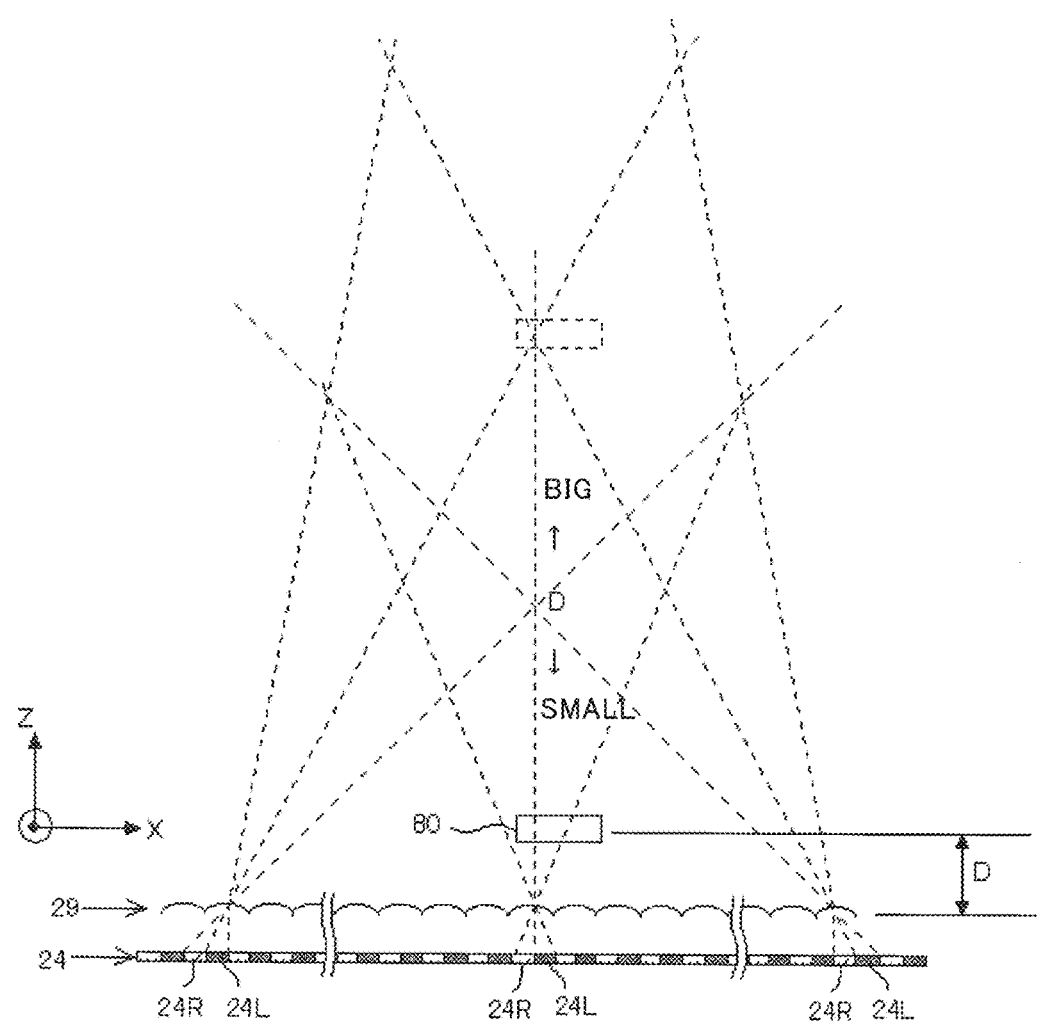
FIG. 15 is an example of a case where the imaging unit is arranged to be shifted to the right side (right-eye side) with respect to the center line of the 3D display, and the space D between the imaging unit and the lenticular lens is changed.
Figure 16:
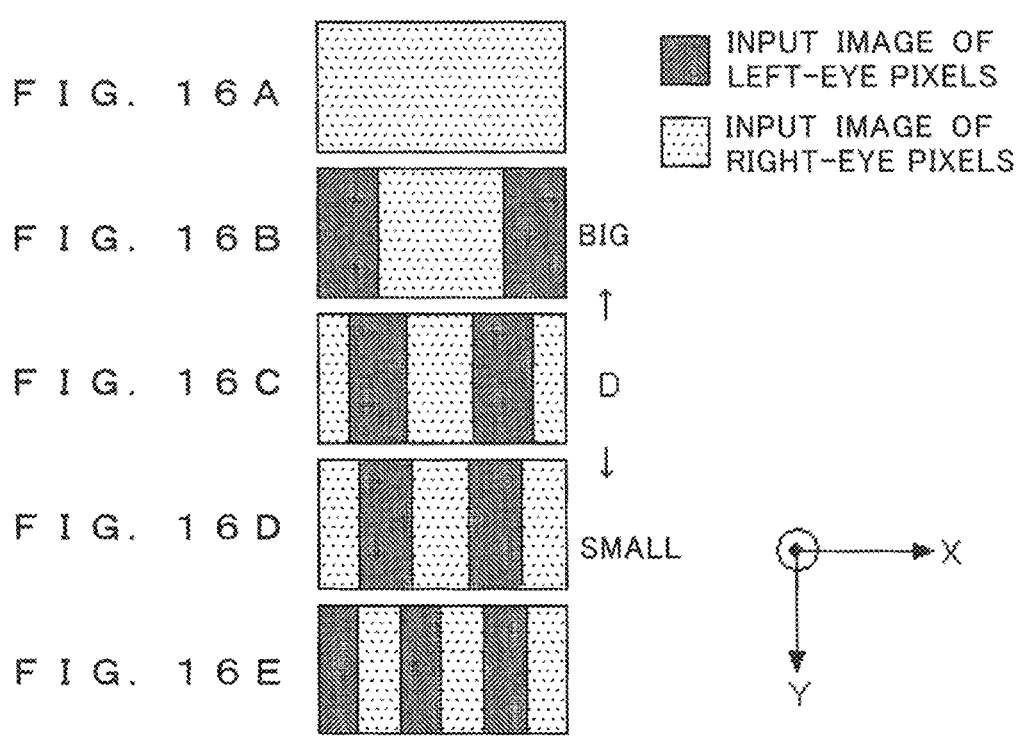
FIGS. 16A to 16E are diagrams that illustrate a correspondence relation between the space between the lenticular lens and the imaging unit and a captured image in the configuration illustrated in FIG. 15.
Figure 18:
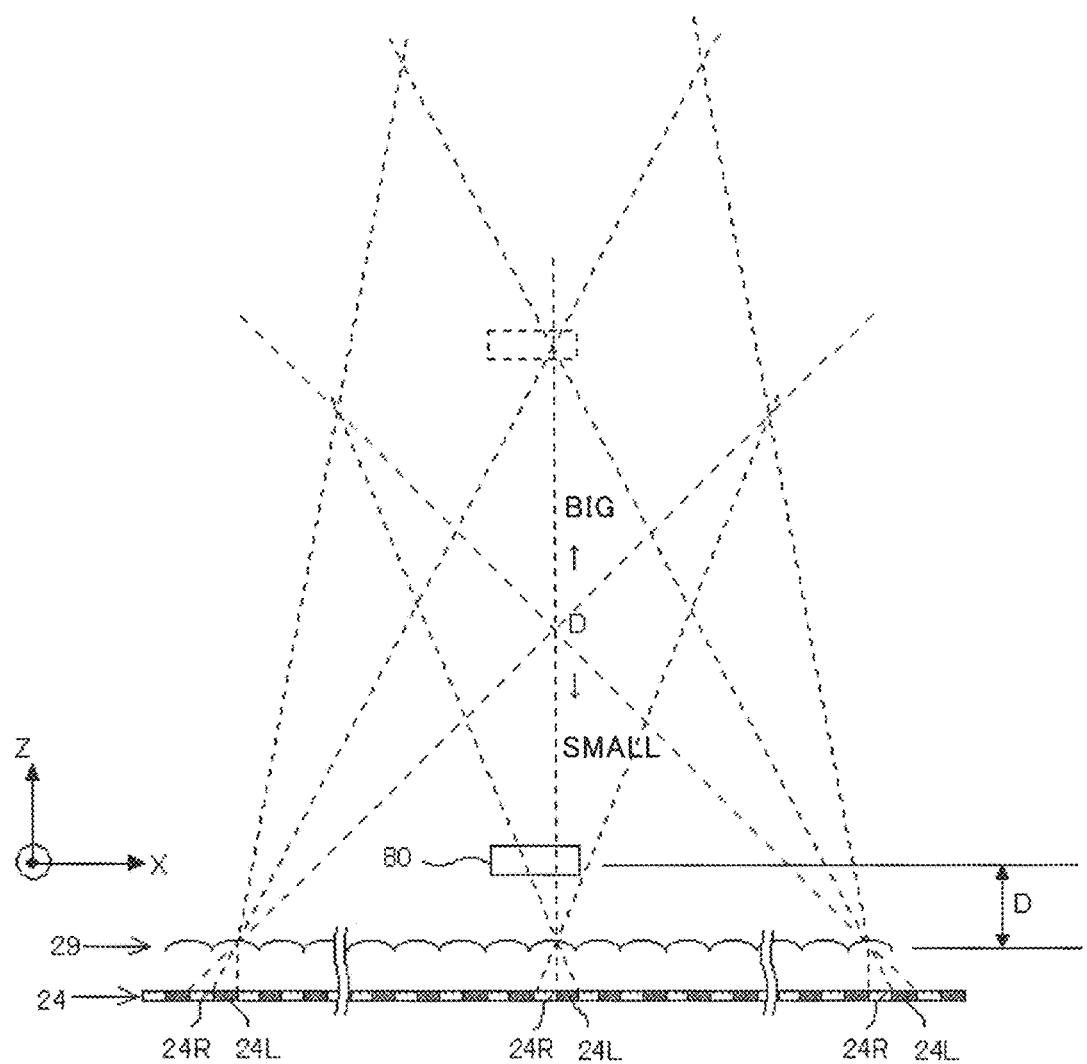
FIG. 18 is an example of a case where the imaging unit is arranged to be shifted to the left side (left-eye side) with respect to the center line of the 3D display, and the space D between the imaging unit and the lenticular lens is changed.
Figure 19:
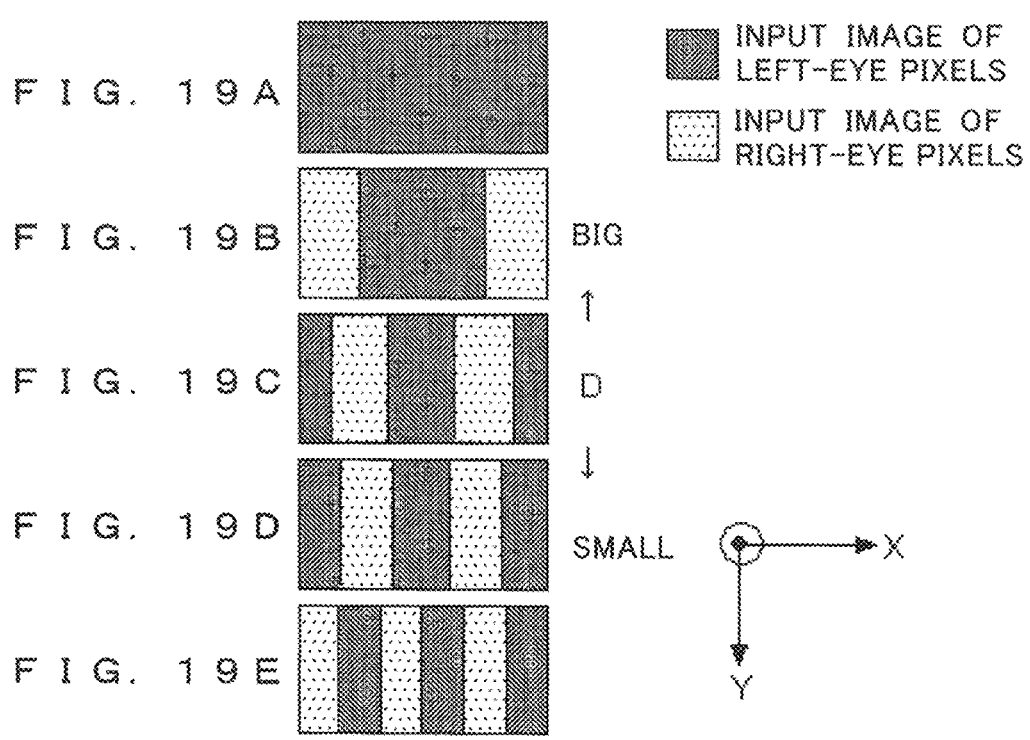
FIGS. 19A to 19E are diagrams that illustrate a correspondence relation between the space between the lenticular lens and the imaging unit and a captured image in the configuration illustrated in FIG. 18.

Next, a captured image acquired when the space D between the imaging unit 80 and the lenticular lens 29 is changed will be described. In FIGS. 13, 15, and 18, for easy understanding of optical paths, only the optical paths of the primary light are illustrated.

FIG. 13 is an example of a case where the imaging unit 80 is arranged on a center line of the 3D display 20 and the space D between the imaging unit 80 and the lenticular lens 29 is changed. FIGS. 14A to 14E are diagrams that illustrate a correspondence relation between a space between the lenticular lens and the imaging unit and a captured image in the configuration illustrated in FIG. 13. In this case, when the space D is near the optimal stereoscopic visual recognition distance Dop, as illustrated in FIGS. 14A and 14B, in an image captured by the imaging unit 80, the left side is an input image of the left-eye pixel 24L, and the right side is an input image of the right-side pixel 24R. In contrast to this, when the space D gradually decreases (for example, when the space is about ⅓ of the optimal stereoscopic visual recognition distance Dop), as illustrated in FIG. 14C, due to the influence of the secondary light, the input image of the right-eye pixel 24R appears on the left side of the captured image, and the input image of the left-eye pixel 24L appears on the right side. When the space D further decreases (for example, when the space is about ¼ of the optimal stereoscopic visual recognition distance Dop), as illustrated in FIGS. 14D and 14E, due to the influence of the tertiary light, the input image of the left-eye pixel 24L appears on the left side of the captured image, and the input image of the right-eye pixel 24R appears on the right side. In other words, as the space D between the imaging unit 80 and the lenticular lens 29 becomes small with respect to the optimal stereoscopic visual recognition distance Dop, due to the influence of the light of a high order that is the secondary light or the tertiary light, the captured image becomes repetition of the input image of the left-eye pixel 24L and the input image of the right-eye pixel 24R.

FIG. 15 is an example of a case where the imaging unit 80 is arranged to be shifted to the right side (right-eye side) with respect to the center line of the 3D display 20, and the space D between the imaging unit 80 and the lenticular lens 29 is changed. FIGS. 16A to 16E are diagrams that illustrate a correspondence relation between the space between the lenticular lens and the imaging unit 80, and a captured image in the configuration illustrated in FIG. 15. In this case, when the space D is near the optimal stereoscopic visual recognition distance Dop, as illustrated in FIG. 16A, an image captured by the imaging unit 80 is only the input image of the right-eye pixel 24R. When the space D further decreases and becomes about ½ of the optimal stereoscopic visual recognition distance Dop, as illustrated in FIG. 16B, the input image of the left-eye pixel 24L appears on both sides of the captured image. When the space D further decreases and becomes about ⅓ to ¼ of the optimal stereoscopic visual recognition distance Dop, as illustrated in FIGS. 16C and 16D, due to the influence of the secondary light, the input image of the right-eye pixel 24R appears on both side of the captured image. Furthermore, when the space D further decreases and becomes about ¼ of the optimal stereoscopic visual recognition distance Dop or less, as illustrated in FIG. 16E, due to the influence of the tertiary light, the input image of the left-eye pixel 24L appears on the left side of the captured image.

The reason for forming such a captured image is that the captured image is formed by mixing the primary light configuring a main lobe that is a front stereoscopic viewing area including a normal line passing through the center of the display surface of the 3D display 20 and light of a high order configuring another lobe (side lobe) that is a stereoscopic viewing area disposed on the outer side of the main lobe in the X-axis direction. FIG. 17 is a diagram that illustrates the configuration of each captured image illustrated in FIG. 15. For example, as illustrated in FIG. 17, while the input image of the right-eye pixel 24R is captured according to the primary light configuring the main lobe regardless of the space D between the imaging unit 80 and the lenticular lens 29, as the space D decreases, due to the influence of light of a high order configuring another lobe, the input image of the left-eye pixel 24L is captured much. As a result, in a case where the space D is the optimal stereoscopic visual recognition distance Dop (for example, 600 mm), the captured image is only the input image of the right-eye pixel 24R according to the primary light configuring the main lobe. However, in a case where the space D is 0.5×Dop (for example, 300 mm), the captured image is an image acquired by composing the input image of the right-eye pixel 24R according to the primary light configuring the main lobe and the input images of the left-eye pixel 24L on both sides according to light of a high order configuring another lobe, and the captured image has a configuration in which the input image of the right-eye pixel 24R is arranged at the center, and the input image of the left-eye pixel 24L is arranged on both sides thereof. In addition, in a case where the space D is 0.33×Dop (for example, 200 mm) or 0.28× Dop (for example, 170 mm), the input image of the left-eye pixel 24L according to the light of a high order configuring another lobe is shifted to the center, and accordingly, the captured image has a configuration in which the input image of the right-eye pixel 24R is arranged at the center, the input image of the left-eye pixel 24L is arranged on both sides thereof, and the input image of the right-eye pixel 24R is arranged on both sides thereof. Furthermore, in a case where space D is 0.23×Dop (for example, 140 mm), the input image of the left-eye pixel 24L according to the light of a high order configuring another lobe is further shifted to the center, and the input image of the left-eye pixel 24L appears on the further outer side, whereby the captured image has a configuration in which the input image of the left-eye pixel 24L and the input image of the right-eye pixel 24R are arranged to be repeated three times.

FIG. 18 is an example of a case where the imaging unit 80 is arranged to be shifted to the left side (left-eye side) with respect to the center line of the 3D display 20, and the space D between the imaging unit 80 and the lenticular lens is changed. FIGS. 19A to 19E are diagrams that illustrate a correspondence relation between the space between the lenticular lens and the imaging unit 80 and a captured image in the configuration illustrated in FIG. 18. In this case, when the space D is near the optimal stereoscopic visual recognition distance Dop, as illustrated in FIG. 19A, an image captured by the imaging unit 80 is only the input image of the left-eye pixel 24L. When the space D further decreases and becomes about ½ of the optimal stereoscopic visual recognition distance Dop, as illustrated in FIG. 19B, the input image of the right-eye pixel 24R appears on both sides of the captured image. When the space D further decreases and becomes about ⅓ to ¼ of the optimal stereoscopic visual recognition distance Dop, as illustrated in FIGS. 19C and 19D, due to the influence of the secondary light, the input image of the left-eye pixel 24L appears on both side of the captured image. Furthermore, when the space D further decreases and becomes about ¼ of the optimal stereoscopic visual recognition distance Dop or less, as illustrated in FIG. 19E, due to the influence of the tertiary light, the input image of the right-eye pixel 24R appears on the left side of the captured image.

FIG. 20 is a diagram that illustrates the configuration of the captured images illustrated in FIGS. 19A to 19E. In this case, example, as illustrated in FIG. 20, while the input image of the left-eye pixel 24L is captured according to the primary light configuring the main lobe regardless of the space D between the imaging unit 80 and the lenticular lens 29, as the space D decreases, due to the influence of light of a high order configuring another lobe, the input image of the right-eye pixel 24R is captured much. As a result, the captured image has a configuration in which the input image of the left-eye pixel 24L and the input image of the right-eye pixel 24R illustrated in FIG. 17 are interchanged.

In other words, when the space D between the imaging unit 80 and the lenticular lens 29 decreases, due to the influence of light of a high order, the captured image has a configuration in which the input image of the left-eye pixel 24L and the input image of the right-eye pixel 24R are arranged to be repeated, and, when the position of the imaging unit 80 deviates from the center line of the 3D display 20, an image according to the primary light configuring the main lobe and an image according to light of a high order configuring another lobe change according to the deviation.

Next, a case will be described in which the spatial imaging device 30 is combined with the 3D display 20. Hereinafter, the spatial imaging device 30 is assumed to have a configuration in which a pole or a hole serving as the dihedral corner reflector is formed to be inclined with respect to the normal line of the principal face of the flat plate, and the plane of the spatial imaging device 30 is assumed to be arranged to be in parallel with the display surface of the 3D display 20.

Figure 21A:
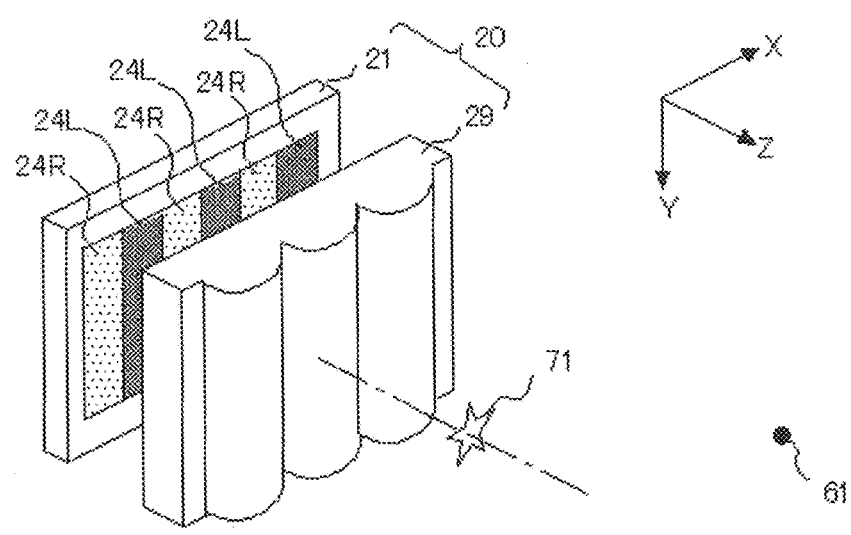
FIGS. 21A and 21B are schematic diagrams that illustrate popup parallax in the 3D display.
Figure 21B:
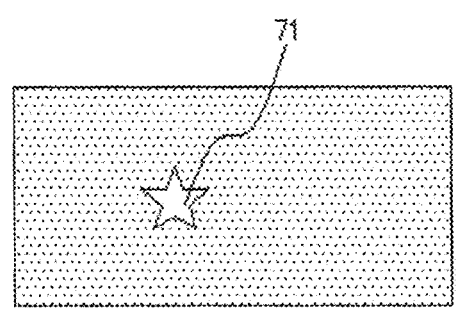
Figure 22A:
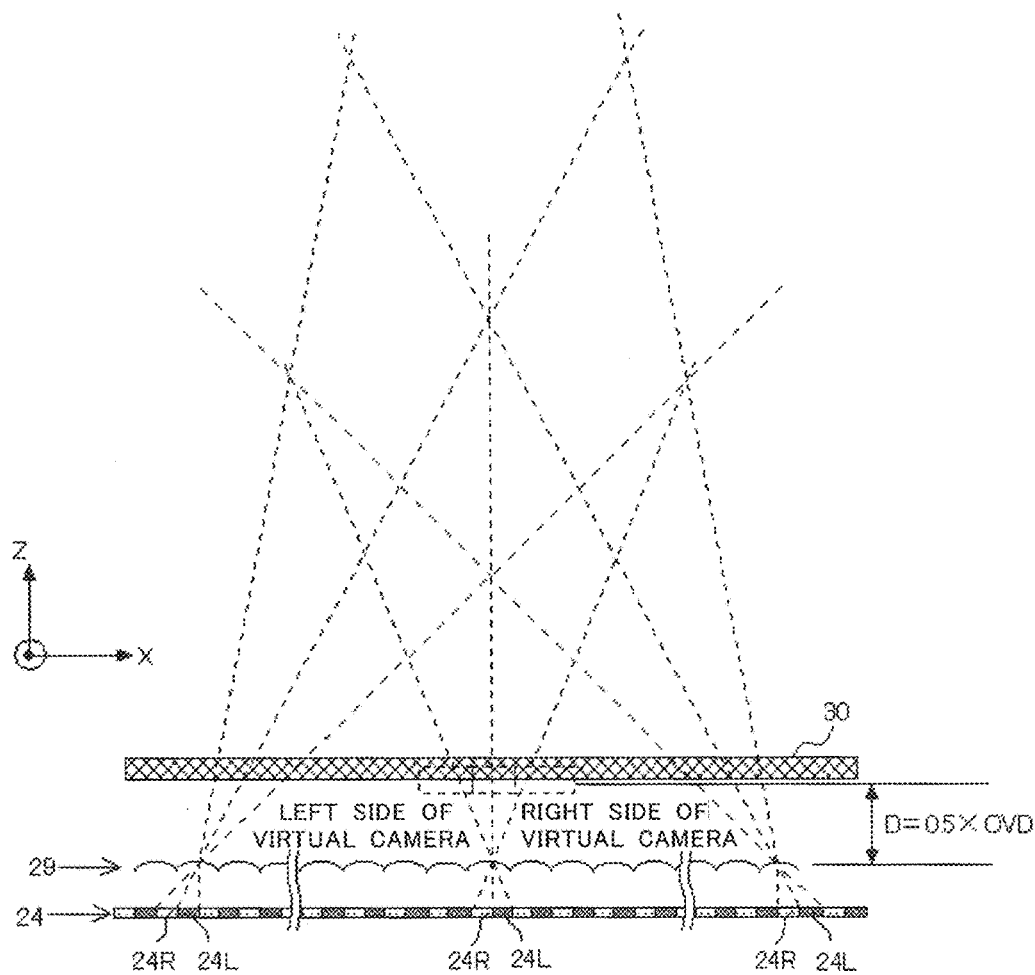
FIGS. 22A, 22B, and 22C are diagrams that illustrate reverse viewing in the stereoscopic display device.
Figure 22B:
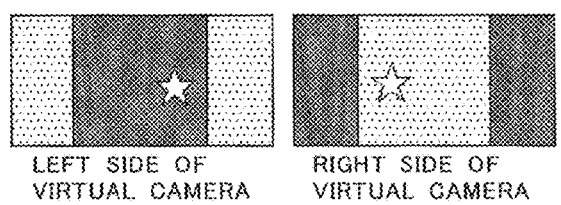
Figure 22C:
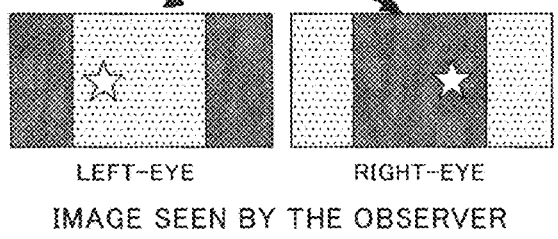

FIGS. 21A and 21B are schematic diagrams that illustrate popup parallax in the 3D display 20. Here, in a case where an input image in which an object 71 having a star shape is arranged on a slight right side from the center is displayed in the left-eye pixel 24L of the display panel 21 as illustrated on the left side of FIG. 21B, and an input image in which the object 71 having the star shape is arranged on a slightly left side from the center is displayed in the right-eye pixel 24R as illustrated on the right side of FIG. 21B, as illustrated in FIG. 21A, popup parallax causing the object 71 having the star shape to be visually recognized as if it pops up in the air is formed. In contrast to this, for example, in a case where the spatial imaging device 30 is arranged at a position of D=0.5×Dop as illustrated in FIG. 22A, an image captured by a virtual camera that is virtually arranged at the position of the spatial imaging device 30 is as illustrated in FIG. 22B based on FIGS. 17 and 20. Here, since the spatial imaging device 30 is a reflection optical system, and light beams emitted from the spatial imaging device 30 are in the same direction as the incidence direction, an image seen by the observer is horizontally reversed. As a result, the image seen by the observer is as illustrated in FIG. 22C, and the input image of the right-eye pixel 24R is arranged at the center of the image that is visually recognized by the left eye, and the input image of the left-eye pixel 24L is arranged at the center of the image that is visually recognized by the right eye. In other words, so-called reverse viewing in which the popup parallax becomes depth parallax occurs.

As above, according to the observation of the inventors of the present application, it has been determined that reverse viewing occurs in a case where the 3D display 20 and the spatial imaging device 30 are combined. Accordingly, in the stereoscopic display device 10 of this embodiment, the image processing unit 50 is arranged, image processing for horizontally reversing areas (a left-eye image and a right-eye image of areas in which reverse viewing occurs are interchanged) in which reverse viewing of input images input from the image signal input unit 40 occurs (the depth parallax and the popup parallax are reversed) is executed, and image data after the image processing is output to the 3D display 20.

Figure 23:
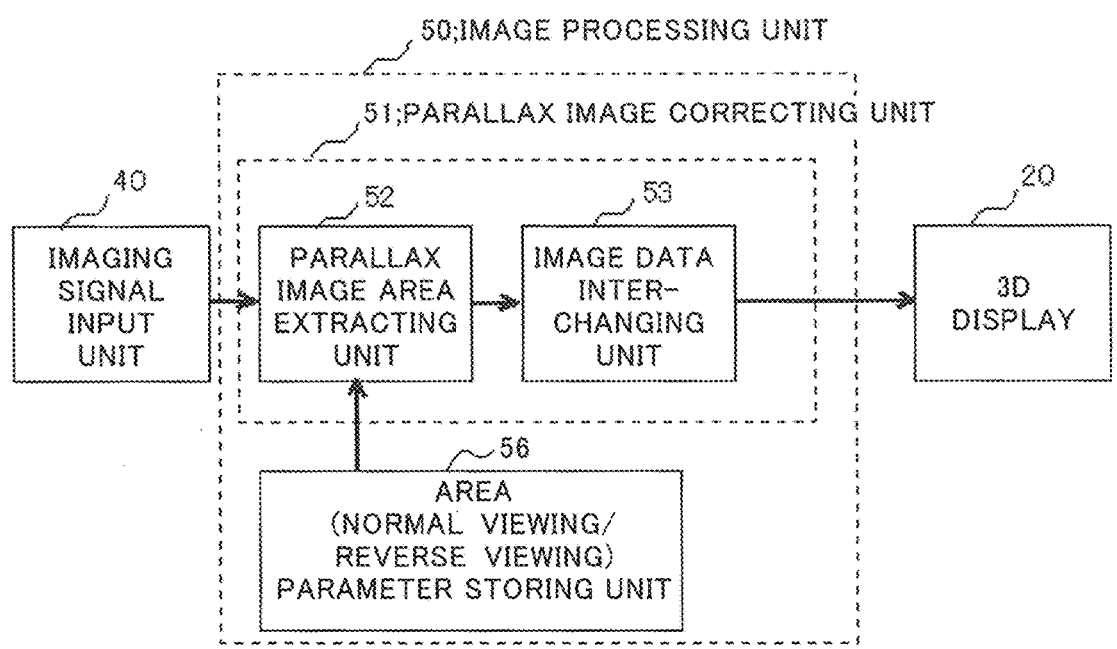
FIG. 23 is a block diagram that illustrates an example of the configuration of an image processing unit of a stereoscopic display device according to a first embodiment of the present invention.

FIG. 23 is a block diagram that illustrates an example of the configuration of the image processing unit 50 of the stereoscopic display device 10 according to the first embodiment of the present invention. This image processing unit 50, as illustrated in FIG. 23, is configured by a parallax image correcting unit 51 and an area parameter storing unit 56, and the parallax image correcting unit 51 is configured by a parallax image area extracting unit 52 and an image data interchanging unit 53.

The parallax image area extracting unit 52 of the parallax image correcting unit 51 acquires captured images corresponding to two viewpoints or a set of a captured image corresponding to one viewpoint and a virtual viewpoint image from the image signal input unit 40 and extracts areas (parallax image areas) in which reverse viewing occurs (the depth parallax and the popup parallax are reversed) based on predetermined conditions such as the angle (eye viewing space (EVS) angle) of the primary light configuring the main lobe, a distance between the 3D display 20 and the spatial imaging device 30, a distance between the spatial imaging device 30 and the observer, and the aspect ratio (for example, the ratio between the opening width and the opening height of the dihedral corner reflector) of the spatial imaging device 30.

For example, when the EVS angle, the distance between the 3D display 20 and the spatial imaging device 30, or the distance between the spatial imaging device 30 and the observer decreases, the number of pixels of the repetition of the left-eye image and the right-eye image increases. In addition, in a case where the distance between the 3D display 20 and the space imaging device 30 or the distance between the space imaging device 30 and the observer is outside a predetermined range, the main lobe image does not appear at the center of visually-recognized images of the left and right eyes. Also in a case where the distance between the 3D display 20 and the space imaging device 30 as well as the distance between the space imaging device 30 and the observer is outside a predetermined range, the main lobe image does not appear at the center of visually-recognized images of the left and right eyes. In addition, according to the aspect ratio of the spatial imaging device 30, the positions or the numbers of repetitions of pixels of the left-eye image and the right-eye image change. Thus, such conditions are stored in the area parameter storing unit 56, and, when input images are acquired from the image signal input unit 40, the conditions are read from the area parameter storing unit 56, areas in which reverse viewing occurs are specified based on at least one condition among the read conditions, and the specified areas are extracted as parallax image areas. In other words, the positions and the sizes of the main lobe images are determined based on the predetermined conditions described above, and areas in which reverse viewing occurs can be determined based on the positions and the sizes of the main lobe images, and accordingly, parallax image areas are extracted based on the positions and the sizes of the main lobe images.

The EVS angle and the distance between the spatial imaging device 30 and the observer change in accordance with the observer's position. Thus, it may be configured such that cameras are installed to the stereoscopic display device 10, and the image processing unit 50 acquires an image acquired by imaging an observer from an appropriate camera, extracts feature points from the captured image, detects the positions of both eyes, specifies the EVS angle and the distance between the spatial imaging device 30 and an observer based on the positions, the space, and the like of both the eyes, and stores the specified information in the area parameter storing unit 56. Here, as the predetermined condition, while four conditions of the EVS angle, the distance between the 3D display 20 and the spatial imaging device 30, the distance between the spatial imaging device 30 and the observer, and the aspect ratio of the spatial imaging device 30 have been illustrated as examples, other conditions such as characters (for example, the pixel size, the pixel pitch, or the pixel arrangement structure) of the display panel 21 or characteristics (for example, the shape, the pitch, the focal distance, the aberration, or the material of the cylindrical lens 29a) of the lenticular lens 29 may be used. In addition, here, while the aspect ratio of the spatial imaging device 30 has been illustrated as an example of the predetermined condition relating to the characteristics of the spatial imaging device 30, the mirror surface roughness, the mirror assembly precision, the reflectance, or the like of the dihedral corner reflector configuring the spatial imaging device 30 may be used.

The image data interchanging unit 53 of the parallax image correcting unit 51 specifies a left-eye image and a right-eye image corresponding to parallax image areas extracted by the parallax image area extracting unit 52 from input images and, in a case where the boundary positions of the left-eye image and the right-eye image substantially coincide with each other, generates image data acquired by interchanging the images and outputs the generated image data to the 3D display 20.

The area parameter storing unit 56 is a storage unit such as a memory, and stores the predetermined conditions which is referred to by the parallax image area extracting unit 52 at the time of extracting parallax image areas.

The parallax image area extracting unit 52 and the image data interchanging unit 53 may be configured as hardware, or by arranging a control unit including a central processing unit (CPU) and a memory such as a read only memory (ROM) or a random access memory (RAM) in the image processing unit 50 and developing a program stored in the ROM into the RAM and executing the program using the CPU, the control unit may function as the parallax image area extracting unit 52 and the image data interchanging unit 53.

Figure 24:
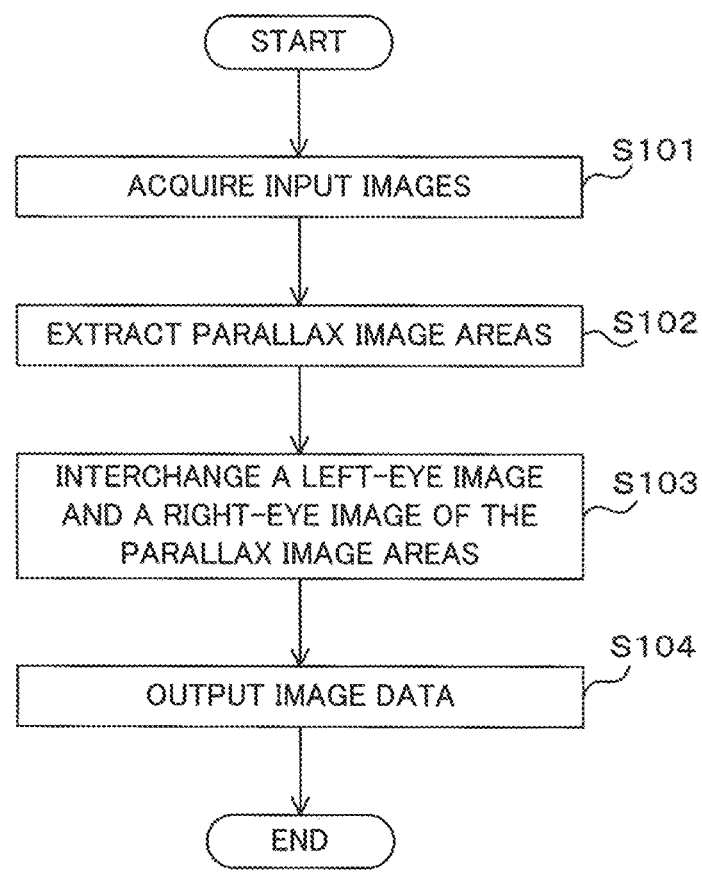
FIG. 24 is a flowchart that illustrates a parallax image correcting method used in the stereoscopic display device according to the first embodiment of the present invention.
Figure 25A:
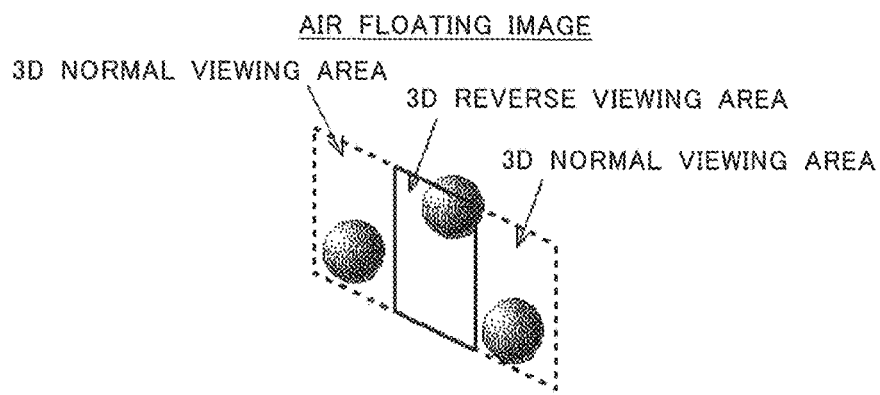
FIGS. 25A, 25B, and 25C are an example of schematic diagrams that illustrate the parallax image correcting method used in the stereoscopic display device according to the first embodiment of the present invention.
Figure 25B:
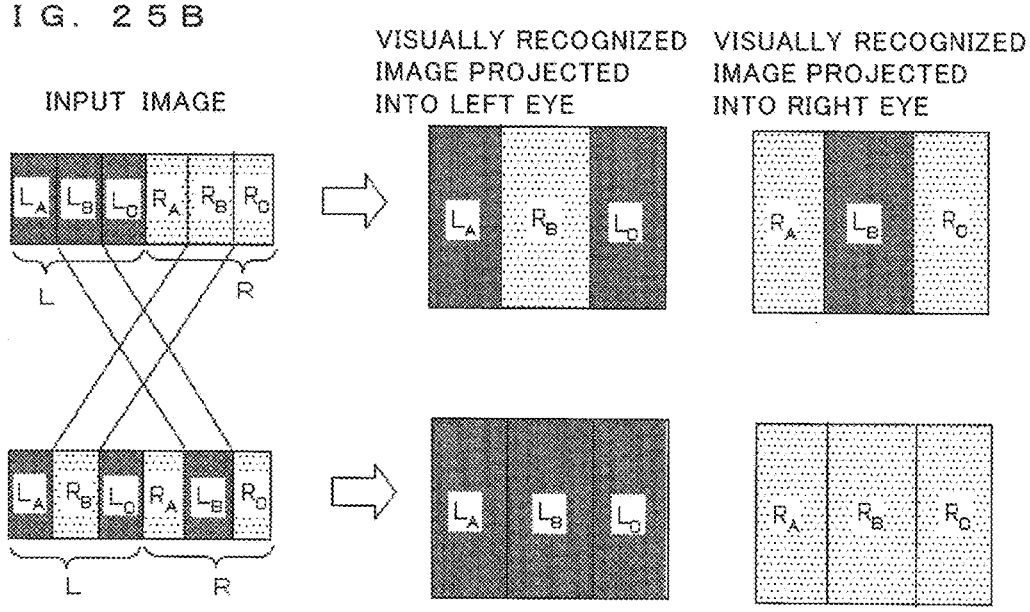
Figure 25C:
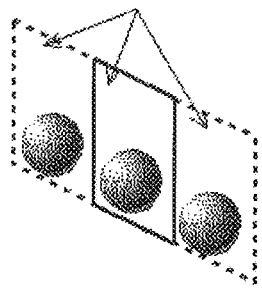

FIG. 24 is a flowchart that illustrates a parallax image correcting method used in the stereoscopic display device 10 according to the first embodiment of the present invention. FIGS. 25A, 25B, and 25C are an example of schematic diagrams that illustrate the parallax image correcting method used in the stereoscopic display device 10 according to the first embodiment of the present invention. The parallax image correcting method using the image processing unit 50 having the configuration described above will be described with reference to the flowchart of FIG. 24 and the conceptual diagrams of FIGS. 25A to 25C.

First, the parallax image area extracting unit 52 acquires input images (captured images corresponding to two viewpoints or a set of a captured image corresponding to one viewpoint and a virtual viewpoint image) from the image signal input unit 40 (S101). Here, as illustrated in FIG. 25A, it is assumed that reverse viewing occurs in the main lobe image.

Next, the parallax image area extracting unit 52 acquires a predetermined condition from the area parameter storing unit 56 and extracts parallax image areas based on the predetermined condition (S102). Here, as the parallax image areas, areas of the main lobe images are extracted.

Next, the image data interchanging unit 53 interchanges a left-eye image and a right-eye image of the parallax image areas (S103). For example, as illustrated in FIG. 25B, in a case where the left-eye image of the input image is configured by images $L_A$, $L_B$, and $L_C$, and the right-eye image is configured by images $R_A$, $R_B$, and $R_C$, the main lobe image $R_B$ of the left-eye image and the main lobe image $L_B$ of the right-eye image are interchanged.

Then, the image data interchanging unit 53 outputs image data acquired by interchanging the left-eye image and the right-eye image of the parallax image areas to the 3D display 20, and the 3D display 20 displays an image on the display panel 21 based on the image data (S104). Here, since the left-eye image and the right-eye image of the main lobe in which reverse viewing occurs are interchanged, as illustrated in FIG. 25C, the observer can visually recognize an air floating image in which all the areas become the 3D normal viewing areas.

Figure 26A:
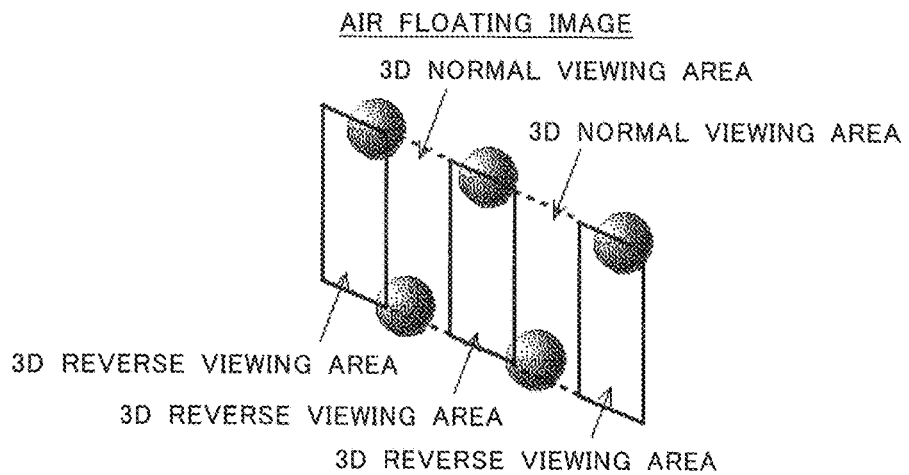
FIGS. 26A, 26B, and 26C are another example of schematic diagrams that illustrate the parallax image correcting method used in the stereoscopic display device according to the first embodiment of the present invention.
Figure 26B:
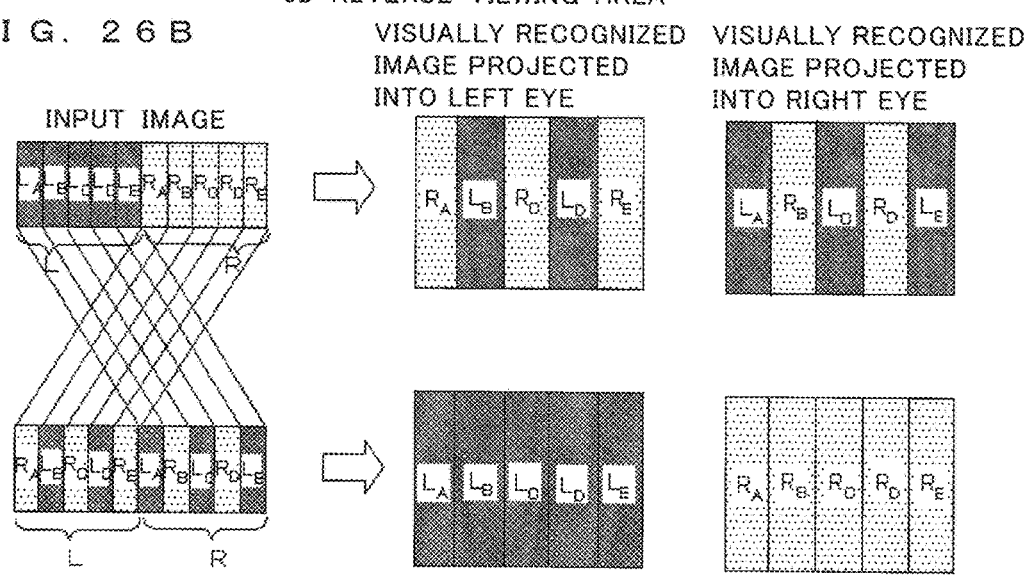
Figure 26C:
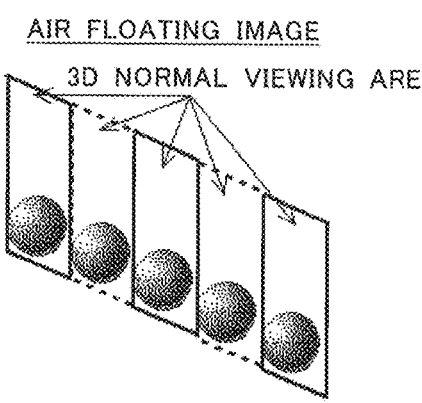

In the description presented above, while a case has been illustrated in which each of the left and right input images is configured by three images including a left image, a center image, and a right image, the description may be similarly applied also to a case where each of the left and right input images is configured by a plurality of areas. FIGS. 26A, 26B, and 26C are another example of schematic diagrams that illustrate the parallax image correcting method used in the stereoscopic display device 10 according to the first embodiment of the present invention. For example, as illustrated in FIGS. 26A to 26C, in a case where each of the left and right input images is configured by five images, when as illustrated in FIG. 26A, the parallax image area extracting unit 52 extracts areas of the main lobe image located at the center and areas of side lobe images disposed at both ends as parallax image areas based on the predetermined condition described above, and, as illustrated in FIG. 26B, the image data interchanging unit 53 interchanges the images $R_A$, $R_C$, and $R_E$ of the left-eye image and the images $L_A$, $L_C$, and $L_E$ of the right-eye image of the input images and outputs the resultant images to the 3D display 20, as illustrated in FIG. 26C, the observer can visually recognize an air floating image in which all the areas become 3D normal viewing areas.

In this way, by extracting parallax image areas in which reverse viewing occurs from the input images and interchanging a left-eye image and a right-eye image corresponding to the parallax image areas, a problem that a 3D normal viewing area and a 3D reverse viewing area alternately appear in the air floating image can be avoided.

The stereoscopic display device 10 according to this embodiment can be applied to any of a case where a 3D object is displayed in monochrome and a case where a 3D object is displayed in colors. In a case where a 3D object is displayed in colors, by configuring the opposing substrate 26 configuring the display panel 21 as a color filter (CF) substrate, the color display can be realized. In such a case, a structure may be employed in which one pair of pixels aligned in a direction (X-axis direction) having the lens effect of the cylindrical lens 29a are configured in a same color, and the color is periodically changed in the longitudinal direction (the Y-axis direction, in other words, for each row) of the cylindrical lens 29a, or a structure in which the X-axis direction and the Y-axis direction are reversed may be employed. In addition, instead of arranging the CF, for example, by configuring the backlight 22 using a light source capable of emitting a single color of each of red (R)/green (G)/blue (B) and displaying a desired pixel in a predetermined gray scale in accordance with the emission time of R/G/B (so-called time-divisional drive), the color display can be realized.

[Second Embodiment]

Figure 27:
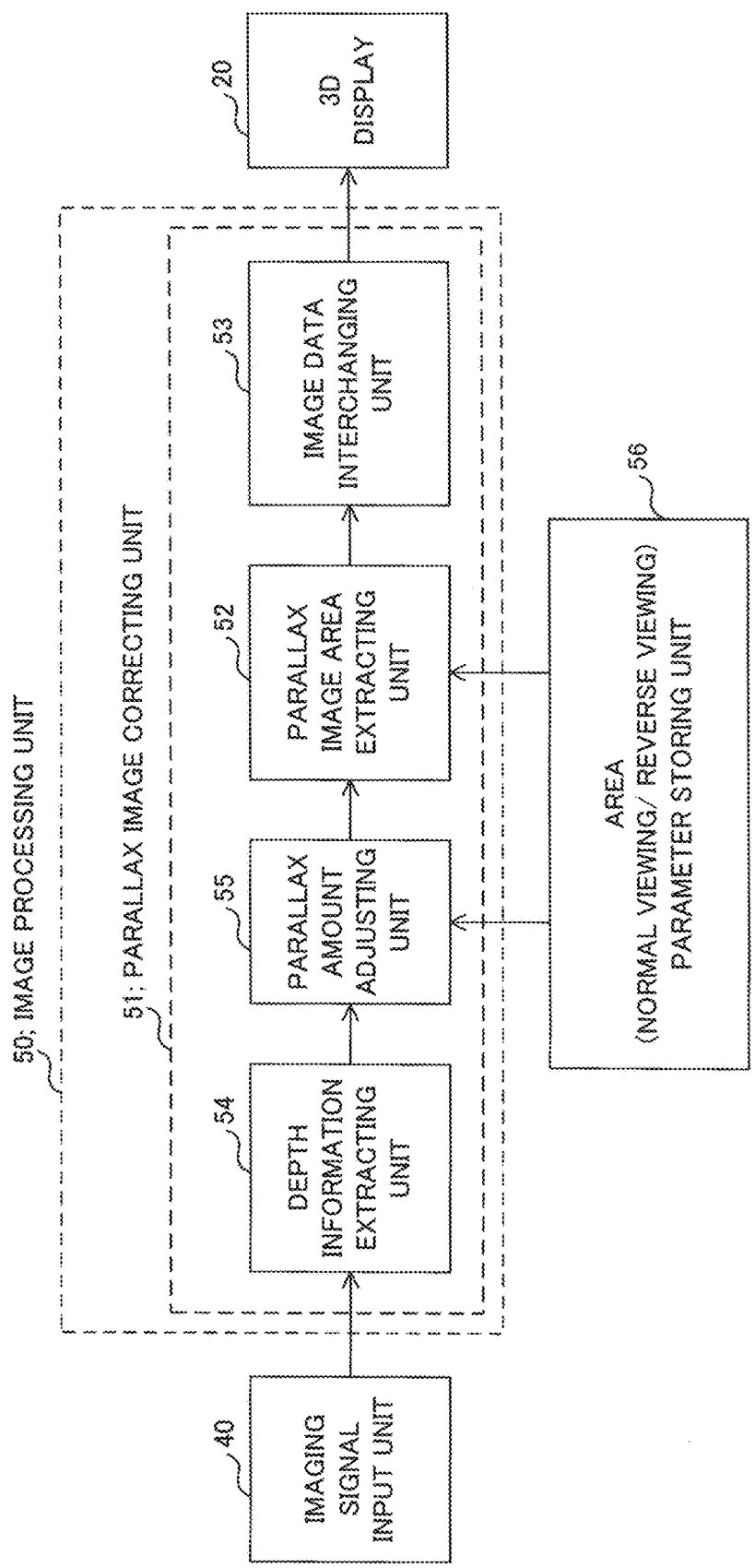
FIG. 27 is a block diagram that illustrates an example of the configuration of an image processing unit according to this embodiment.
Figure 28:
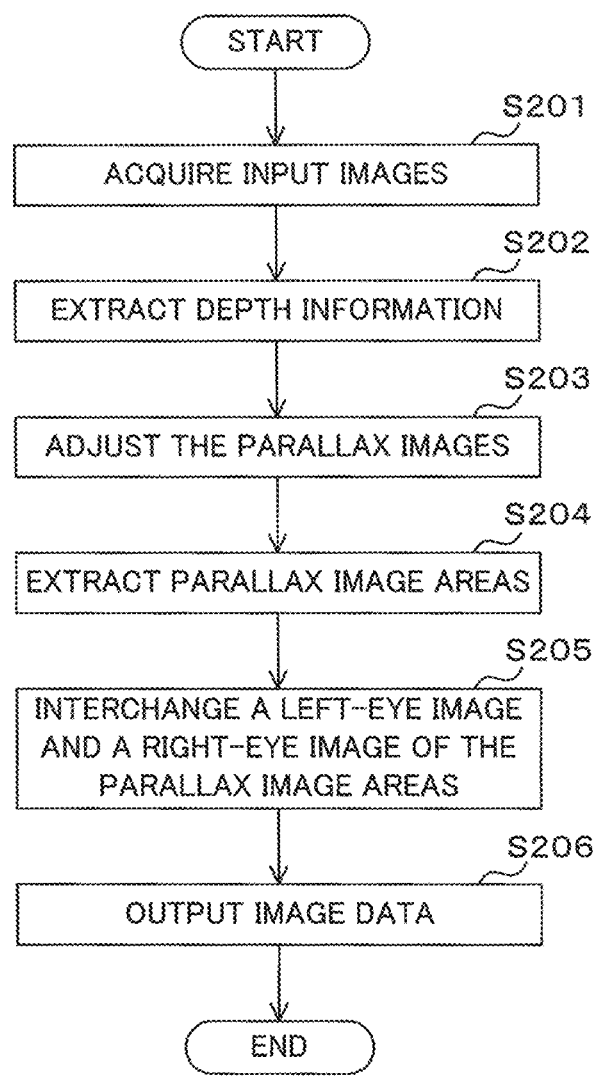
FIG. 28 is a flowchart that illustrates a method of processing a stereoscopic image according to this embodiment.
Figure 29A:
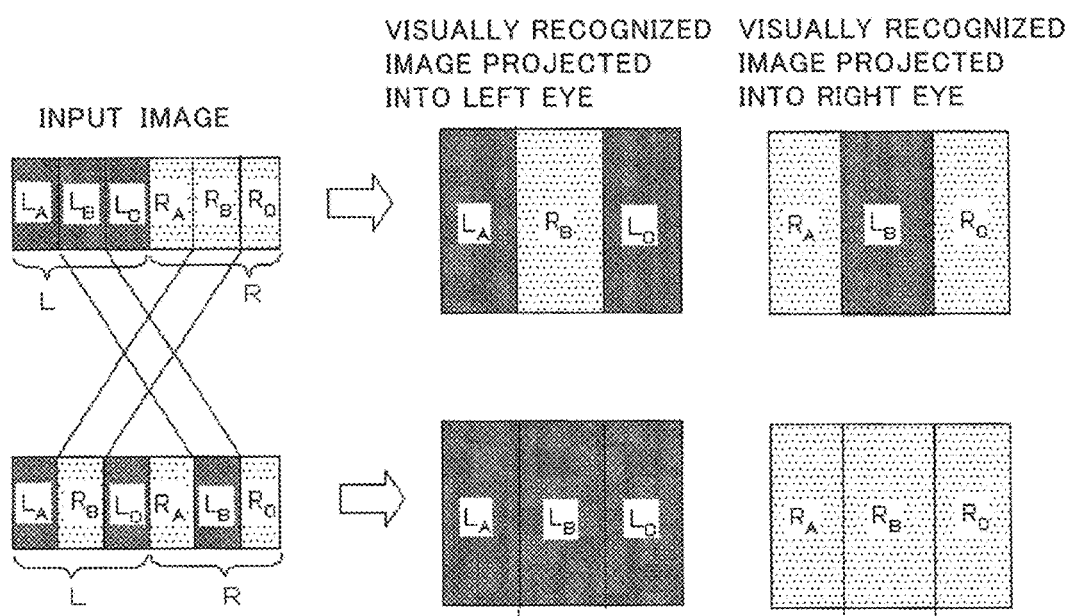
FIGS. 29A, 29B, and 29C are schematic diagrams that illustrate a parallax image correcting method used in a stereoscopic display device according to a second embodiment of the present invention.
Figure 29B:
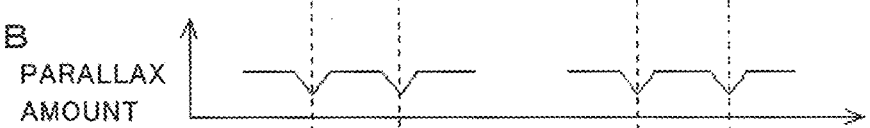
Figure 29C:
Figure 30A:
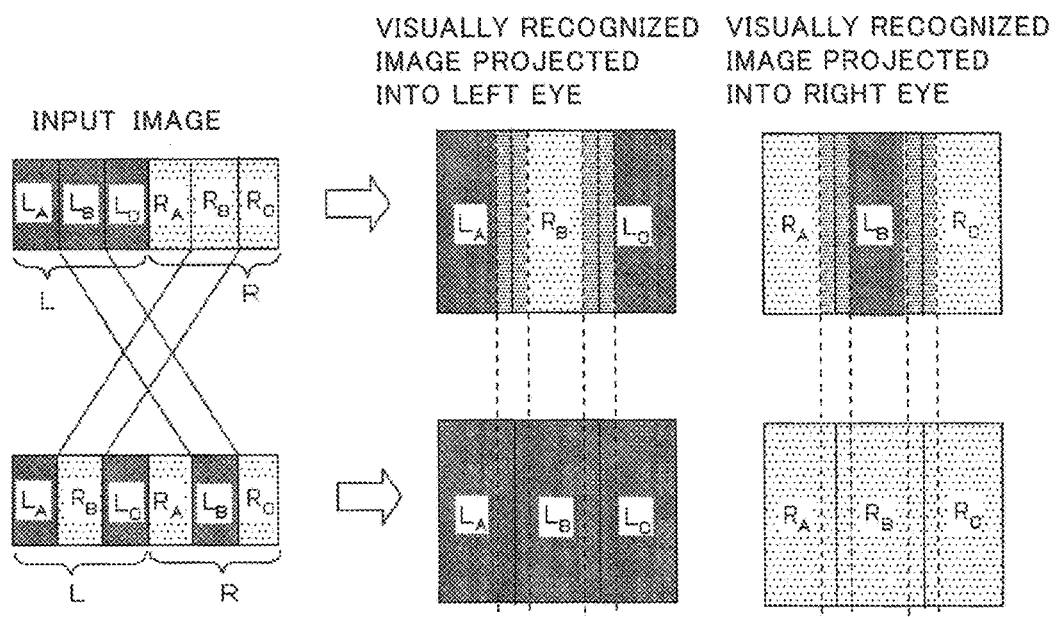
FIGS. 30A, 30B, and 30C are schematic diagrams that illustrate the parallax image correcting method used in the stereoscopic display device according to the second embodiment of the present invention.
Figure 30B:
Figure 30C:
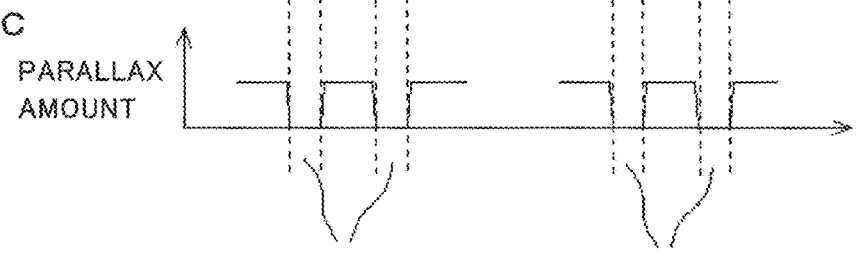

Next, a stereoscopic display device and a parallax image correcting method according to a second embodiment of the present invention will be described with reference to FIGS. 27 to 30. FIG. 27 is a block diagram that illustrates an example of the configuration of an image processing unit according to this embodiment. FIG. 28 is a flowchart that illustrates a method of processing a stereoscopic image according to this embodiment. FIGS. 29A to 29C are schematic diagrams that illustrate the parallax image correcting method used in a stereoscopic display device 10 according to the second embodiment of the present invention. FIGS. 30A, 30B, and 30C are schematic diagrams that illustrate the parallax image correcting method used in the stereoscopic display device 10 according to the second embodiment of the present invention.

In the first embodiment described above, while a left-eye image and a right-eye image of the parallax image areas are interchanged, in a case where the depth (or the popup) states of an image and a replacing image are different from each other or in a case where a depth (or popup) unnaturally changes in a joint between a replacing image and an image adjacent to the image or the depth (or the popup) of the main lobe image is small, there are cases where the stereoscopic effect cannot be sufficiently represented. In addition, depending on the characteristics of the spatial imaging device, there are cases where an area (3D crosstalk area) in which images are mixed near the boundary of the images is large, and a twofold image is visually recognized in the case of the presence of parallax. Thus, in this embodiment, by using the depth information of input images, the amounts of parallax of the input images (the amounts of shift of pixels of the left-eye image and the right-eye image) are adjusted such that an air floating image is appropriately displayed.

In such a case, while the configuration of the stereoscopic display device 10 is similar to that of the first embodiment illustrated in FIGS. 8 to 10, as illustrated in FIG. 27, in addition to a parallax image area extracting unit 52 and an image data interchanging unit 53, a depth information extracting unit 54 and a parallax amount adjusting unit 55 are arranged in a parallax image correcting unit 51 of an image processing unit 50.

In a case where an image signal input unit 40 generates a virtual viewpoint image based on a captured image corresponding to one viewpoint and a depth image, the depth information extracting unit 54 acquires the depth image from the image signal input unit 40 in addition to the captured image corresponding to one viewpoint and a virtual viewpoint image and extracts depth information of each portion of a 3D object based on the depth image. On the other hand, in a case where the depth information extracting unit 54 acquires captured images corresponding to two viewpoints from the image signal input unit 40, by comparing the captured images corresponding to two viewpoints with each other, the depth information of each portion of a 3D object is extracted. Here, the depth image represents a distance between an object corresponding to each pixel of a captured image captured at a viewpoint position at which a 3D space is present and the viewpoint position.

The parallax amount adjusting unit 55 adjusts parallax amounts of input images (a captured image corresponding to one viewpoint and a virtual viewpoint image or captured images corresponding to two viewpoints) based on the depth information extracted by the depth information extracting unit 54. At that time, the parallax amount adjusting unit 55 reads predetermined conditions such as an EVS angle, a distance between the 3D display 20 and the spatial imaging device 30, a distance between the spatial imaging device 30 and an observer, and the aspect ratio of the spatial imaging device 30 from the area parameter storing unit 56 and determines how to adjust the parallax amounts by referring to the predetermined conditions. For example, by interchanging a left-eye image and a right-eye image, there are cases where a depth or popup in a joint between a replacing image and an image adjacent to the image unnaturally changes between the left and right sides of the image. In such cases, by configuring the parallax amounts of both end portions (portions near the boundaries of neighboring images) of the image to be smaller than that parallax amount of a portion other than a portion near the boundary, a connection of the images is smoothed. In a case where the depth or the degree of popup of the main lobe image is small, there are cases where the stereoscopic effect of a 3D object cannot be sufficiently acquired. In such cases, by configuring the parallax amount of the main lobe image (an image of a portion corresponding to a reverse viewing area) to be larger than the parallax amount of an image other than the main lobe image, the stereoscopic effect of the 3D object is intensified. In addition, there are cases where a 3D crosstalk area near the boundary of images is increased by the spatial imaging device, and a twofold image is visually recognized. In such cases, similar to the description presented above, by configuring the parallax amounts of both end portions (portions near the boundaries of neighboring images) of the image to be small or zero, a twofold image cannot be easily recognized visually.

The parallax image area extracting unit 52 acquires images (a captured image corresponding to one viewpoint and a virtual viewpoint image or captured images corresponding to two viewpoints) of which the parallax amounts have been adjusted from the parallax amount adjusting unit 55, reads predetermined conditions such as the EVS angle, the distance between the 3D display 20 and the spatial imaging device 30, and the distance between the spatial imaging device 30 and the observer or the aspect ratio of the spatial imaging device 30 from the area parameter storing unit 56, and extracts areas (parallax image areas) in which reverse viewing occurs based on at least one condition among the predetermined conditions.

Similar to the first embodiment, since the EVS angle and the distance between the spatial imaging device 30 and the observer change in accordance with the observer's position, it may be configured such that cameras are installed to the stereoscopic display device 10, and the image processing unit 50 acquires an image acquired by imaging an observer from an appropriate camera, extracts feature points from the captured image, detects the positions of both eyes, specifies the EVS angle and the distance between the spatial imaging device 30 and an observer based on the positions, the space, and the like of both the eyes, and stores the specified information in the area parameter storing unit 56. Here, as the predetermined conditions, any other conditions such as the characteristics of the display panel 21 or the characteristics of the lenticular lens 29 may be used. In addition, as a predetermined condition relating to the characteristics of the spatial imaging device 30, the mirror surface roughness, the mirror assembly precision, the reflectance, or the like of the dihedral corner reflector configuring the spatial imaging device 30 may be used.

The image data interchanging unit 53 specifies a left-eye image and a right-eye image corresponding to parallax image areas extracted by the parallax image area extracting unit 52 from input images and, in a case where the boundary positions of the left-eye image and the right-eye image substantially coincide with each other, generates image data acquired by interchanging the images and outputs the generated image data to the 3D display 20.

The depth information extracting unit 54, the parallax amount adjusting unit 55, parallax image area extracting unit 52, and the image data interchanging unit 53 may be configured as hardware, or by arranging a control unit including a CPU and a memory such as a ROM or a RAM in the image processing unit 50 and developing a program stored in the ROM into the RAM and executing the program using the CPU, the control unit may function as the depth information extracting unit 54, the parallax amount adjusting unit 55, the parallax image area extracting unit 52, and the image data interchanging unit 53. Similar to the first embodiment described above, by using an opposing substrate 26 in which color filters are formed or a backlight 22 capable of emitting monochrome light of R/G/B, the color display can be performed in the display panel 21 of the 3D display 20 according to this embodiment.

The parallax image correcting method using the image processing unit 50 having the configuration described above will be described with reference to the flowchart of FIG. 28 and the conceptual diagrams of FIGS. 29A to 30C.

First, the depth information extracting unit 54 acquires input images (a set of a captured image corresponding to one viewpoint, a virtual viewpoint image, and a depth image or captured images corresponding to two viewpoints) from the image signal input unit 40 (S201). Then, the depth information extracting unit 54 extracts the depth information of each portion of the 3D object based on a result of the processing of the depth image or the captured images corresponding to two viewpoints (S202).

Next, the parallax amount adjusting unit 55 adjusts the parallax amounts of the input images (a captured image signal corresponding to one viewpoint and a virtual viewpoint image signal or the captured images corresponding to two viewpoints) based on the depth information extracted by the depth information extracting unit 54 and the predetermined conditions acquired from the area parameter storing unit 56 (S203). For example, in a case where a connection between a replacing image and an image adjacent to the image desires to be improved, as illustrated in FIG. 29B, the parallax amount of a portion near the boundary of images is adjusted to be less than the parallax amount of a portion other than the boundary. In addition, in a case where the depth or the popup of the 3D object is desired to be sufficiently represented, as illustrated in FIG. 29C, the parallax amount of the main lobe image is adjusted to be more than the parallax amount of each image other than the main lobe image. Furthermore, in a case where a defect of the visual recognition of a twofold image is desired to be reduced, the parallax amount of a portion near the boundary of images is adjusted to be small. For example, in a case where the 3D crosstalk is small, as illustrated in FIG. 30B, the parallax amount of a portion near the boundary of images is adjusted to be less than the parallax amount of a portion other than the boundary. On the other hand, in a case where the 3D crosstalk is remarkable, as illustrated in FIG. 30C, the parallax amount of the boundary of images is adjusted to be zero.

Next, the parallax image area extracting unit 52 acquires the captured image corresponding to one viewpoint and the virtual viewpoint image that have been adjusted by the parallax amount adjusting unit 55. In addition, the parallax image area extracting unit 52 acquires the predetermined condition from the area parameter storing unit 56. Then, the parallax image area extracting unit 52 extracts parallax image areas based thereon (S204). Here, as the parallax image areas, the areas of the main lobe images are extracted.

Next, the image data interchanging unit 53 interchanges a left-eye image and a right-eye image of the parallax image areas (S205). For example, as illustrated in FIGS. 29A and 30A, in a case where the left-eye image of the input image is configured by images $L_A$, $L_B$, and $L_C$, and the right-eye image is configured by images $R_A$, $R_B$, and $R_C$, the main lobe image $R_B$ of the left-eye image and the main lobe image $L_B$ of the right-eye image are interchanged.

Then, the image data interchanging unit 53 outputs image data acquired by interchanging the left-eye image and the right-eye image of the parallax image areas to the 3D display 20, and the 3D display 20 displays an image on the display panel 21 based on the image data (S206).

In the description presented above, while a case has been illustrated in which each of the left and right input images is configured by three images including a left image, a center image, and a right image, the description may also be similarly applied to a case where each of the left and right input images is configured by a plurality of areas.

In this way, after the adjustment of the parallax amounts based on the depth image, by interchanging the left-eye image and the right-eye image corresponding to the parallax image areas, an air floating image can be appropriately displayed, whereby the utility value of the stereoscopic display device 10 can be raised.

[Third Embodiment]

Next, a stereoscopic display device and a parallax image correcting method according to a third embodiment of the present invention will be described with reference to FIGS. 31A to 38C.

In the first embodiment described above, as illustrated in FIG. 10, the cylindrical lens 29a configuring the lenticular lens 29 are arranged such that the extending direction, and a direction, which is orthogonal to the extending direction, having the lens effect are parallel to the Y direction and the X direction in which pixels are arranged. However, according to the present invention, a 3D display 20 in which the arrangement direction of the cylindrical lenses is arranged to be rotated with respect to the arrangement of pixels may be used. Hereinafter, the description will be presented in detail.

Figure 32:
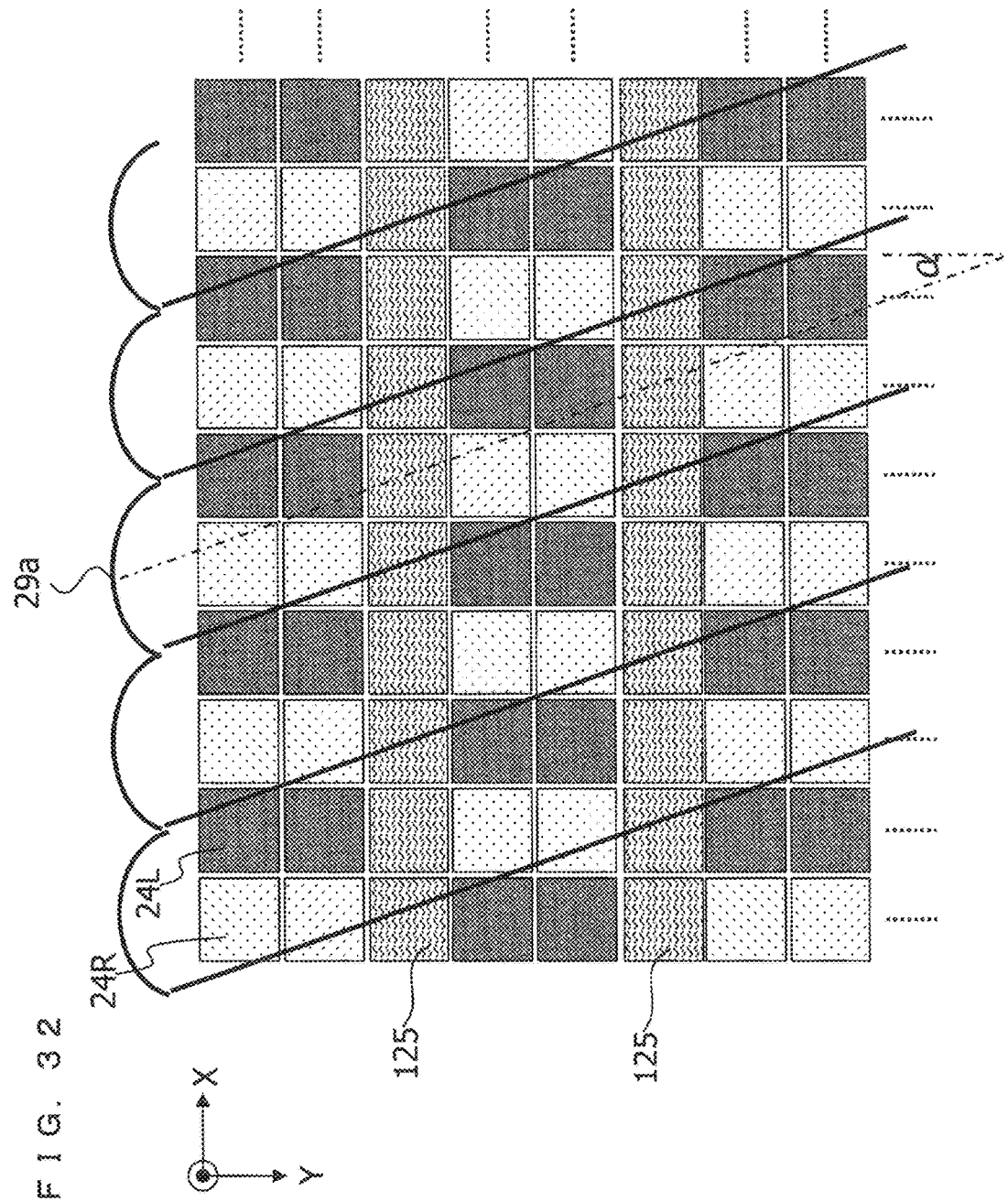
FIG. 32 is a diagram that illustrates the function of the 3D display according to the third embodiment of the present invention.
Figure 33:
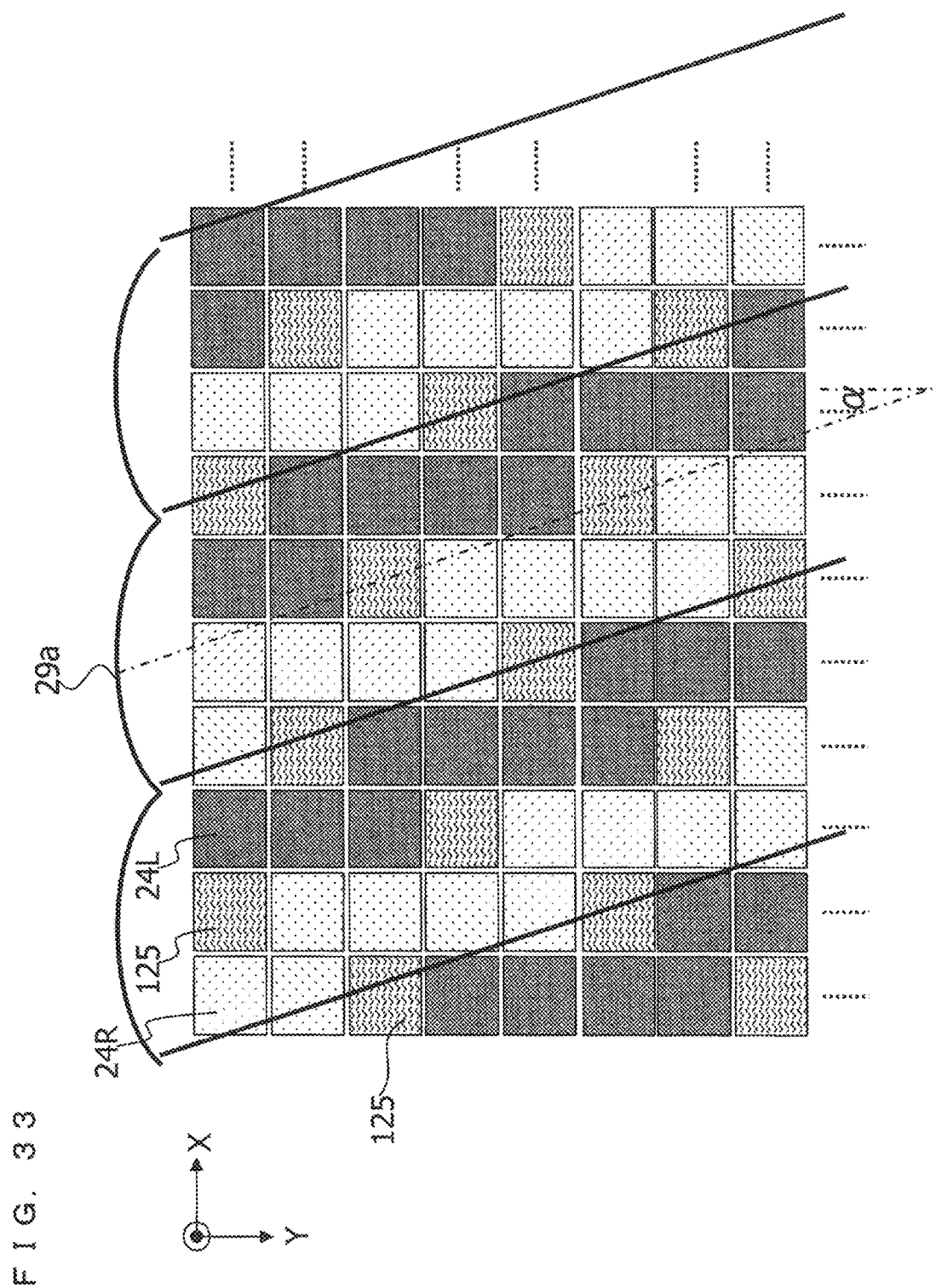
FIG. 33 is a diagram that illustrates the function of the 3D display according to the third embodiment of the present invention.

FIGS. 31A and 31B are schematic diagrams that illustrate the configuration of the 3D display 20 according to the third embodiment of the present invention. FIG. 32 is a diagram that illustrates the function of the 3D display 20 according to the third embodiment of the present invention. FIG. 33 is a diagram that illustrates the function of the 3D display 20 according to the third embodiment of the present invention. FIGS. 31A and 31B illustrates the 3D display 20 used in this embodiment. As illustrated in FIGS. 31A and 31B, an angle α is formed between the extending direction of the arranged cylindrical lens 29a and the Y-axis direction in which pixels 124 of the display panel 21 are arranged.

The display panel 21, as illustrated in FIGS. 31A and 31B, is configured by arranging a plurality of the pixels 124 in the X direction and the Y direction. The display panel 21 causes the pixels 124 to serve as the left-eye pixels 24L and the right-eye pixels 24R in accordance with the arrangement of the cylindrical lenses 29a configuring the lenticular lenses 29, thereby providing stereoscopic display for an observer. For example, as illustrated in FIG. 32, in the 3D display 20 illustrated in FIG. 31A and, as illustrated in FIG. 33 in the 3D display 20 illustrated in FIG. 31B, based on the light beam splitting characteristics of the arranged cylindrical lenses 29a, the pixels 124 serve as the left-eye pixels 24L and the right-eye pixels 24R. In addition, pixels 125 illustrated in FIGS. 32 and 33 are pixels for which light beams output from the pixels can be split in both directions of the right-eye side and the left-eye side of the observer by the cylindrical lens 29a. Such pixels 125 may serve as the left-eye pixels 24L and the right-eye pixels 24R such that total numbers thereof inside the display panel are the same, may serve as pixels displaying an intermediate luminance level between a neighboring left-eye pixel 24L and a neighboring right-eye pixel 24R, or may be set as non-display pixels (black display). In FIGS. 31A to 33, while the pixel is illustrated as a single unit for the convenience of description, a display panel in which each pixel 124 is configured by a plurality of sub pixels may be used for color display.

Figure 34B:
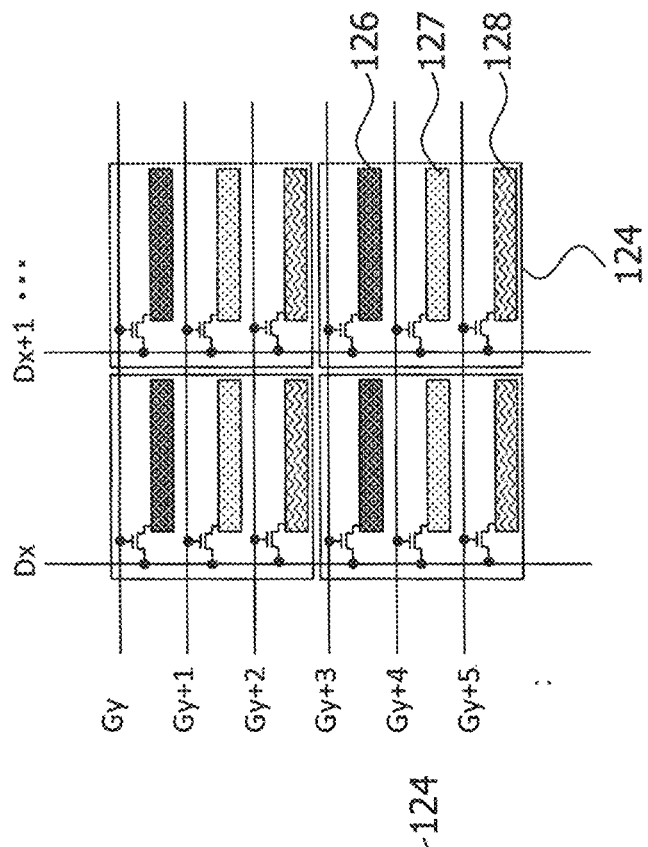
FIGS. 34A and 34B are specific examples that illustrate the configurations of sub pixels according to the third embodiment of the present invention.
Figure 34A:
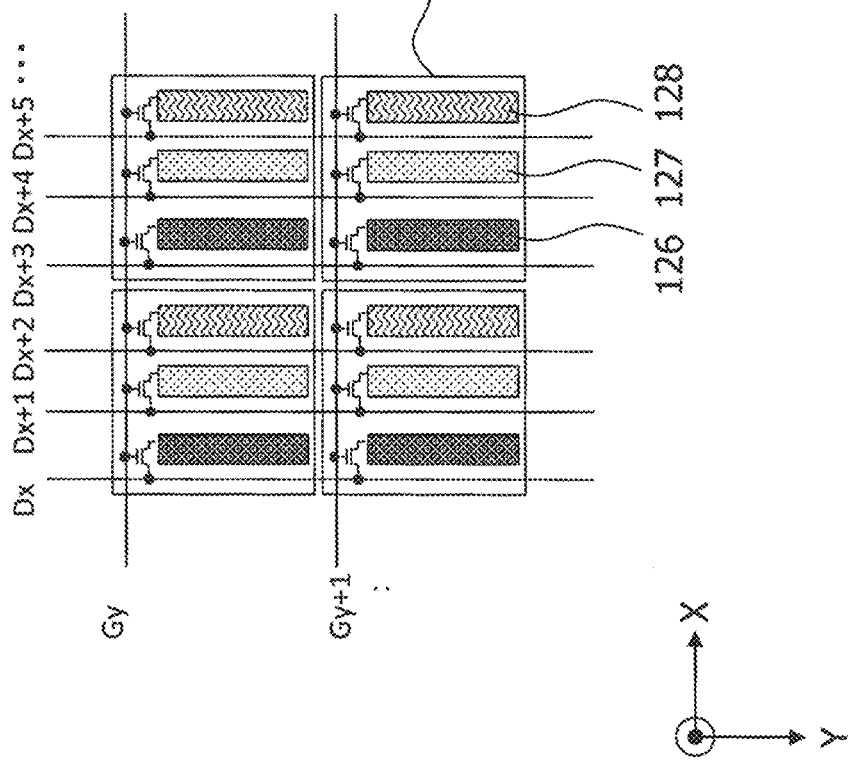

FIGS. 34A and 34B are specific examples that illustrate the configurations of sub pixels according to the third embodiment of the present invention. FIGS. 34A and 34B illustrate specific examples of pixels 124 each configured by a plurality of sub pixels. FIG. 34A is an example in which each pixel 124 is divided into three sub pixels in the X direction, and a sub pixel 126, a sub pixel 127, and a sub pixel 128 are arranged. FIG. 34B is an example in which each pixel 124 is divided into three sub pixels in the Y direction, and a sub pixel 126, a sub pixel 127, and a sub pixel 128 are arranged. In FIGS. 34A and 34B, while an example is illustrated in which a plurality of gate lines G (Gy, Gy+1, . . . ) extending in the X-axis direction and a plurality of data lines D (Dx, Dx+1, . . . ) extending in the Y-axis direction are arranged, each pixel is formed in an area surrounded by the gate lines G and the data lines D, and a sub pixel is driven by a TFT arranged near an intersection between the gate line G and the data line D, the data lines D may be arranged to extend in the X-axis direction, and the gate lines G may be arranged to extend in the Y-axis direction. While each pixel 124 is configured by three sub pixels, the pixel 124 may be configured by a plurality of sub pixels.

As above, in a case where each pixel 124 is configured by a plurality of sub pixels, the pixels 125 illustrated in FIGS. 32 and 33 may be configured to serve as the left-eye pixel 24L or the right-eye pixel 24R in units of sub pixels in accordance with the light beam splitting characteristics of the arranged cylindrical lens 29a. Hereinafter, the optical characteristics at the time of arranging the cylindrical lens 29a to be rotated with respect to the pixel arrangement will be described, for the convenience of description, with reference to FIG. 35 acquired by omitting the pixels 125 from FIG. 32.

Figure 35:
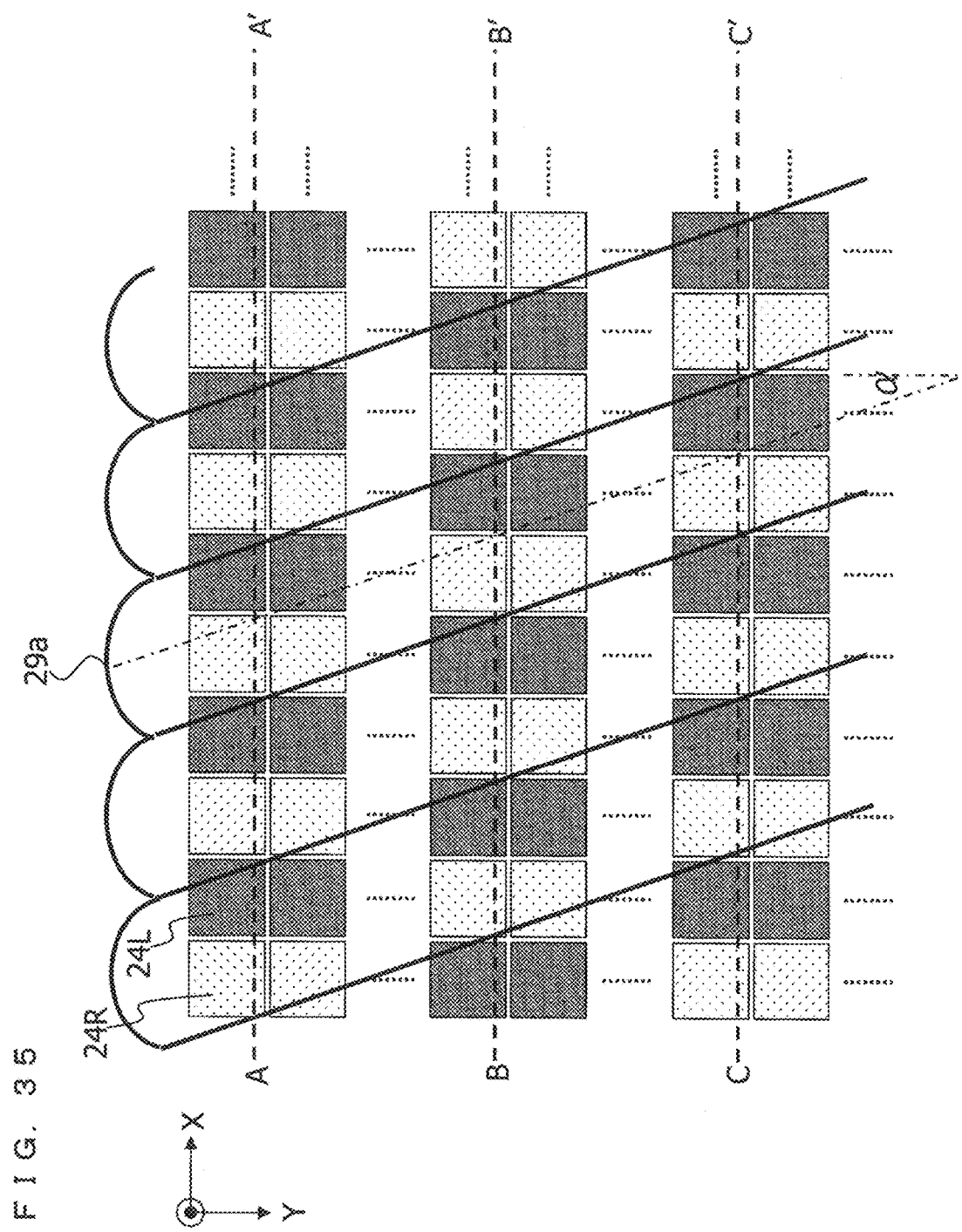
FIG. 35 is a diagram that illustrates the function of the 3D display according to the third embodiment of the present invention.

By configuring the pixels 124 of the 3D display 20 illustrated in FIG. 31A, as illustrated in FIG. 35, to serve as the left-eye pixels 24L and the right-eye pixels 24R, stereoscopic display can be provided for an observer. For example, the cross-section of the XZ plane taken along line B-B' illustrated in FIG. 35 can be described with reference to the same cross-section view of FIG. 9, and thus, an optical path of light that is emitted from the left-eye pixel 24L or the right-eye pixel 24R on the line B-B', is refracted by the cylindrical lens and travels toward the observer can be described with reference to FIG. 5. While the description can be presented with reference to a cross-section view taken along line A-A' or C-C' of FIG. 9 having a different position in the Y direction from line B-B', the left-eye pixel 24L or the right-eye pixel 24R is arranged according to the rotation angle α, and thus, compared to the cross-section taken along line B-B', the position of the left-eye pixel 24L or the right-eye pixel 24R deviates in the −X direction in the cross-section taken along line A-A' and deviates in the +X direction in the cross-section taken along line C-C'. For this reason, the optical paths illustrated in FIG. 5 also deviate according to the position in the Y direction. Accordingly, there is the influence of the rotation angle α also on a visually-recognized image.

The influence of the rotation angle α on the visually-recognized image, similar to the first embodiment, will be described using captured images captured using the imaging unit.

FIGS. 36A to 36E are diagrams that illustrate a correspondence relation between a space between the lenticular lens and the imaging unit and a captured image in the configuration illustrated in FIGS. 31A and 31B. In other words, captured images are captured when the 3D display 20 according to this embodiment and the imaging unit 80 are arranged similar to the arrangement according to the first embodiment illustrated in FIG. 11. As illustrated in FIGS. 36A to 36E, as the example illustrated in FIG. 13 described in the first embodiment, an example of a case where the imaging unit 80 is arranged on the center line of the 3D display 20, and the space D between the imaging unit 80 and the lenticular lens 29 is changed is illustrated, and the captured images correspond to those according to the first embodiment illustrated in FIG. 13. In this case, a captured image captured when the space D according to this embodiment is near the optimal stereoscopic visual recognition distance Dop, as illustrated in FIGS. 36A and 36B, similar to the first embodiment, includes an input image of the left-eye pixel 24L on the left side and includes an input image of the right-eye pixel 24R on the right side. However, the captured image has a center boundary line 129 that is inclined from the Y-axis by an angle β according to the rotation angle α. The inclination angle β of the boundary line with respect to the Y-axis is ideally the same as the rotation angle α. However, when the position at the time of mounting the lenticular lens 29 deviates from an ideal position, the inclination angle deviates from the rotation angle α according to a mounting position deviation.

When the space D gradually decreases, similar to the first embodiment, as illustrated in FIG. 36C, due to the influence of the secondary light, an input image of the right-eye pixel 24R appears on the left side of the captured image, and an input image of the left-eye pixel 24L appears on the right side. Then, when the space D further decreases, as illustrated in FIGS. 36D and 36E, due to the influence of the tertiary light, an input image of the left-eye pixel 24L appears on the left side of the captured image, and an input image of the right-eye pixel 24R appears on the right side. In other words, similar to the case according to the first embodiment illustrated in FIGS. 14A to 14E, as the space D between the imaging unit 80 and the lenticular lens 29 becomes further smaller than the optimal stereoscopic visual recognition distance Dop, due to the influence of the secondary light or light of a high order such as the tertiary light, the captured image is formed by repetitions of the input image of the left-eye pixel 24L and the input image of the right-eye pixel 24R.

In addition, captured images of a case (FIG. 15) where the imaging unit 80 is arranged to be shifted to the right side (right-eye side) with respect to the center line of the 3D display 20 and the space D between the imaging unit 80 and the lenticular lens 29 is changed, and a case (FIG. 18) where the imaging unit 80 is arranged to be shifted to the left side (left-eye side) with respect to the center line of the 3D display 20 and the space D between the imaging unit 80 and the lenticular lens 29 is changed, which have been described in the first embodiment, are the same except that the boundary line 129 between the input image of the left-eye pixel 24L and the input image of the right-eye pixel 24R has the inclination angle β from the Y axis as described above, and thus, the description thereof will not be presented.

Next, a case will be described in which the 3D display 20 according to this embodiment illustrated in FIG. 31A is combined with the spatial imaging device 30. Hereinafter, the spatial imaging device 30 is assumed to have a configuration in which a pole or a hole serving as the dihedral corner reflector is formed to be inclined with respect to the normal line of the principal face of the flat plate, and the plane of the spatial imaging device 30 is assumed to be arranged to be in parallel with the display surface of the 3D display 20.

Similar to the first embodiment, as illustrated on the left side in FIG. 21B, in a case where an input image in which an object 71 having a star shape is arranged on a slight right side from the center is displayed in the left-eye pixel 24L, and, as illustrated on the right side in FIG. 21B, an input image in which the object 71 having the star shape is arranged on a slightly left side from the center is displayed in the right-eye pixel 24R, popup parallax causing the object 71 having the start shape to be visually recognized as if it pops up in the air is formed.

Figure 37A:
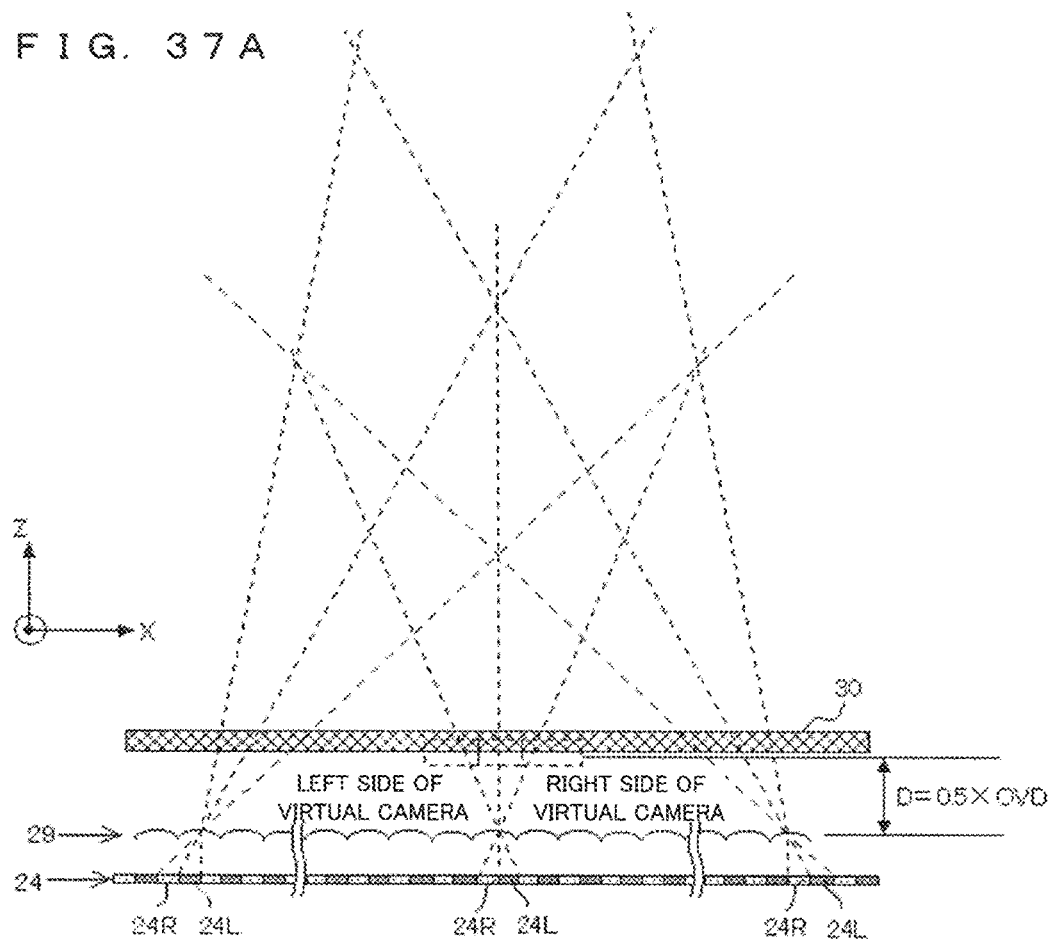
FIGS. 37A, 37B, and 37C are diagrams that illustrate reverse viewing in the stereoscopic display device.
Figure 37B:
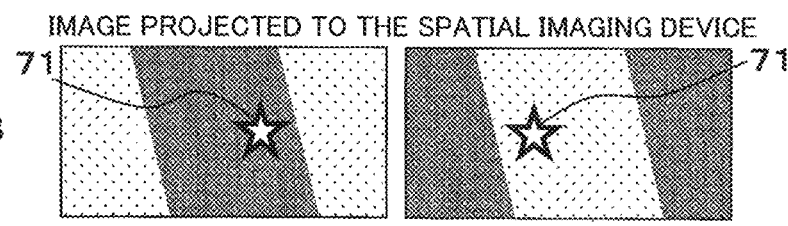
Figure 37C:
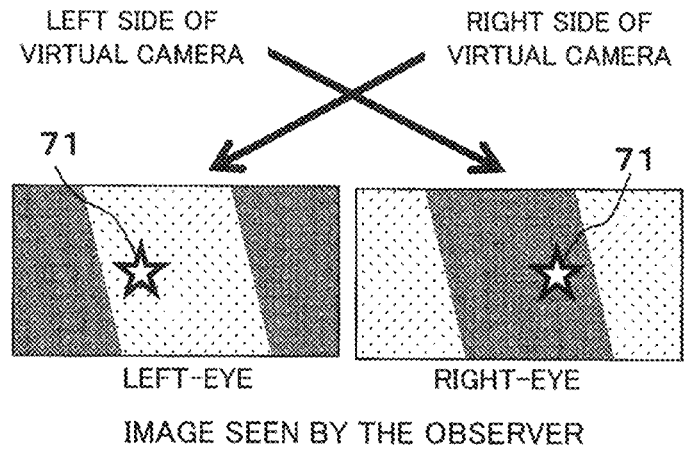

In contrast to this, for example, as illustrated in FIG. 37A (similar to the case illustrated in FIGS. 22A to 22C of the first embodiment) in a case where the spatial imaging device 30 is arranged at a position of D=0.5×Dop, an image captured by a virtual camera that is virtually arranged at the position of the spatial imaging device 30 is as illustrated in FIG. 37B. Here, since the spatial imaging device 30 is a reflection optical system, and light beams emitted from the spatial imaging device 30 are in the same direction as the incidence direction, an image seen by the observer is horizontally reversed. As a result, the image seen by the observer is as illustrated in FIG. 37C, and, as described in the first embodiment, so-called reverse viewing in which the popup parallax becomes depth parallax occurs.

In this way, also in a case where the 3D display 20 according to this embodiment is combined with the spatial imaging device 30, similar to the first embodiment, reverse viewing occurs.

The configuration of the stereoscopic display device 10 according to this embodiment is the same as that of the first embodiment except for a different configuration of the 3D display 20. In other words, the 3D display 20 illustrated in FIGS. 31A and 31B is arranged in FIG. 8. Thus, similar to the first embodiment, the image processing unit 50 is arranged, image processing for horizontally reversing areas in which the reverse viewing of input images input from the image signal input unit 40 occurs is executed, and image data after the image processing is output to the 3D display 20.

As the configuration of the image processing unit 50, the same configuration as that of the first embodiment can be applied, and thus, detailed description thereof will not be presented. The parallax image correcting method according to this embodiment will be described with reference to FIG. 24 that is the flowchart according to the first embodiment and the schematic diagrams of FIGS. 38A to 38C.

First, the parallax image area extracting unit 52 acquires input images (captured images corresponding to two viewpoints or a set of a captured image corresponding to one viewpoint and a virtual viewpoint image) from the image signal input unit 40 (S101). Here, as illustrated in FIG. 38A, it is assumed that reverse viewing occurs in the main lobe image. At this time, a boundary line between the 3D normal viewing area and the 3D reverse viewing area, different from that of the first embodiment, has an inclination angle γ according to the inclination angle β illustrated in FIG. 36A. Ideally, the inclination angle γ is the same as the inclination angle β. However, depending on the characteristics (the mirror surface roughness, the mirror assembly precision, the reflectance, or the like of the dihedral corner reflector) of the spatial imaging device, a dimensional deviation between a display image and an air floating image of the stereoscopic display device occurs, and there is a case where a deviation from the inclination angle β occurs.

Next, the parallax image area extracting unit 52 acquires a predetermined condition from the area parameter storing unit 56 and extracts parallax image areas based on the predetermined condition (S102). Here, as the parallax image areas, areas of the main lobe images are extracted. As a parameter of the boundary line used for the area extraction, while the rotation angle α or the inclination angle β may be used, however, the application of the inclination angle γ that is actually measured from the air floating image by combining the 3D display 20 that is actually used for the stereoscopic display device and the spatial imaging device 30 is preferable.

Next, the image data interchanging unit 53 interchanges a left-eye image and a right-eye image of the parallax image areas (S103). For example, as illustrated in FIG. 38B, in a case where the left-eye image of the input image is configured by images $L_A$, $L_B$, and $L_C$, and the right-eye image is configured by images $R_A$, $R_B$, and $R_C$, the main lobe image $R_B$ of the left-eye image and the main lobe image $L_B$ of the right-eye image are interchanged.

Then, the image data interchanging unit 53 outputs image data acquired by interchanging the left-eye image and the right-eye image of the parallax image areas to the 3D display 20, and the 3D display 20 displays an image on the display panel 21 based on the image data (S104). Here, since the left-eye image and the right-eye image of the main lobe in which reverse viewing occurs are interchanged, as illustrated in FIG. 38C, the observer can visually recognize an air floating image in which all the areas become the 3D normal viewing areas.

In the description presented above, while a case has been illustrated in which each of the left and right input images is configured by three images including a left image, a center image, and a right image, as described in the first embodiment with reference to FIGS. 26A to 26C, the description may also be similarly applied to a case where each of the left and right input images is configured by a plurality of areas.

The image processing unit according to the second embodiment may be applied to the stereoscopic display device according to this embodiment, and the parallax image correcting method described in the second embodiment may be applied thereto.

Similar to the first and second embodiments, since the EVS angle and the distance between the spatial imaging device 30 and the observer change in accordance with the observer's position, it may be configured such that cameras are installed to the stereoscopic display device 10, and the image processing unit 50 acquires an image acquired by imaging an observer from an appropriate camera, extracts feature points from the captured image, detects the positions of both eyes, specifies the EVS angle and the distance between the spatial imaging device 30 and an observer based on the positions, the space, and the like of both the eyes, and stores the specified information in the area parameter storing unit 56. Here, as the predetermined conditions, any other conditions such as the characteristics of the display panel 21 or the characteristics of the lenticular lens 29 may be used. In addition, as a predetermined condition relating to the characteristics of the spatial imaging device 30, the mirror surface roughness, the mirror assembly precision, the reflectance, or the like of the dihedral corner reflector configuring the spatial imaging device 30 may be used.

In this way, by extracting parallax image areas in which reverse viewing occurs from the input images and interchanging a left-eye image and a right-eye image corresponding to the parallax image areas, a problem that a 3D normal viewing area and a 3D reverse viewing area alternately appear in the air floating image can be avoided.

As the display panel 21 used in this embodiment, any one of various display devices such as a liquid crystal display device, an organic electro luminescence (EL) device, a quantum dot device, and a field emission device may be used. In addition, the method of driving the display panel 21 is not limited to an active matrix type that uses TFTs or the like but may be a passive matrix type.

[Fourth Embodiment]

Next, a stereoscopic display device and a parallax image correcting method according to a fourth embodiment of the present invention will be described with reference to FIGS. 39 to 44.

Figure 39:
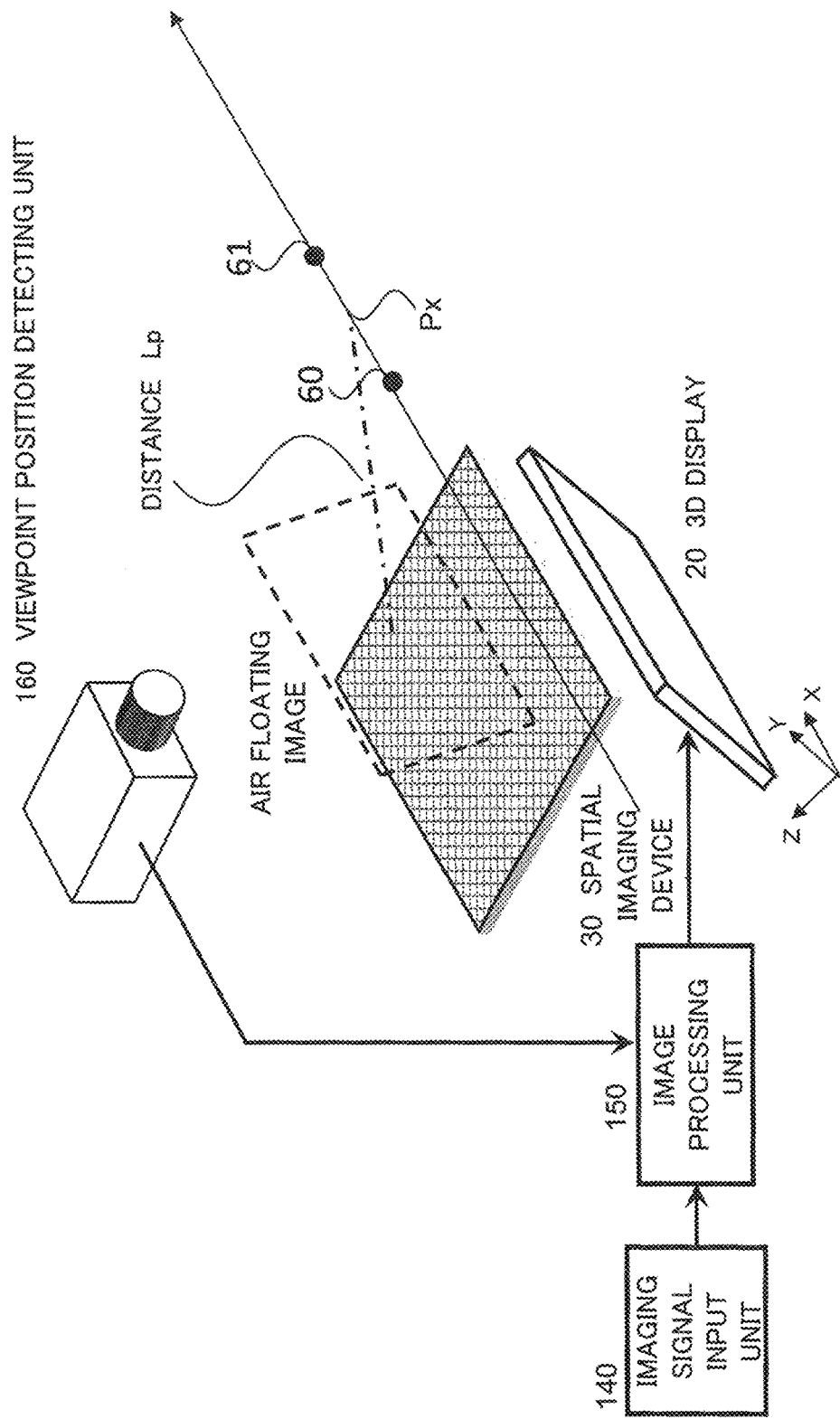
FIG. 39 is a perspective view that illustrates the configuration of the stereoscopic display device according to this embodiment.
Figure 40:
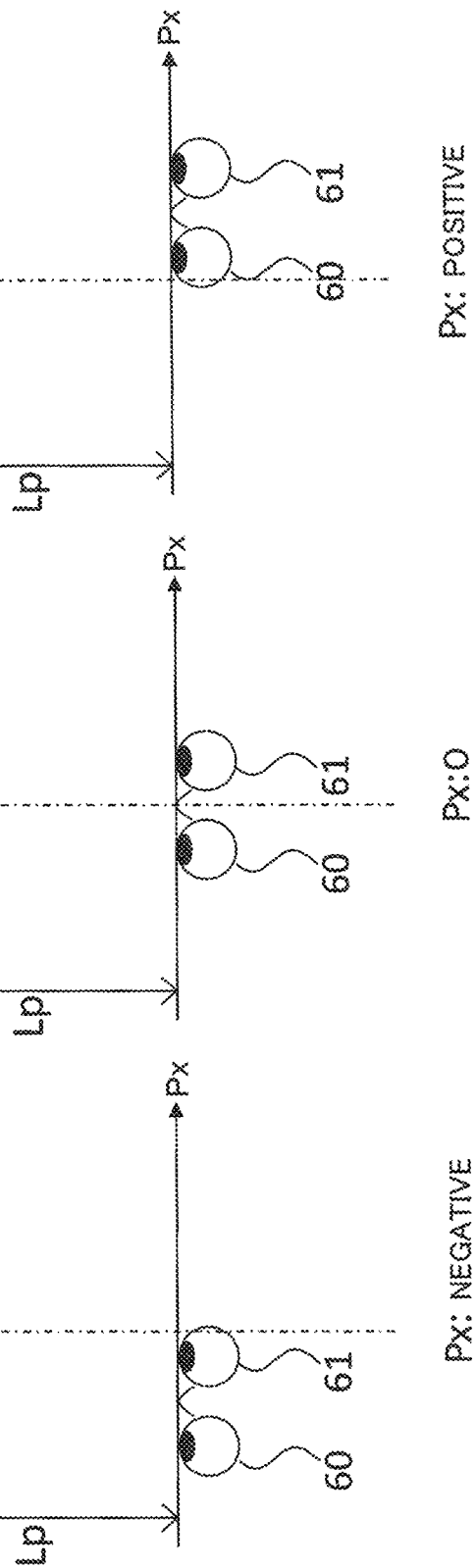
FIGS. 40A, 40B, and 40C are diagrams that illustrate the values of Px according to observer's movement.
Figure 42:
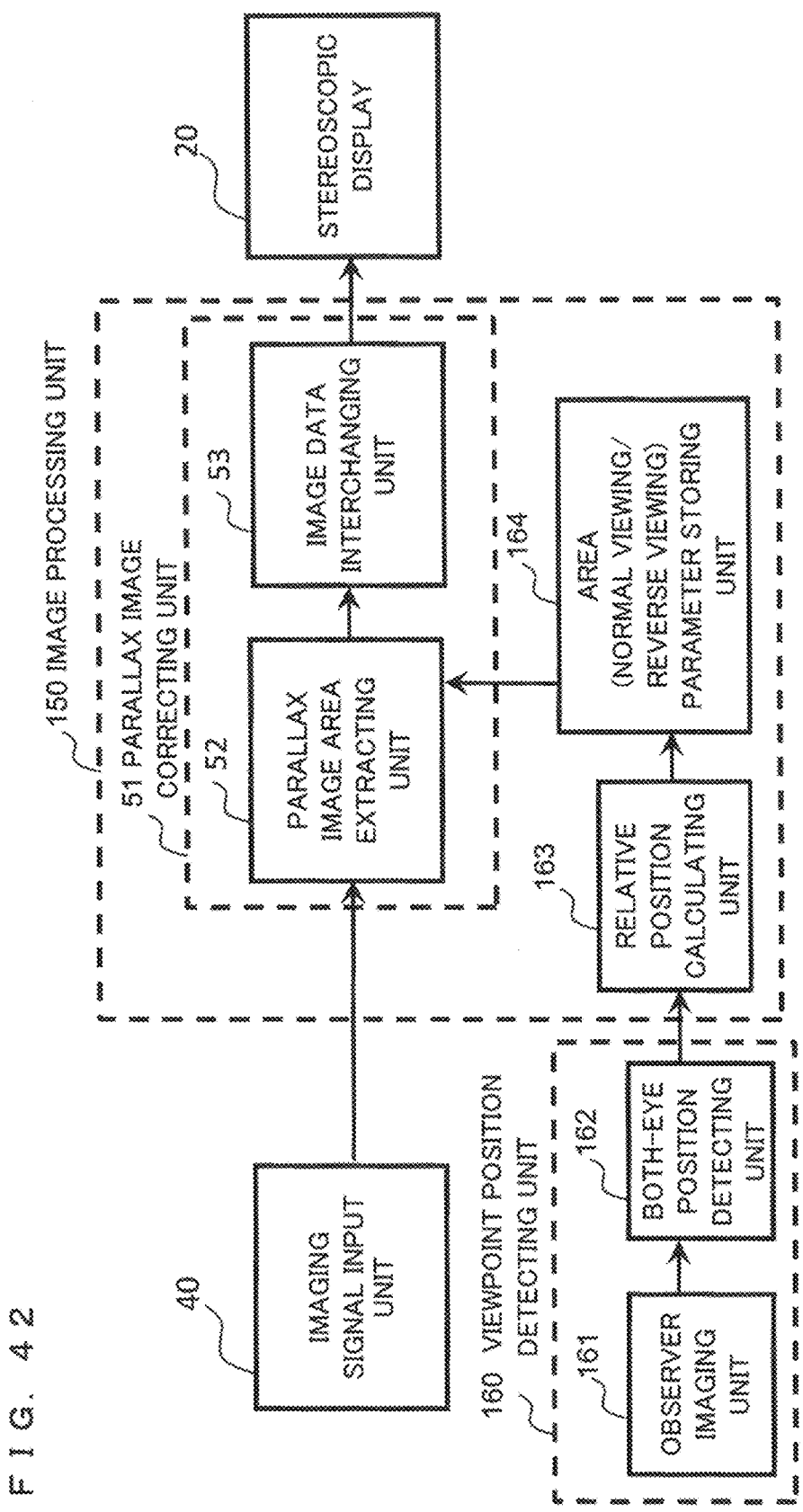
FIG. 42 is a block diagram that illustrates an example of the configuration of an image processing unit and a viewpoint position detecting unit of a stereoscopic display device according to a fourth embodiment of the present invention.

FIG. 39 is a perspective view that illustrates the configuration of the stereoscopic display device according to this embodiment. FIGS. 40A, 40B, and 40C are diagrams that illustrate the values of Px according to observer's movement. FIG. 41 is a diagram that illustrates a visually-recognized image and a reverse viewing area that are observed according to observer's movement. FIG. 42 is a block diagram that illustrates an example of the configuration of an image processing unit and a viewpoint position detecting unit of the stereoscopic display device according to the fourth embodiment of the present invention.

As illustrated in FIG. 39, the stereoscopic display device 130 according to this embodiment is configured by: a 3D display 20; a spatial imaging device 30; an image signal input unit 140; an image processing unit 150; and a viewpoint position detecting unit 160 that is a unit used for detecting a positional relation between the spatial imaging device 30 and an observer.

As the 3D display 20, any one of those described in the first and third embodiments may be used, and thus, detailed description thereof will not be presented. Hereinafter, for the convenience of description, an example will be described in which the 3D display 20 according to the first embodiment is used in this embodiment.

FIG. 39 illustrates a normal line from an air floating image, and a distance on the normal line at which the air floating image can be appropriately stereoscopically viewed by the observer will be denoted by Lp. In addition, a middle point between the left-eye position 60 and the right-eye position 61 of the observer on an axis parallel to the X axis will be denoted by Px. Next, the value of Px of a case where the observer moves while maintaining the distance Lp from the air floating image will be described with reference to FIGS. 40A to 40C in which the air floating image and the observer illustrated in FIG. 39 are observed from right above. As illustrated in FIG. 40B, the value of Px when the observer is located at the center position with respect to the air floating image is set to zero. In addition, as illustrated in FIG. 40A, the value of Px of a case where the observer moves to the left side is set to be negative, and, as illustrated in FIG. 40C, the value of Px of a case where the observer moves to the right side is set to be positive. By using this Px, an observation position VPx is defined in the following equation.

$$VPx=Px/Lp \qquad \text{Equation (1)}$$

Next, visually-recognized images of a case where the observer moves on the axis parallel to the X axis will be described. FIG. 41 is a diagram that illustrates visually-recognized images and reverse viewing areas observed by the observer in accordance with the movement made in parallel with the X axis illustrated in FIG. 39 when respectively-different images are input to right-eye pixels and left-eye pixels of the 3D display 20. Here, as the value of the observation position, the value of VPx calculated using Equation (1) is used.

For example, when VPx=0, a visually-recognized image in the left eye is the same as that described with reference to FIG. 25B in the first embodiment, and, a right-eye image of the main lobe in which reverse viewing occurs is visually recognized at the center portion, and left-eye images of side lobes are visually recognized at both ends in the horizontal direction. In addition, when VPx=0, as a visually-recognized image in the right eye, the left-eye image of the main lobe in which reverse viewing occurs is visually recognized at the center portion, and right-eye images of the side lobes are visually recognized at both ends thereof in the horizontal direction.

When the observer moves to the right side, the image of the main lobe in which reverse viewing occurs moves to the right side, and the images of the side lobes recognized at both ends move to the right side as well. At this time, as illustrated in FIGS. 17 and 20 according to the first embodiment, the image (an image according to primary light) of the main lobe and the images (images according to light of a high order) of the side lobes repeatedly appear in the X direction, and accordingly, an image of the main lobe appears again on a further left side of the image of the side lobe disposed on the left side of the image of the main lobe. More specifically, when VPx=+0.022, visually-recognized images in the left eye are the right-eye image of the main lobe, the left-eye image of the side lobe, the right-eye image of the main lobe, and the left-eye image of the side lobe sequentially from the left end. In addition, visually-recognized images in the right eye are the left-eye image of the main lobe, the right-eye image of the side lobe, the left-eye image of the main lobe, and the right-eye image of the side lobe sequentially from the left end. For this reason, when VPx=+0.022, a reverse viewing area appears also at the left end in addition to an area in which the reverse viewing area of VPx=0 is moved to the right side. In other words, when the observer changes the observation position, as illustrated in FIG. 41, the visually-recognized images are changed, and accordingly, the reverse viewing area changes as well.

In this way, since a position at which reverse viewing occurs changes according to the observer's position, in the stereoscopic display device 130 according to this embodiment, by further arranging the viewpoint position detecting unit 160, a reverse viewing area according to the observer's position is acquired, and, for the input image input from the image signal input unit 40, image processing for horizontally reversing (the left-eye image and the right-eye image of areas in which reverse viewing occurs are interchanged) the acquired reverse viewing areas is executed, and image data after the image processing is output to the 3D display 20.

This viewpoint position detecting unit 160, as illustrated in FIG. 42, is configured by an observer imaging unit 161 and a both-eye position detecting unit 162. In addition, the image processing unit 150, as illustrated in FIG. 42, is configured by a parallax image correcting unit 51, an area parameter storing unit 164, and a relative position calculating unit 163.

The observer imaging unit 161 is a unit for capturing an image of the observer so as to measure three-dimensional coordinates from the viewpoint position detecting unit 160 to observer's both eyes, and a visible light camera, a combination of a visible light camera and an infrared camera, or a plurality of cameras may be used.

The both-eye position detecting unit 162 calculates three-dimensional coordinates of observer's both eyes based on image data acquired by the observer imaging unit 161. The calculation method differs according to the observer imaging unit 161. For example, in the case of only one visible light camera, the positions of both eyes are calculated based on feature points of a face included in a captured image, and a distance is calculated by using the size of the face. In the case of the combination of a visible light camera and an infrared camera, the positions of both eyes are calculated based on feature points of a face included in a captured image captured by the visible light camera, and a distance is calculated based on a captured image of infrared light having an emission pattern, or the distance is calculated by using a system (time of flight (TOF) system: flight time of light) measuring a return time of transmitted infrared light. In a case where a plurality of cameras are used, the positions of both eyes are calculated based on the feature points of a face included in a captured image, and a distance is calculated based on trigonometry.

Measured values from the viewpoint position detecting unit 160 to observer's both eyes calculated as described above are input to the relative position calculating unit 163. The relative position calculating unit 163 calculates a positional relation (the distance Lp and the both eye center position Px illustrated in FIG. 39) between an air floating image and the observer based on the acquired measured values and design parameters such as a design position of the viewpoint position detecting unit 160 of the stereoscopic display device 130 and outputs a calculation result to the area parameter storing unit. The positional relation between the air floating image and the observer, which has been output, is stored in the area parameter storing unit 164.

The parallax image correcting unit 51 according to this embodiment is the same as that of the first embodiment and is configured by a parallax image area extracting unit 52 and an image data interchanging unit 53.

The parallax image area extracting unit 52 of the parallax image correcting unit 51 acquires captured images corresponding to two viewpoints or a set of a captured image corresponding to one viewpoint and a virtual viewpoint image from the image signal input unit 40, reads predetermined conditions such as the positional relation (the distance Lp and the both-eye center position Px illustrated in FIGS. 37A to 37C) between the air floating image and the observer, the distance between the 3D display 20 and the spatial imaging device 30, and the aspect ratio of the spatial imaging device 30 from the area parameter storing unit 164, and extracts areas (parallax image areas) in which reverse viewing occurs based on at least one condition among the predetermined conditions. For example, as illustrated in FIG. 41, reverse viewing areas according to the observation position are extracted.

The EVS angle and the distance between the spatial imaging device 30 and the observer that are changed according to the observer's position can be calculated based on the positional relation between the air floating image and the observer calculated by the viewpoint position detecting unit 160 and the relative position calculating unit 163. A change rate with respect to such observer's position may be stored in the area parameter storing unit 164. Here, as the predetermined conditions, any other conditions such as the characteristics of the display panel 21 or the characteristics of the lenticular lens 29 may be used. In addition, as a predetermined condition relating to the characteristics of the spatial imaging device 30, the mirror surface roughness, the mirror assembly precision, the reflectance, or the like of the dihedral corner reflector configuring the spatial imaging device 30 may be used.

The image data interchanging unit 53 specifies a left-eye image and a right-eye image corresponding to parallax image areas extracted by the parallax image area extracting unit 52 from input images and generates image data acquired by interchanging the images and outputs the generated image data to the 3D display 20. For example, a reverse viewing area image of the left-eye input image and a reverse viewing area image of the right-eye input image illustrated in FIG. 41 are specified, image data acquired by interchanging the images is generated, and the generated image data is output to the 3D display 20.

In this embodiment, configurations other than the configurations according to this embodiment described above are the same as those of the first embodiment, and thus, detailed description thereof will not be presented.

Figure 43:
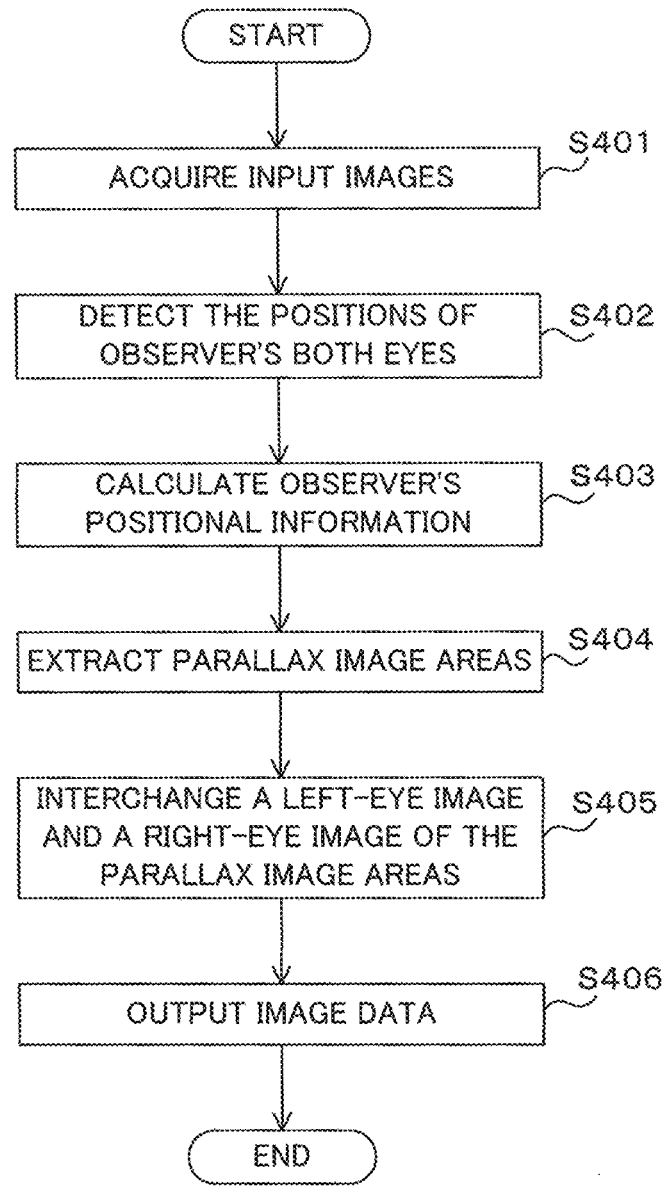
FIG. 43 is a flowchart that illustrates a parallax image correcting method used in the stereoscopic display device according to the fourth embodiment of the present invention.

FIG. 43 is a flowchart that illustrates a parallax image correcting method used in the stereoscopic display device 10 according to the fourth embodiment of the present invention. The parallax image correcting method using the viewpoint position detecting unit 160 and the image processing unit 150 illustrated in FIG. 39 and FIG. 42, will be described with reference to a flowchart of FIG. 43.

First, the image processing unit 150 acquires an input image (captured images corresponding to two viewpoints or a set of a captured image corresponding to one viewpoint and a virtual viewpoint image) from the image signal input unit 40 (S401). Next, the viewpoint position detecting unit 160 detects the positions of observer's both eyes by the both-eye position detecting unit 162 from the image captured by the observer imaging unit 161 (S402). The image processing unit 150 calculates a positional relation (the distance Lp and the both-eye center position Px) between the air floating image and the observer based on the positions of both eyes detected by the viewpoint position detecting unit 160 by using the relative position calculating unit 163 and outputs the positional relation to the area parameter storing unit 164 (S403). In a case where the observer is not in a capture range, and the positional relation between the air floating image and the observer cannot be calculated, a positional relation that has been previously calculated or an ideal positional relation may be output to the area parameter storing unit 164.

Next, the parallax image area extracting unit 52 acquires the predetermined conditions including the positional relation of the observer from the area parameter storing unit 164 and extracts parallax image areas based thereon (S404). Here, as parallax image areas, reverse viewing areas varying depending on the position of the observer is extracted, as illustrated in FIG. 41. Next, for the input image obtained at S401, the left-eye image and the right-eye image in the extracted reverse viewing areas are interchanged (S405). For example, the reverse viewing area image of the left-eye input image and the reverse viewing area image of the right-eye input image illustrated in FIG. 41 are interchanged.

Then, the image data interchanging unit 53 outputs image data acquired by interchanging the left-eye image and the right-eye image of the parallax image areas to the 3D display 20, and the 3D display 20 displays an image on the display panel 21 based on the image data (S406). Here, since the left-eye image and the right-eye image in which reverse viewing occurs are interchanged, the observer can visually recognize an air floating image in which all the areas become the 3D normal viewing areas.

In the description presented above, while a case has been illustrated in which each of the left and right input images is configured by three images including a left image, a center image, and a right image at VPx=0 by using the example illustrated in FIG. 41, as illustrated in the first embodiment, the description may be similarly applied also to a case where each of the left and right input images is configured by a plurality of areas.

In this way, by detecting the position of the observer, extracting parallax image areas in which reverse viewing occurs from the input images in accordance with the position of the observer, and interchanging a left-eye image and a right-eye image corresponding to the parallax image areas, a problem that a 3D normal viewing area and a 3D reverse viewing area alternately appear in the air floating image can be avoided also in a case where the observer moves.

While the stereoscopic display device according to this embodiment has been described using the 3D display 20 according to the first embodiment, the 3D display 20 according to the third embodiment may be used. In a case where the 3D display 20 according to the third embodiment is used, the boundary line forming the reverse viewing area may be configured to have an inclination according to the characteristics of the 3D display 20.

The process of detecting the position of the observer and extracting parallax image areas in which reverse viewing occurs from the input images in accordance with the position of the observer, which has been described in this embodiment, may be applied to the second embodiment.

Figure 44:
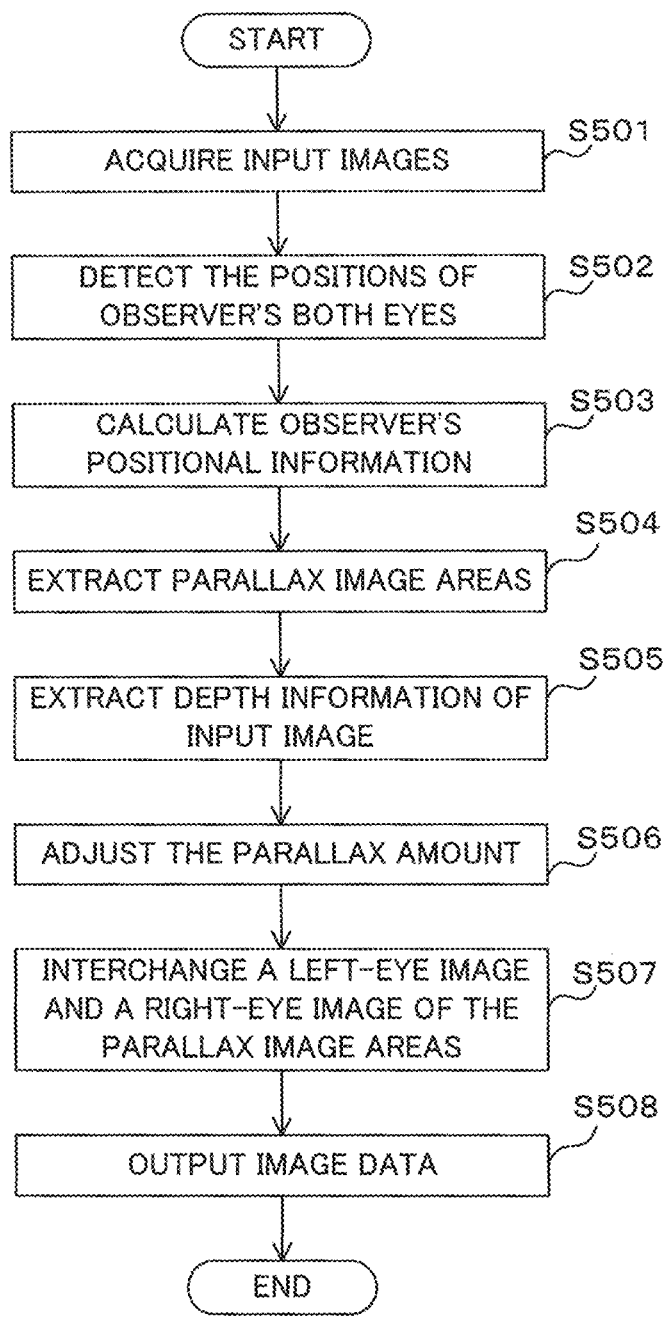
FIG. 44 is a flowchart that illustrates a parallax image correcting method used in the stereoscopic display device according to the fourth embodiment of the present invention.

A flowchart of such a case is illustrated in FIG. 44.

The present invention is not limited to the embodiments described above, but the configuration or the control thereof may be appropriately changed in a range not departing from the concept of the present invention.

The present invention can be used for a stereoscopic display device generating an air floating image acquired by forming a 3D image in the air, a parallax image correcting method used in the stereoscopic display device, a parallax image correcting program, and a recording medium on which the parallax image correcting program is recorded.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A stereoscopic display device comprising:
a naked-eye stereoscopic display that projects respectively-different images into an observer's left eye and right eye aligned in a first direction based on a first input image and a second input image corresponding to two viewpoints;
a spatial imaging device of a flat-plate shape that includes a plurality of optical reflection devices reflecting light transmitted from an object on a first reflection surface and a second reflection surface that are orthogonal to each other, and that images, in the air, a floating image based on the first input image and the second input image, the first input image and the second input image respectively including a plurality of portions defined by a main lobe and a side lobe; and
an image processing unit that interchanges a corresponding portion of the plurality of portions in the first input image corresponding to a reverse viewing area and a corresponding portion of the plurality of portions in the second input image corresponding to the reverse viewing area in which depth parallax and popup parallax of the first input image and the second input image are reversed in a part of the floating image imaged in the air, and outputs the first input image including the corresponding portion in the second input image and the second input image including the corresponding portion in the first input image to the naked-eye stereoscopic display,
wherein the spatial imaging device images, in the air on an observer side, the floating image based on the first input image including the corresponding portion in the second input image and the second input image including the corresponding portion in the first input image that are projected by the naked-eye stereoscopic display, and
wherein the naked-eye stereoscopic display includes the main lobe that is a front stereoscopic viewing area near a normal line passing through the center of a display surface and the side lobe that is a stereoscopic viewing area disposed on an outer side of the main lobe in the first direction.

2. The stereoscopic display device according to claim 1, further comprising a viewpoint position detecting unit that detects a viewpoint position of the observer,
wherein, in a case where, in the image projecting one input image, the image projecting the other input image is mixed, the image processing unit interchanges portions corresponding to the reverse viewing areas in accordance with the viewpoint position of the observer detected by the viewpoint position detecting unit and outputs the resultant images to the naked-eye stereoscopic display.

3. The stereoscopic display device according to claim 2, wherein the viewpoint position detecting unit includes
an observer imaging unit capturing the observer, and
a both-eye position detecting unit detecting positions of both eyes from a captured image,
the stereoscopic display device further comprises a relative position calculating unit specifying a positional relation between the special imaging device and the observer based on the positions of both eyes detected by the both-eye position detecting unit, and
the image processing unit interchanges the portions corresponding to the reverse viewing areas and outputs the resultant images to the naked-eye stereoscopic display in accordance with the positional relation specified in a case where, in the image projecting one input image, the image projecting the other input image is mixed.

4. The stereoscopic display device according to claim 1, wherein the image processing unit further executes:
extracting the reverse viewing area based on a predetermined condition.

5. The stereoscopic display device according to claim 4, wherein a boundary line of the reverse viewing area has an angle with respect to an arrangement direction of pixels included in the naked-eye stereoscopic display.

6. The stereoscopic display device according to claim 4, wherein the image processing unit further executes:
extracting depth information of each portion of a display target object based on the first and second input images corresponding to the two viewpoints; and
adjusting parallax amounts of the first and second input images corresponding to the two viewpoints based on the predetermined condition.

7. The stereoscopic display device according to claim 6, wherein the image processing unit sets a parallax amount of a portion near a boundary between an image of a portion corresponding to the reverse viewing area and an image adjacent to the image of the portion corresponding to the reverse viewing area to be less than a parallax amount of a portion other than the portion near the boundary.

8. The stereoscopic display device according to claim 6, wherein the image processing unit sets a parallax amount of image of a portion corresponding to the reverse viewing area to be more than a parallax amount of an image of a portion other than the portions corresponding to the reverse viewing area.

9. The stereoscopic display device according to claim 4, wherein the predetermined condition includes at least one of an angle formed by a visual line direction of the observer and a normal direction of the spatial imaging device, a distance between the naked-eye stereoscopic display and the spatial imaging device, a distance between the spatial imaging device and the observer, and optical characteristics of the spatial imaging device.

10. A parallax image correcting method using a stereoscopic display device including:
a naked-eye stereoscopic display that projects respectively-different images into an observer's left eye and right eye aligned in a first direction based on a first input image and a second input image corresponding to two viewpoints; and a spatial imaging device of a flat-plate shape that includes a plurality of optical reflection devices reflecting light transmitted from an object on a first reflection surface and a second reflection surface that are orthogonal to each other, and that images, in the air, a floating image based on the first input image and the second input image projected by the naked-eye stereoscopic display, the first input image and the second input image respectively including a plurality of portions defined by a main lobe and a side lobe, the naked-eye stereoscopic display including a main lobe that is a front stereoscopic viewing area near a normal line passing through the center of a display surface and a side lobe that is a stereoscopic viewing area disposed on an outer side of the main lobe in the first direction, the parallax image correcting method using the stereoscopic display device comprising:

determining whether a reverse viewing area in which depth parallax and popup parallax of the first input image and the second input image are reversed is present in a part of the floating image imaged in the air;

interchanging a corresponding portion of the plurality of portions in the first input image corresponding to the reverse viewing area and a corresponding portion of the plurality of portions in the second input image corresponding to the reverse viewing area, in a case where the reverse viewing area is present; and outputting the first input image including the corresponding portion in the second input image, and the second input image including the corresponding portion in the first input image to the naked-eye stereoscopic display, wherein the spatial imaging device images, in the air on an observer side, the floating image based on the first input image including the corresponding portion in the second input image and the second input image including the corresponding portion in the first input image that are projected by the naked-eye stereoscopic display.

11. The parallax image correcting method using the stereoscopic display device according to claim 10, further comprising:

detecting a viewpoint position of the observer; and determining whether or not the reverse viewing areas are present in accordance with the detected viewpoint position of the observer in a case where, in the image projecting one input image, the image projecting the other input image is mixed;

specifying the reverse viewing areas in accordance with the detected viewpoint position of the observer;

interchanging portions corresponding to the specified reverse viewing areas; and outputting the resultant images to the naked-eye stereoscopic display in a case where the reverse viewing areas are present.

12. The parallax image correcting method using the stereoscopic display device according to claim 11, further comprising:

capturing an image of the observer;

detecting positions of both eyes from a captured image;

specifying a positional relation between the special imaging device and the observer based on the detected positions of both eyes; and interchanging the portions corresponding to the reverse viewing areas in accordance with the specified positional relation and outputting the resultant images to the naked-eye stereoscopic display in accordance with the positional relation specified in a case where, in the image projecting one input image, the image projecting the other input image is mixed.

13. The parallax image correcting method using the stereoscopic display device according to claim 10, further comprising:

extracting the reverse viewing area based on a predetermined condition.

14. The parallax image correcting method using the stereoscopic display device according to claim 13, wherein a boundary line of the reverse viewing area has an angle with respect to an arrangement direction of pixels included in the naked-eye stereoscopic display.

15. The parallax image correcting method using the stereoscopic display device according to claim 13, further comprising:

extracting depth information of each portion of a display target object based on the first and second input images corresponding to the two viewpoints before the extraction of the reverse viewing area; and adjusting parallax amounts of the first and second input images corresponding to the two viewpoints based on the predetermined condition.

16. The parallax image correcting method using the stereoscopic display device according to claim 15, further comprising setting a parallax amount of a portion near a boundary between an image of a portion corresponding to one of the reverse viewing area and an image adjacent to the image to be less than a parallax amount of a portion other than the portion near the boundary.

17. The parallax image correcting method using the stereoscopic display device according to claim 15, further comprising setting a parallax amount of image of a portion corresponding to the reverse viewing area to be more than a parallax amount of an image of a portion other than the portions corresponding to the reverse viewing area.

18. The parallax image correcting method using the stereoscopic display device according to claim 13, wherein the predetermined condition includes at least one of an angle formed by a visual line direction of the observer and a normal direction of the spatial imaging device, a distance between the naked-eye stereoscopic display and the spatial imaging device, a distance between the spatial imaging device and the observer, and optical characteristics of the spatial imaging device.

* * * * *